(12) United States Patent
Zhang et al.

(10) Patent No.: US 11,743,504 B2
(45) Date of Patent: Aug. 29, 2023

(54) PREDICTION TYPE SIGNALING IN VIDEO CODING

(71) Applicants: Beijing Bytedance Network Technology Co., Ltd., Beijing (CN); Bytedance Inc., Los Angeles, CA (US)

(72) Inventors: Kai Zhang, San Diego, CA (US); Li Zhang, San Diego, CA (US); Hongbin Liu, Beijing (CN); Zhipin Deng, Beijing (CN); Jizheng Xu, San Diego, CA (US); Yue Wang, Beijing (CN)

(73) Assignees: BEIJING BYTEDANCE NETWORK TECHNOLOGY CO., LTD, Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/718,880

(22) Filed: Apr. 12, 2022

(65) Prior Publication Data
US 2022/0256197 A1    Aug. 11, 2022

Related U.S. Application Data

(63) Continuation of application No. PCT/CN2020/120289, filed on Oct. 12, 2020.

(30) Foreign Application Priority Data

Oct. 12, 2019 (WO) ................ PCT/CN2019/110902

(51) Int. Cl.
*H04N 19/70* (2014.01)
*H04N 19/159* (2014.01)
(Continued)

(52) U.S. Cl.
CPC .......... *H04N 19/70* (2014.11); *H04N 19/159* (2014.11); *H04N 19/174* (2014.11);
(Continued)

(58) Field of Classification Search
CPC .... H04N 19/70; H04N 19/159; H04N 19/174; H04N 19/188; H04N 19/107;
(Continued)

(56) References Cited

U.S. PATENT DOCUMENTS 10,158,884 B2   12/2018   Zhang et al.
10,523,964 B2   12/2019   Chuang et al.
(Continued)

FOREIGN PATENT DOCUMENTS

CN   101309409 A   11/2008
CN   104169971 A   11/2014
(Continued)

OTHER PUBLICATIONS

Abe et al. "AHG9: On JCCR Signaling," Joint Video Experts Team (JVET) of ITU-T SG 16 WP 3 and ISO/IEC JTC 1/SC 29/WG 11 17th Meeting: Brussels, BE, Jan. 7-17, 2020, document JVET-Q0147, 2020.
(Continued)

*Primary Examiner* — Maria E Vazquez Colon
(74) *Attorney, Agent, or Firm* — Perkins Coie LLP

(57) ABSTRACT

An example method of video processing includes performing a conversion between a video including a video picture including one or more video units and a bitstream representation of the video. The bitstream representation conforms to a format rule that specifies that a first syntax element is included in a header of the video picture indicating allowed prediction types of at least some of the one or more video units in the video picture.

12 Claims, 15 Drawing Sheets

(51) Int. Cl.
*H04N 19/174* (2014.01)
*H04N 19/169* (2014.01)
*H04N 19/176* (2014.01)
*H04N 19/46* (2014.01)

(52) U.S. Cl.
CPC ......... *H04N 19/176* (2014.11); *H04N 19/188* (2014.11); *H04N 19/46* (2014.11)

(58) Field of Classification Search
CPC .... H04N 19/176; H04N 19/184; H04N 19/46; H04N 19/577; H04N 19/593; H04N 19/463
See application file for complete search history.

(56) References Cited

U.S. PATENT DOCUMENTS

| | | | |
|---|---|---|---|
| 10,779,002 | B2 | 9/2020 | Chen et al. |
| 11,039,165 | B2 | 6/2021 | Liu et al. |
| 11,233,988 | B2 | 1/2022 | Seregin et al. |
| 11,240,531 | B2 | 2/2022 | Liu et al. |
| 11,330,294 | B2 | 5/2022 | Zhen et al. |
| 11,425,417 | B2 | 8/2022 | Liu et al. |
| 11,503,342 | B2 | 11/2022 | Deshpande et al. |
| 2011/0310976 | A1 | 12/2011 | Wang et al. |
| 2012/0189049 | A1 | 7/2012 | Coban et al. |
| 2014/0192887 | A1 | 7/2014 | Hong et al. |
| 2014/0328398 | A1 | 11/2014 | Chen et al. |
| 2015/0023409 | A1 | 1/2015 | Schierl et al. |
| 2015/0201204 | A1 | 7/2015 | Chen et al. |
| 2015/0264348 | A1 | 9/2015 | Zou et al. |
| 2015/0304666 | A1 | 10/2015 | Seregin et al. |
| 2015/0319447 | A1 | 11/2015 | Minoo et al. |
| 2015/0355459 | A1 | 12/2015 | Shen et al. |
| 2016/0277762 | A1 | 9/2016 | Zhang et al. |
| 2017/0201769 | A1* | 7/2017 | Chon ................. H04N 19/593 |
| 2017/0295380 | A1 | 10/2017 | Huang et al. |
| 2018/0241998 | A1 | 8/2018 | Chen et al. |
| 2018/0270502 | A1 | 9/2018 | Mukherjee et al. |
| 2018/0367814 | A1 | 12/2018 | Sergin et al. |
| 2019/0110058 | A1 | 4/2019 | Chien et al. |
| 2019/0141333 | A1 | 5/2019 | Lee |
| 2019/0215537 | A1 | 7/2019 | Poirier et al. |
| 2019/0260990 | A1 | 8/2019 | Lim et al. |
| 2019/0273919 | A1 | 9/2019 | Lim et al. |
| 2020/0396455 | A1 | 12/2020 | Liu et al. |
| 2021/0021812 | A1 | 1/2021 | Zheng et al. |
| 2021/0029378 | A1 | 1/2021 | He et al. |
| 2021/0051335 | A1 | 2/2021 | Liao et al. |
| 2021/0051341 | A1 | 2/2021 | Seregin et al. |
| 2021/0067791 | A1 | 3/2021 | Ye et al. |
| 2021/0067796 | A1 | 3/2021 | Chen et al. |
| 2021/0084311 | A1 | 3/2021 | Seregin et al. |
| 2021/0084315 | A1 | 3/2021 | Chen et al. |
| 2021/0092372 | A1 | 3/2021 | Misra et al. |
| 2021/0105499 | A1 | 4/2021 | Lee |
| 2021/0127112 | A1 | 4/2021 | Choi et al. |
| 2021/0136419 | A1 | 5/2021 | Hsiang |
| 2021/0195179 | A1 | 6/2021 | Coban et al. |
| 2021/0235075 | A1 | 7/2021 | Lee |
| 2021/0250622 | A1* | 8/2021 | Jung ................. H04N 19/174 |
| 2021/0274213 | A1 | 9/2021 | Xiu et al. |
| 2021/0306666 | A1 | 9/2021 | Lee |
| 2021/0314630 | A1 | 10/2021 | Misra et al. |
| 2022/0060735 | A1 | 2/2022 | Chen et al. |
| 2022/0060743 | A1 | 2/2022 | Bordes et al. |
| 2022/0150490 | A1 | 5/2022 | Kuo et al. |
| 2022/0174303 | A1 | 6/2022 | Jang |
| 2022/0217328 | A1 | 7/2022 | Zhang et al. |
| 2022/0232207 | A1 | 7/2022 | Zhang et al. |
| 2022/0239950 | A1 | 7/2022 | Zhang et al. |
| 2022/0264086 | A1 | 8/2022 | Zhang et al. |
| 2022/0264137 | A1 | 8/2022 | Zhang et al. |
| 2022/0272353 | A1 | 8/2022 | Zhang et al. |
| 2022/0353536 | A1 | 11/2022 | Samuelsson et al. |
| 2022/0353537 | A1 | 11/2022 | Deshpande et al. |
| 2022/0394255 | A1 | 12/2022 | Kang et al. |
| 2023/0007264 | A1 | 1/2023 | Koo et al. |

FOREIGN PATENT DOCUMENTS

| | | | |
|---|---|---|---|
| CN | 105122804 A | 12/2015 | |
| CN | 105191315 A | 12/2015 | |
| CN | 105230018 A | 1/2016 | |
| CN | 106664425 A | 5/2017 | |
| CN | 107409209 A | 11/2017 | |
| CN | 107431818 A | 12/2017 | |
| CN | 107483934 A | 12/2017 | |
| CN | 109076221 A | 12/2018 | |
| CN | 109255750 A | 1/2019 | |
| CN | 110169061 A | 8/2019 | |
| CN | 110169073 A | 8/2019 | |
| EP | 2753079 A1 | 7/2014 | |
| EP | 3177018 A1 | 6/2017 | |
| EP | 3939311 A1 | 1/2022 | |
| GB | 2590634 A * | 7/2021 | .......... H04N 19/172 |
| JP | 2022505470 A | 1/2022 | |
| JP | 2022537064 A | 8/2022 | |
| JP | 2022544164 A | 10/2022 | |
| JP | 2022547599 A | 11/2022 | |
| JP | 2022548704 A | 11/2022 | |
| WO | 2013128010 A9 | 9/2013 | |
| WO | 2014167178 A1 | 10/2014 | |
| WO | 2015196117 A1 | 12/2015 | |
| WO | 2016196043 A1 | 12/2016 | |
| WO | 2017133661 A1 | 8/2017 | |
| WO | 2017151343 A1 | 9/2017 | |
| WO | 2018053293 A1 | 3/2018 | |
| WO | 2020009434 A1 | 1/2020 | |
| WO | 2020096755 A1 | 5/2020 | |
| WO | 2020185879 A1 | 9/2020 | |
| WO | 2020247255 A1 | 12/2020 | |
| WO | 2020253858 A1 | 12/2020 | |
| WO | 2020262286 A1 | 12/2020 | |
| WO | 2021026255 A1 | 2/2021 | |
| WO | 2021026363 A1 | 2/2021 | |
| WO | 2021050234 A1 | 3/2021 | |
| WO | 2021068956 A1 | 4/2021 | |
| WO | 2021123326 A1 | 6/2021 | |

OTHER PUBLICATIONS

Bross et al. "Versatile Video Coding (Draft 6)," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O2001, 2019.

Bross et al. "Versatile Video Coding (Draft 7)," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P2001, 2019.

Bross et al. "Versatile Video Coding (Draft 8)," Joint Video Experts Team (JVET) of ITU-T SG 16 WP 3 and ISO/IEC JTC 1/SC 29/WG 11 17th Meeting: Brussels, BE, Jan. 7-17, 2020, document JVET-Q2001, 2020.

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.

Chen et al. "CE4: Affine Merge Enhancement with Simplification (Test 4.2.2)," Joint Video Experts Team (JVET) of ITU-T SG 16 WP 3 and ISO/IEC JTC 1/SC 29/WG 11 12th Meeting: Macao, CN, Oct. 3-12, 2018, document JVET-L0368, 2018.

Chen et al. "AHG 19: Adaptive Resolution Change," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0279, 2019.

Galpin et al. "Non-CE4: Temporal Merge Modes Simplification," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0501, 2019.

(56) References Cited

OTHER PUBLICATIONS

Hannuksela et al. "Use Cases and Proposed Design Choices for Adaptive Resolution Changing (ARC)," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0259, 2019.
Hannuksela et al. "AHG19: On Adaptive Resolution Changing," Joint Video Experts Team (JVET) of ITU-T SG 16 NP 3 and ISO/IEC JTC 1/SC 29/WG 11 14th Meeting: Geneva, CH, Mar. 19-27, 2019, document JVET-N0048, 2019.
Helmrich et al. "CE7-Related: Joint Chroma Residual Coding with Multiple Modes," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0282, 2019.
Hendry et al. "On Adaptive Resolution Change (ARC) for VVC," Joint Video Experts Team (JVET) of ITU-T SG 16 WP 3 and ISO/IEC JTC 1/SC 29/WG 11 13th Meeting: Marrakech, MA, Jan. 9-18, 2019. document JVET-M0135, 2019.
Hong et al. AHG19: "Adaptive Resolution Change (ARC) Support in VVC," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0118, 2019.
"High Efficiency Video Coding," Series H: Audiovisual and Multimedia Systems: Infrastructure of Audiovisual Services—Coding of Moving Video, ITU-T Telecommunication Standardization Sector of ITU, H.265, Feb. 2018.
Lainema et al. "CE7-Related: Joint Coding of Chrominance Residuals," Joint Video Experts Team (JVET) of ITU-T SG 16 WP 3 and ISO/IEC JTC 1/SC 29/WG 11 13th Meeting: Marrakech, MA, Jan. 9-18, 2019 document JVET-M0305, 2019.
Luo et al. "CF?-Related: Prediction Refinement with Optical Flow for Affine Mode," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0236, 2019.
Meng et al. "Non-CE4: Harmonization of PROF, BDOF and DMVR Syntax," Joint Video Experts Team (JVET) of ITU-T SG 16 WP 3 and ISO/IEC JTC 1/SC 29/WG 1 16th Meeting: Geneva, CH, Oct. 1-11, 2019, document JVET-P0314, 2019.
Nalci et al. "Non-CE6: LFNST Signaling at the TU Level," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0569, 2019.
Rosewarne et al. "High Efficiency Video Coding (HEVC) Test Model 16 (HM 16) Improved Encoder Description Update 7," Joint Collaborative Team on Video Coding (JCT-VC) of ITU-T SG16 WP3 and ISO/IEC JTC1/SC29/NG11 25th Meeting: Chengdu, CN, Oct. 14-21, 2016, document JCTVC-Y1002, 2016.
Sanchez et al. "AHG17: On HRD for Open GOP and DRAP," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0495, 2019.
Seregin et al. "AHG8: Scaling Window for Scaling Ratio Derivation," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0590, 2019.
Wan et al. "AHG17: Picture Header," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0239, 2019.
Wan et al. "AHG17: Text for Picture Header," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P1006, 2019.
Wang et al. "CE4-Related: Remove Redundancy between TMVP and ATMVP," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0345, 2019.
Wang et al. "AHG17: On Access Unit Delimiter and Picture Header," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0120, 2019.
Wang et al. "AHG9: Cleanups on Parameter Sets," Joint Video Experts Team (JVET) of ITU-T SG 16 WP 3 and ISO/IEC JTC 1/SC 29/WG 11 17th Meeting: Brussels, BE, Jan. 7-17, 2020, document JVET-Q0117, 2020.
Wenger et al. "[AHG19] On Signaling of Adaptive Resolution Change," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0052, 2019.
Zhang et al. "CE4-related: Interweaved Prediction for Affine Motion Compensation," Joint Video Experts Team (JVET) of ITU-T SG 16 WP 3 and ISO/IEC JTC 1/SC 29/WG 11 11th Meeting: Ljubljana, SI, Jul. 10-18, 2018, document JVET-K0102, 2018.
Zhang et al. "CE2-5.5: History-Parameter-based Affine Model Inheritance," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0263, 2019.
https://vcgit.hhi.fraunhofer.de/jvet/WCSoftware_VTM/tags/VTM-6.0.
JEM-7.0: https://jvet.hhi.fraunhofer.de/svn/svn_HMJEMSoftware/tags/ HM-16.6-JEM-7.0.
International Search Report and Written Opinion from International Patent Application No. PCT/CN2020/116468 dated Nov. 25, 2020 (10 pages).
International Search Report and Written Opinion from International Patent Application No. PCT/CN2020/116469 dated Dec. 4, 2020 (13 pages).
International Search Report and Written Opinion from International Patent Application No. PCT/CN2020/119912 dated Jan. 12, 2021 (12 pages).
International Search Report and Written Opinion from International Patent Application No. PCT/CN2020/119913 dated Jan. 14, 2021 (10 pages).
International Search Report and Written Opinion from International Patent Application No. PCT/CN2020/120288 dated Dec. 30, 2020 (10 pages).
International Search Report and Written Opinion from International Patent Application No. PCT/CN2020/120289 dated Dec. 31, 2020 (8 pages).
International Search Report and Written Opinion from International Patent Application No. PCT/CN2020/120554 dated Jan. 12, 2021 (12 pages).
International Search Report and Written Opinion from International Patent Application No. PCT/CN2020/140044 dated Mar. 31, 2021 (10 pages).
Non Final Office Action from U.S. Appl. No. 17/699,014 dated Jun. 24, 2022.
Ku et al. "CE8-Related: A SPS Level Flag for BDPCM and JCCR," Joint Video Experts Team (JVET) of ITU-T SG 16 WP 3 and ISO/IEC JTC 1/SC 29/WG 11, 15th Meeting, Gothenburg, SE, Jul. 3-12, 2019, document JVET-00376, 2019.
Yang et al. "Subblock-Based Motion Derivation and Interprediction Refinement in the Versatile Video Coding Standard," IEEE Transactions on Circuits and Systems for Video Technology, Oct. 2021 31(10):3862-3877.
Examination Report from Indian Patent Application No. 202247020262 dated Aug. 25, 2022 (5 pages.).
Non Final Office Action from U.S. Appl. No. 17/699,021 dated Jul. 1, 2022.
Non Final Office Action from U.S. Appl. No. 17/713,063 dated Jul. 15, 2022.
Non Final Office Action from U.S. Appl. No. 17/713,104 dated Jul. 22, 2022.
Non Final Office Action from U.S. Appl. No. 17/718,785 dated Aug. 4, 2022.
Non Final Office Action from U.S. Appl. No. 17/719,708 dated Aug. 12, 2022.
Chen et al. "Resampling Process of the Scalable High Efficiency Video Coding," IEEE 2015 Data Compression Conference, Apr. 7-9, 2015. pp 23-32.
Chen et al. "Decoder-Side Motion Vector Refinement Based on Bilateral Template Matching," Joint Video Exploration Team (JVET)

(56) References Cited

OTHER PUBLICATIONS of ITU-T SG 16 WP 3 and ISO/IEC JTC 1/SC 29/WG 11 4th Meeting, Chengdu, CN, Oct. 15-21, 2016, document JVET-D0029, 2016.

Chen et al. "CE1-Related: Enable PROF for RPR," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0409, 2019.

Deng et al. "AHG9: PH and SH Syntax Cleanups," Joint Video Experts Team (JVET) of ITU-T SG 16 WP 3 and ISO/IEC JTC 1/SC 29/WG 11 17th Meeting: Brussels, BE, Jan. 7-17, 2020, document JVET-Q0116, 2020.

"Information Technology—Generic Coding of Moving Pictures and Associated Audio Information—Part 2: Video," ISDO/IEC 13818-2: 2013, IEC 3, Rue De Varembe, Geneva CH, Sep. 27, 2013, pp. 1-225, XP082007972.

Sullivan et al. "Meeting Report of nthe 15th Meeting of the Joint Video Experts Team (JVET), Gothenburg, SE, Jul. 3-12, 2019," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O2000, 2019.

Wang et al. "AHG9: Cleanups on Signaling for CC-ALF, BDPCM, ACT and Palette," Joint Video Experts Team (JVET) of ITU-T SG 16 WP 3 and ISO/IEC JTC 1/SC 29/WG 11 17th Meeting: Brussels, BE, Jan. 7-17, 2020, document JVET-Q0520, 2020.

Xu et al. "AHG 9: Picture Header Syntax Cleanups" Joint Video Experts Team (JVET) of ITU-T SG 16 WP 3 and ISO/IEC JTC 1/SC 29/WG 11 17th Meeting: Brussels, BE, Jan. 7-17, 2020, document JVET-Q0428, 2020.

Zhang et al. "Non-CE1: A Fix on Reference Sample Offset for RPR," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0381, 2019.

Zhou et al. "JVET AHG Report: Implementation Studies (AHG16)," Joint Video Exploration Team (JVET) of ITU-T SG 16 WP 3 and ISO/IEC JTC 1/SC 29/WG 11 16th Meeting: Geneva, CH, Oct. 1-11, 2019, document JVET-P0016, 2019.

Extended European Search Report from European Patent No. 20866342.7dated Oct. 31, 2022 (12 pages).

Extended European Search Report from European Patent No. 20866741.0 dated Nov. 7, 2022 (11 pages).

Extended European Search Report from European Patent No. 20874792.3 dated Nov. 3, 2022 (9 pages).

Extended European Search Report from European Patent No. 20876825.9 dated Oct. 31, 2022 (10 pages).

Extended European Search Report from European Patent No. 20874449.0 dated Dec. 21, 2022 (12 pages).

Extended European Search Report from European Patent No. 20906207.4 dated Dec. 20, 2022 (12 pages).

Final Office Action from U.S. Appl. No. 17/699,021 dated Nov. 15, 2022.

Final Office Action from U.S. Appl. No. 17/713,063 dated Nov. 25, 2022.

Notice of Allowance from U.S. Appl. No. 17/718,785 dated Dec. 7, 2022.

Notice of Allowance from U.S. Appl. No. 17/719,708 dated Dec. 23, 2022.

Non Final Office Action from U.S. Appl. No. 17/849,293 dated Jan. 20, 2023.

Notice of Allowance from U.S. Appl. No. 17/699,021 dated Mar. 29, 2023.

Notice of Allowance from U.S. Appl. No. 17/713,063 dated Apr. 27, 2023.

"Advanced Video Coding for Generic Audiovisual Services," Series H: Audiovisual and Multimedia Systems, Infrastructure of Audiovisual Services—Coding of Moving Video, ITU-T Telecommunication Standardization Sector of ITU, H.264, Jan. 2012. pp. 19,20,42,43,72, (Table 6-1; 8 lines just after Table 6-1; p. 72, lines 32-47. (cited in JP2022-520782 OA dated Apr. 25, 2023).

Bross et al. "Versatile Video Coding (Draft 10)," Joint Video Experts Team (JVET) of ITU-T SG 16 WP 3 and ISO/IEC JTC 1/SC 29/WG 11 19th Meeting, by teleconference, Jun. 22-Jul. 1, 2020, document JVET-S2001, 2020. (JP2022-517817 OA dated Feb. 21, 2023).

Hendry et al. "AHG8: Support for Reference Picture Resampling—Handling of Picture Size Signalling, Conformative Windows, and DPB Management," Joint Video Experts Team (JVET) of ITU-T SG 16 WP 3 and ISO/IEC JTC 1/SC 29/WG 11 15th Meeting, Gothenburgm SE, Jul. 3-12, 2019, document JVET-00133, 2019. (cited in JP2022-517817 OA dated Feb. 21, 2023).

Suehring et al. "AHG17: Conformance Window," Joint Video Experts Team (JVET) of ITU-T SG 16 WP 3 and ISO/IEC JTC 1/SC 29/WG 11 14th Meeting, Geneva, CH, Mar. 19-27, 2019, document JVET-N0352, 2019. (cited in JP2022-517817 OA dated Feb. 21, 2023).

* cited by examiner

FIG. 3B
FIG. 3C

PREDICTION TYPE SIGNALING IN VIDEO CODING

CROSS REFERENCE TO RELATED APPLICATIONS

This application is a continuation of International Patent Application No. PCT/CN2020/120289, filed on Oct. 12, 2020, which claims the priority to and benefits of International Patent Application No. PCT/CN2019/110902, filed on Oct. 12, 2019. All the aforementioned patent applications are hereby incorporated by reference in their entireties.

TECHNICAL FIELD

This patent document relates to video coding techniques, devices and systems.

BACKGROUND

Currently, efforts are underway to improve the performance of current video codec technologies to provide better compression ratios or provide video coding and decoding schemes that allow for lower complexity or parallelized implementations. Industry experts have recently proposed several new video coding tools and tests are currently underway for determining their effectivity.

SUMMARY

Devices, systems and methods related to digital video coding, and specifically, to management of motion vectors are described. The described methods may be applied to existing video coding standards (e.g., High Efficiency Video Coding (HEVC) or Versatile Video Coding) and future video coding standards or video codecs.

In one representative aspect, the disclosed technology may be used to provide a method for video processing. This method includes performing a conversion between a video and a bitstream representation of the video. The bitstream representation conforms to a format rule that specifies that applicability of a Decoder-side Motion Vector Refinement coding tool and a Bi-Directional Optical Flow coding tool for the video picture are indicated separately in the bitstream representation.

In another representative aspect, the disclosed technology may be used to provide a method for video processing. This method includes performing a conversion between a video picture of a video and a bitstream representation of the video. The bitstream representation conforms to a format rule specifying that usage of a coding tool is indicated in a picture header corresponding to the video picture.

In another representative aspect, the disclosed technology may be used to provide a method for video processing. This method includes performing a conversion between a video comprising a video picture comprising one or more video units and a bitstream representation of the video. The bitstream representation conforms to a format rule that specifies that a first syntax element is included in a picture header indicating allowed prediction types of at least some of the one or more video units in the video picture.

In another representative aspect, the disclosed technology may be used to provide a method for video processing. This method includes performing a conversion between a current video block and a coded representation of the current video block, wherein, during the conversion, if a resolution and/or a size of a reference picture is different from a resolution and/or a size of the current video block, a same interpolation filter is applied to a group of adjacent or non-adjacent samples predicted using the current video block.

In another representative aspect, the disclosed technology may be used to provide another method for video processing. This method includes performing a conversion between a current video block and a coded representation of the current video block, wherein, during the conversion, if a resolution and/or a size of a reference picture is different from a resolution and/or a size of the current video block, wherein blocks predicted using the current video block are only allowed to use integer-valued motion information related to the current block.

In another representative aspect, the disclosed technology may be used to provide another method for video processing. This method includes performing a conversion between a current video block and a coded representation of the current video block, wherein, during the conversion, if a resolution and/or a size of a reference picture is different from a resolution and/or a size of the current video block, an interpolation filter is applied to derive blocks predicted using the current video block, and wherein the interpolation filter is selected based on a rule.

In another representative aspect, the disclosed technology may be used to provide another method for video processing. This method includes performing a conversion between a current video block and a coded representation of the current video block, wherein, during the conversion, if a resolution and/or a size of a reference picture is different from a resolution and/or a size of the current video block, selectively applying a deblocking filter, wherein a strength of the deblocking filter set in accordance with a rule related to the resolution and/or the size of the reference picture relative to the resolution and/or the size of the current video block.

In another representative aspect, the disclosed technology may be used to provide another method for video processing. This method includes performing a conversion between a current video block and a coded representation of the current video block, wherein, during the conversion, a reference picture of the current video block is resampled in accordance with a rule based on dimensions of the current video block.

In another representative aspect, the disclosed technology may be used to provide another method for video processing. This method includes performing a conversion between a current video block and a coded representation of the current video block, wherein, during the conversion, a use of a coding tool on the current video block is selectively enabled or disabled depending on a resolution/size of a reference picture of the current video block relative to a resolution/size of the current video block.

In another representative aspect, the disclosed technology may be used to provide another method for video processing. This method includes performing a conversion between multiple video blocks and coded representations of the multiple video blocks, wherein, during the conversion, a first conformance window is defined for a first video block and a second conformance window for a second video block, and wherein a ratio of a width and/or a height of the first conformance window to the second conformance window is in accordance with a rule based at least on a conformance bitstream.

In another representative aspect, the disclosed technology may be used to provide another method for video processing. This method includes performing a conversion between multiple video blocks and coded representations of the multiple video blocks, wherein, during the conversion, a first conformance window is defined for a first video block and a second conformance window for a second video block, and wherein a ratio of a width and/or a height of the first conformance window to the second conformance window is in accordance with a rule based at least on a conformance bitstream.

Further, in a representative aspect, an apparatus in a video system comprising a processor and a non-transitory memory with instructions thereon is disclosed. The instructions upon execution by the processor, cause the processor to implement any one or more of the disclosed methods.

In one representative aspect, a video decoding apparatus comprising a processor configured to implement a method recited herein is disclosed.

In one representative aspect, a video encoding apparatus comprising a processor configured to implement a method recited herein is disclosed.

Also, a computer program product stored on a non-transitory computer readable media, the computer program product including program code for carrying out any one or more of the disclosed methods is disclosed.

The above and other aspects and features of the disclosed technology are described in greater detail in the drawings, the description and the claims.

BRIEF DESCRIPTION OF THE DRAWINGS

FIG. 3B shows another example of a specific position in a sample.

FIG. 3C shows yet another example of a specific position in a sample.

DETAILED DESCRIPTION

1. Video Coding in HEVC/H.265

Figure 1:
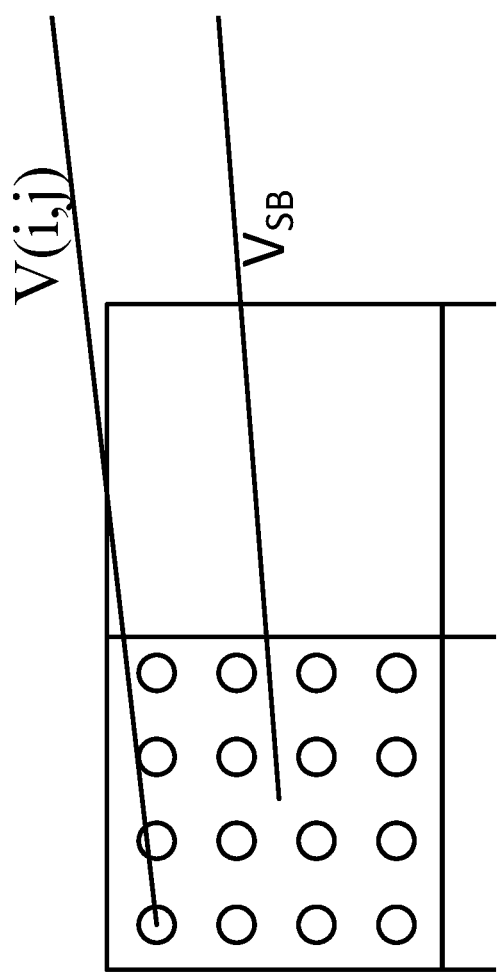
FIG. 1 shows an example of sub-block motion vector (VSB) and motion vector difference.

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

2. Overview 2.1. Adaptive Resolution Change (ARC)

AVC and HEVC does not have the ability to change resolution without having to introduce an IDR or intra random access point (IRAP) picture; such ability can be referred to as adaptive resolution change (ARC). There are use cases or application scenarios that would benefit from an ARC feature, including the following:

Rate adaption in video telephony and conferencing: For adapting the coded video to the changing network conditions, when the network condition gets worse so that available bandwidth becomes lower, the encoder may adapt to it by encoding smaller resolution pictures. Currently, changing picture resolution can be done only after an IRAP picture; this has several issues. An IRAP picture at reasonable quality will be much larger than an inter-coded picture and will be correspondingly more complex to decode: this costs time and resource. This is a problem if the resolution change is requested by the decoder for loading reasons. It can also break low-latency buffer conditions, forcing an audio re-sync, and the end-to-end delay of the stream will increase, at least temporarily. This can give a poor user experience.

Active speaker changes in multi-party video conferencing: For multi-party video conferencing, it is common that the active speaker is shown in bigger video size than the video for the rest of conference participants. When the active speaker changes, picture resolution for each participant may also need to be adjusted. The need to have ARC feature becomes more important when such change in active speaker happens frequently.

Fast start in streaming: For streaming application, it is common that the application would buffer up to certain length of decoded picture before start displaying. Starting the bitstream with smaller resolution would allow the application to have enough pictures in the buffer to start displaying faster.

Adaptive stream switching in streaming: The Dynamic Adaptive Streaming over HTTP (DASH) specification includes a feature named @mediaStreamStructureId. This enables switching between different representations at open-GOP random access points with non-decodable leading pictures, e.g., CRA pictures with associated RASL pictures in HEVC. When two different representations of the same video have different bitrates but the same spatial resolution while they have the same value of @mediaStreamStructureId, switching between the two representations at a CRA picture with associated RASL pictures can be performed, and the RASL pictures associated with the switching-at CRA pictures can be decoded with acceptable quality hence enabling seamless switching. With ARC, the @mediaStreamStructureId feature would also be usable for switching between DASH representations with different spatial resolutions.

ARC is also known as Dynamic resolution conversion.

ARC may also be regarded as a special case of Reference Picture Resampling (RPR) such as H.263 Annex P.

2.2. Reference Picture Resampling in 11.263 Annex P

This mode describes an algorithm to warp the reference picture prior to its use for prediction. It can be useful for resampling a reference picture having a different source format than the picture being predicted. It can also be used for global motion estimation, or estimation of rotating motion, by warping the shape, size, and location of the reference picture. The syntax includes warping parameters to be used as well as a resampling algorithm. The simplest level of operation for the reference picture resampling mode is an implicit factor of 4 resampling as only an FIR filter needs to be applied for the upsampling and downsampling processes. In this case, no additional signaling overhead is required as its use is understood when the size of a new picture (indicated in the picture header) is different from that of the previous picture.

2.3. Conformance Window in VVC

Conformance window in VVC defines a rectangle. Samples inside the conformance window belongs to the image of interest. Samples outside the conformance window may be discarded when output.

When conformance window is applied, the scaling ration in RPR is derived based on conformance windows.

Picture Parameter Set RBSP Syntax

| pic_parameter_set_rbsp( ) { | Descriptor |
|---|---|
| pps_pic_parameter_set_id | ue(v) |
| pps_seq_parameter_set_id | ue(v) |
| pic_width_in_luma_samples | ue(v) |
| pic_height_in_luma_samples | ue(v) |
| _conformancewindow_flag_ | _u(1)_ |
| _if(conformance_window_flag){_ | |
| _conf_win_left_offset_ | _ue(v)_ |
| _conf_win_right_offset_ | _ue(v)_ |
| _conf_win_top_offset_ | _ue(v)_ |
| _conf_win_bottom_offset_ | _ue(v)_ |
| } | |
|  | ue(v) | pic_width_in_luma_samples specifies the width of each decoded picture referring to the PPS in units of luma samples. pic_width_in_luma_samples shall not be equal to 0, shall be an integer multiple of Max(8, MinCbSizeY), and shall be less than or equal to pic_width_max_in_luma_samples.

When subpics_present_flag is equal to 1, the value of pic_width_in_luma_samples shall be equal to pic_width_max_in_luma_samples.

pic_height_in_luma_samples specifies the height of each decoded picture referring to the PPS in units of luma samples. pic_height_in_luma_samples shall not be equal to 0 and shall be an integer multiple of Max(8, MinCbSizeY), and shall be less than or equal to pic_height_max_in_luma_samples.

When subpics_present_flag is equal to 1, the value of pic_height_in_luma_samples shall be equal to pic_height_max_in_luma_samples.

Let refPicWidthInLumaSamples and refPicHeightInLumaSamples be the pic_width_in_luma_samples and pic_height_in_luma_samples, respectively, of a reference picture of a current picture referring to this PPS. Is a requirement of bitstream conformance that all of the following conditions are satisfied:

- _pic_width_ in_luma_ samples*2 shall be greater than or equal to refPicWidth In LumaSamples._
- _pic_height_ in_luma_samples * 2 shall be greater than or equal to refPicHeight InLumaSamples._
- _pic_width _in_luma_samples shall be less than or equal to refPicWidthIn LumaSamples * 8._
- _pic_height_ in_luma_samples shall be less than or equal to refPicHeight InLuma Samples * 8._ conformance_window_flag equal to 1 indicates that the conformance cropping window offset parameters follow next in the SPS. conformance_window_flag equal to 0 indicates that the conformance cropping window offset parameters are not present.

conf_win_left_offset, conf_win_right_offset, conf_win_top_offset, and conf_win_bottom_offset specify the samples of the pictures in the CVS that are output from the decoding process, in terms of a rectangular region specified in picture coordinates for output. When conformance_window_flag is equal to 0, the values of conf_win_left_offset, conf_win_right_offset, conf_win_top_offset, and conf_win_bottom_offset are inferred to be equal to 0.

The conformance cropping window contains the luma samples with horizontal picture coordinates from SubWidthC*conf_win_left_offset to pic_width_in_luma_samples−(SubWidthC*conf_win_right_offset+1) and vertical picture coordinates from SubHeightC*conf_win_top_offset to pic_height_in_luma_samples−(SubHeightC*conf_win_bottom_offset+1), inclusive.

The value of SubWidthC*(conf_win_left_offset+conf_win_right_offset) shall be less than pic_width_in_luma_samples, and the value of SubHeightC* (conf_win_top_offset+conf_win_bottom_offset) shall be less than pic_height_in_luma_samples.

The variables PicOutputWidthL and PicOutputHeightL are derived as follows:

PicOutputWidth*L*=pic_width_in_luma_samples−SubWidth*C**(conf_win_right_offset+conf_win_left_offset) (7-43)

PicOutputHeight*L*=pic_height_in_pic_size_units−SubHeight*C**(conf_win_bottom_offset+conf_win_top_offset) (7-44)

When ChromaArrayType is not equal to 0, the corresponding specified samples of the two chroma army s are the samples having picture coordinates (x/SubWidthC, y/SubHeightC), where (x, y) are the picture coordinates of the specified luma samples.

NOTE- _The conformance cropping window offset parameters are only applied at the output._

*All internal decoding processes are applied to the uncropped picture size.*

Let ppsA and ppsB be any two PPSs referring to the same SPS. It is a requirement of bitstream conformance that, when ppsA and ppsB have the same the values of pic_width_in_luma_samples and pic_height_in_luma_samples, respectively, ppsA and ppsB shall have the same values of conf_win_left_offset, conf_win_right_offset, conf_win_top_offset, and conf_win_bottom_offset, respectively.

2.4. Reference Picture Resampling (RPR)

In some embodiments, ARC is also known as Reference Picture Resampling (RPR). With RPR, TMVP is disabled if the collocated picture has a different resolution to the current picture. Besides, Bi-Directional Optical Flow (BDOF) and Decoder-side Motion Vector Refinement (DMVR) are disabled when the reference picture has a different resolution to the current picture.

To handle the normal MC when the reference picture has a different resolution than the current picture, the interpolation section is defined as below:

8.5.6.3 Fractional Sample Interpolation Process
8.5.6.3.1 General
Inputs to this process are:
- a luma location (xSb, ySb) specifying the top-left sample of the current coding subblock relative to the top-left luma sample of the current picture,
- a variable sbWidth specifying the width of the current coding subblock,
- a variable sbHeight specifying the height of the current coding subblock,
- a motion vector offset mvOffset,
- a refined motion vector refMvLX,
- the selected reference picture sample array refPicLX,
- the half sample interpolation filter index hpelIfIdx,
- the bi-directional optical flow flag bdofFlag,
- a variable cIdx specifying the colour component index of the current block.

Outputs of this process are:
- an (sbWidth+brdExtSize)x(sbHeight+brdExtSize) array predSamplesLX of prediction sample values.

The prediction block border extension size brdExtSize is derived as follows:

$$\text{brdExtSize} = (\text{bdofFlag} \| (\text{inter\_affine\_flag}[xSb][ySb] \&\& sps\_\text{affine\_prof\_enabled\_flag}))?2:0 \quad (8\text{-}752)$$

The variable fRefWidth is set equal to the PicOutputWidthL of the reference picture in luma samples.

The variable fRefHeight is set equal to PicOutputHeightL of the reference picture in luma samples.

The motion vector mvLX is set equal to (refMvLX−mvOffset).

If cIdx is equal to 0, the following applies:
  The scaling factors and their fixed-point representations are defined as $$\text{hori\_scale\_}fp = ((\text{fRefWidth} \ll 14) + (\text{PicOutputWidth}L \gg 1))/\text{PicOutputWidth}L \quad (8\text{-}753)$$

$$\text{vert\_scale\_}fp = ((\text{fRefHeight} \ll 14) + (\text{PicOutputHeight}L \gg 1))/\text{PicOutputHeight}L \quad (8\text{-}754)$$

Let (xIntL, yIntL) be a luma location given in full-sample units and (xFracL, yFracL) be an offset given in 1/16-sample units. These variables are used only in this clause for specifying fractional-sample locations inside the reference sample arrays refPicLX.

The top-left coordinate of the bounding block for reference sample padding $(xSbInt_L, ySbInt_L)$ is set equal to $(xSb+(mvLX[0]\gg 4), ySb+(mvLX[1]\gg 4))$.

For each luma sample location $(x_L=0 \ldots \text{sbWidth}-1+\text{brdExtSize}, y_L=0 \ldots \text{sbHeight}-1+\text{brdExtSize})$ inside the prediction luma sample array predSamplesLX, the corresponding prediction luma sample value predSamplesLX$[x_L][y_L]$ is derived as follows:

Let $(\text{refxSb}_L, \text{refySb}_L)$ and $(\text{refx}_L, \text{refy}_L)$ be luma locations pointed to by a motion vector (refMvLX[0], refMvLX[1]) given in 1/16-sample units. The variables $\text{refxSb}_L$, $\text{refx}_L$, $\text{refySb}_L$, and $\text{refy}_L$ are derived as follows:

$$\text{refySb}_L = ((xSb \ll 4) + \text{refMv}LX[0]) * \text{hori\_scale\_}fp \quad (8\text{-}755)$$

$$\text{refx}_L = ((\text{Sign}(\text{refxSb}) * ((\text{Abs}(\text{refxSb})+128) \gg 8) + x_L * ((\text{hori\_scale\_}fp+8) \gg 4)) + 32) \gg 6 \quad (8\text{-}756)$$

$$\text{refySb}_L = ((ySb \ll 4) + \text{refMv}LX[1]) * \text{vert\_scale\_}fp \quad (8\text{-}757)$$

$$\text{refy}L = ((\text{Sign}(\text{refySb}) * ((\text{Abs}(\text{refySb})+128) \gg 8) + yL * ((\text{vert\_scale\_}fp+8) \gg 4)) + 32) \gg 6 \quad (8\text{-}758)$$

The variables $\text{xInt}_L$, $\text{yInt}_L$, xFracL and $\text{yFrac}_L$ are derived as follows:

$$x\text{Int}_L = \text{refx}_L \gg 4 \quad (8\text{-}759)$$

$$y\text{Int}_L = \text{refy}_L \gg 4 \quad (8\text{-}760)$$

$$x\text{Frac}_L = \text{refx}_L \,\&\, 15 \quad (8\text{-}761)$$

$$y\text{Frac}_L = \text{refy}_L \,\&\, 15 \quad (8\text{-}762)$$

If bdofFlag is equal to TRUE or (sps_affine_prof_enabled_flag is equal to TRUE and inter_affine_flag[xSb][ySb] is equal to TRUE), and one or more of the following conditions are true, the prediction luma sample value predSamplesLX$[x_L][y_L]$ is derived by invoking the luma integer sample fetching process as specified in clause 8.5.6.3.3 with $(x\text{Int}_L+(x\text{Frac}_L\gg 3)-1)$, $y\text{Int}_L+(y\text{Frac}_L\gg 3)-1)$ and refPicLX as inputs.
  $x_L$ is equal to 0.
  $x_L$ is equal to sbWidth+1.
  $y_L$ is equal to 0.
  $y_L$ is equal to sbHeight+1.

Otherwise, the prediction luma sample value predSamplesLX$[x_L][y_L]$ is derived by invoking the lumasample 8-tap interpolation filtering process as specified in clause 8.5.6.3.2 with $(x\text{Int}_L-(\text{brdExtSize}>0? 1:0), y\text{Int}_L-(\text{brdExtSize}>0? 1:0))$, (xFracL, yFracL), $(xSbInt_L, ySbInt_L)$, refPicLX, hpelIfIdx, sbWidth, sbHeight and (xSb, ySb) as inputs.

Otherwise (cIdx is not equal to 0), the following applies:
  Let (xIntC, yIntC) be a chromalocation given in full-sample units and (xFracC, yFracC) be an offset given in 1/32 sample units. These variables are used only in this clause for specifying general fractional-sample locations inside the reference sample arrays refPicLX.

The top-left coordinate of the bounding block for reference sample padding (xSbIntC, ySbIntC) is set equal to $((xSb/\text{SubWidthC})+(mvLX[0]\gg 5), (ySb/\text{SubHeightC})+(mvLX[1]\gg 5))$.

For each chroma sample location (xC=0 . . . sbWidth−1, yC=0 . . . sbHeight−1) inside the prediction chroma sample arrays predSamplesLX, the corresponding prediction chroma sample value pred Samples LX[xC][yC] is derived as follows:

Let (refxSb$_C$, refySb$_C$) and (refx$_C$, refy$_C$) be chroma locations pointed to by a motion vector (mvLX[0], mvLX[1]) given in 1/32-sample units. The variables refxSb$_C$, refySb$_C$, refx$_C$ and refy$_C$ are derived as follows:

refxSb$_C$=((xSb/SubWidthC<<5)+
    mvLX[0])*hori_scale_fp    (8-763)

refx$_C$=((Sign(refxSb$_C$)*((Abs(refxSb$_C$)+256)>>9)+
    xC*((hori_scale_fp+8)>>4))+16)>>5    (8-764)

refySb$_C$=((ySb/SubHeightC<<5)+mvLX[1])*vert_s-
    cale_fp    (8-765)

refy$_C$=((Sign(refySb$_C$)*((Abs(refySb$_C$)+256)>>9)+
    yC*((vert_scale_fp+8)>>4))+16)>>5    (8-766)

The variables xInt$_C$, yInt$_C$, xFrac$_C$ and yFrac$_C$ are derived as follows:

xInt$_C$=refx$_C$>>5    (8-767)

yInt$_C$=refy$_C$>>5    (8-768)

xFrac$_C$=refy$_C$ & 31    (8-769)

yFrac$_C$=refy$_C$ & 31    (8-770)

The prediction sample value predSamplesLX[xC][yC] is derived by invoking the process specified in clause 8.5.6.3.4 with (xIntC, yIntC), (xFracC, yFracC), (xSbIntC, ySbIntC), sbWidth, sbHeight and refPicLX as inputs.

8.5.6.3.2 Luma Sample Interpolation Filtering Process
Inputs to this process are:
- a luma location in full-sample units (xInt$_L$, yInt$_L$),
- a luma location in fractional-sample units (xFrac$_L$, yFrac$_L$),
- a luma location in full-sample units (xSbInt$_L$, ySbInt$_L$) specifying the top-left sample of the bounding block for reference sample padding relative to the top-left luma sample of the reference picture,
- the luma reference sample array refPicLX$_L$,
- the half sample interpolation filter index hpelIfIdx,
- a variable sbWidth specifying the width of the current subblock,
- a variable sbHeight specifying the height of the current subblock,
- a luma location (xSb, ySb) specifying the top-left sample of the current subblock relative to the top-left lumasample of the current picture, Output of this process is a predicted luma sample value predSampleLX$_L$ The variables shift1, shift2 and shift3 are derived as follows:
   The variable shift1 is set equal to Min(4, BitDepth$_Y$−8), the variable shift2 is set equal to 6 and the variable shift3 is set equal to Max(2, 14−BitDepth$_Y$).
   The variable picW is set equal to pic_width_in_luma_samples and the variable picH is set equal to pic_height_in_luma_samples.

The luma interpolation filter coefficients f$_L$[p] for each 1/16 fractional sample position p equal to xFrac$_L$ or yFrac$_L$, are derived as follows:

If MotionModelIdc[xSb][ySb] is greater than 0, and sbWidth and sbHeight are both equal to 4, the luma interpolation filter coefficients f$_L$[p] are specified in Table 2.

Otherwise, the luma interpolation filter coefficients f$_L$[p] are specified in Table 1 depending on hpelIfIdx.

The luma locations in full-sample units (xInt$_i$, yInt$_i$) are derived as follows for i=0 . . . 7:

If subpic_treated_as_pic_flag[SubPicIdx] is equal to 1, the following applies:

xInt$_i$=Clip3(SubPicLeftBoundaryPos,SubPicRight-
    BoundaryPos,xInt$_L$+i−3)    (8-771)

yInt$_i$=Clip3(SubPicTopBoundaryPos,SubPicBot-
    BoundaryPos,yInt$_L$+i−3)    (8-772)

Otherwise (subpic_treated_as_pic_flag[SubPicIdx] is equal to 0), the following applies:

xInt$_i$=Clip3(0,picW−1,sps_ref_wraparound_
    enabled_flag?ClipH((sps_ref_wraparound_off-
    set_minus1+1)*MinCbSizeY,picW,xInt$_L$+i−3):
    xInt$_L$+i−3)    (8-773)

yInt$_i$=Clip3(0,picH−1,yInt$_L$+i−3)    (8-774)

The luma locations in full-sample units are further modified as follows for i=0 . . . 7:

xInt$_i$=Clip3(xSbInt$_L$−3,xSbInt$_L$+sbWidth+4,xInt$_i$)    (8-775)

yInt$_i$=Clip3(ySbInt$_L$−3,ySbInt$_L$+sbHeight+4,yInt$_i$)    (8-776)

The predicted luma sample value predSampleLX$_L$ is derived as follows:

If both xFrac$_L$ and yFrac$_L$ are equal to 0, the value of predSampleLX$_L$ is derived as follows:

predSampleLX$_L$=refPicLX$_L$[xInt$_3$][yInt$_3$]<<shift3    (8-777)

Otherwise, if xFrac$_L$ is not equal to 0 and yFrac$_L$ is equal to 0, the value of predSampleLX$_L$ is derived as follows:

predSampleLX$_L$=($\Sigma_{i=0}^{7}$f$_L$[xFrac$_L$][i]*refPicLX$_L$[xInt$_i$]
    [yInt$_3$])>>shift1    (8-778)

Otherwise, if xFrac$_L$ is equal to 0 and yFrac$_L$ is not equal to 0, the value of predSampleLX$_L$ is derived as follows:

predSampleLX$_L$=($\Sigma_{i=0}^{7}$f$_L$[yFrac$_L$][i]*refPicLX$_L$[xInt$_3$]
    [yInt$_i$])>>shift1    (8-779)

Otherwise, if xFrac$_L$ is not equal to 0 and yFrac$_L$ is not equal to 0, the value of predSampleLX$_L$ is derived as follows:

The sample array temp[n] with n=0 . . . 7, is derived as follows:

temp[n]=($\Sigma_{i=0}^{7}$f$_L$[xFrac$_L$][i]*refPicLX$_L$[xInt$_i$][yInt$_n$])
    >>shift1    (8-780)

The predicted luma sample value predSampleLX$_L$ is derived as follows:

predSampleLX$_L$=($\Sigma_{i=0}^{7}$f$_L$[yFrac$_L$][i]*temp[i])>>shift2    (8-781)

TABLE 8-11

Specification of the luma interpolation filter coefficients $f_L[p]$
for each 1/16 fractional sample position p.

| Fractional sample position p | interpolation filter coefficients | | | | | | | |
|---|---|---|---|---|---|---|---|---|
| | $f_L[p][0]$ | $f_L[p][1]$ | $f_L[p][2]$ | $f_L[p][3]$ | $f_L[p][4]$ | $f_L[p][5]$ | $f_L[p][6]$ | $f_L[p][7]$ |
| 1 | 0 | 1 | −3 | 63 | 4 | −2 | 1 | 0 |
| 2 | −1 | 2 | −5 | 62 | 8 | −3 | 1 | 0 |
| 3 | −1 | 3 | −8 | 60 | 13 | −4 | 1 | 0 |
| 4 | −1 | 4 | −10 | 58 | 17 | −5 | 1 | 0 |
| 5 | −1 | 4 | −11 | 52 | 26 | −8 | 3 | −1 |
| 6 | −1 | 3 | −9 | 47 | 31 | −10 | 4 | −1 |
| 7 | −1 | 4 | −11 | 45 | 34 | −10 | 4 | −1 |
| 8 (hpelIfIdx == 0) | −1 | 4 | −11 | 40 | 40 | −11 | 4 | −1 |
| 8 (hpelIfIdx == 1) | 0 | 3 | 9 | 20 | 20 | 9 | 3 | 0 |
| 9 | −1 | 4 | −10 | 34 | 45 | −11 | 4 | −1 |
| 10 | −1 | 4 | −10 | 31 | 47 | −9 | 3 | −1 |
| 11 | −1 | 3 | −8 | 26 | 52 | −11 | 4 | −1 |
| 12 | 0 | 1 | −5 | 17 | 58 | −10 | 4 | −1 |
| 13 | 0 | 1 | −4 | 13 | 60 | −8 | 3 | −1 |
| 14 | 0 | 1 | −3 | 8 | 62 | −5 | 2 | −1 |
| 15 | 0 | 1 | −2 | 4 | 63 | −3 | 1 | 0 |

TABLE 8-12

Specification of the luma interpolation filter coefficients $f_L[p]$
for each 1/16 fractional sample position p for affine motion mode.

| Fractional sample position p | interpolation filter coefficients | | | | | | | |
|---|---|---|---|---|---|---|---|---|
| | $f_L[p][0]$ | $f_L[p][1]$ | $f_L[p][2]$ | $f_L[p][3]$ | $f_L[p][4]$ | $f_L[p][5]$ | $f_L[p][6]$ | $f_L[p][7]$ |
| 1 | 0 | 1 | −3 | 63 | 4 | −2 | 1 | 0 |
| 2 | 0 | 1 | −5 | 62 | 8 | −3 | 1 | 0 |
| 3 | 0 | 2 | −8 | 60 | 13 | −4 | 1 | 0 |
| 4 | 0 | 3 | −10 | 58 | 17 | −5 | 1 | 0 |
| 5 | 0 | 3 | −11 | 52 | 26 | −8 | 2 | 0 |
| 6 | 0 | 2 | −9 | 47 | 31 | −10 | 3 | 0 |
| 7 | 0 | 3 | −11 | 45 | 34 | −10 | 3 | 0 |
| 8 | 0 | 3 | −11 | 40 | 40 | −11 | 3 | 0 |
| 9 | 0 | 3 | −10 | 34 | 45 | −11 | 3 | 0 |
| 10 | 0 | 3 | −10 | 31 | 47 | −9 | 2 | 0 |
| 11 | 0 | 2 | −8 | 26 | 52 | −11 | 3 | 0 |
| 12 | 0 | 1 | −5 | 17 | 58 | −10 | 3 | 0 |
| 13 | 0 | 1 | −4 | 13 | 60 | −8 | 2 | 0 |
| 14 | 0 | 1 | −3 | 8 | 62 | −5 | 1 | 0 |
| 15 | 0 | 1 | −2 | 4 | 63 | −3 | 1 | 0 |

8.5.6.3.3 Luma Integer Sample Fetching Process
Inputs to this process are:
 a luma location in full-sample units ($xInt_L$, $yInt_L$),
 the luma reference sample array $refPicLX_L$,
Output of this process is a predicted luma sample value $predSampleLX_L$
The variable shift is set equal to Max(2, 14−$BitDepth_Y$).
The variable picW is set equal to pic_width_in_luma_samples and the variable picH is set equal to pic_height_in_luma_samples.
The luma locations in full-sample units (xInt, yInt) are derived as follows:

$xInt$=Clip3(0,picW−1,sps_ref_wraparound_enabled_flag?ClipH((sps_ref_wraparound_offset_minus1+1)*MinCbSizeY,picW,$xInt_L$):$xInt_L$) (8-782)

$yInt$=Clip3(0,picH−1,$yInt_L$) (8-783)

The predicted luma sample value $predSampleLX_L$ is derived as follows:

$predSampleLX_L$=$refPicLX_L$[xInt][yInt]<<shift3 (8-784)

8.5.6.3.4 Chroma Sample Interpolation Process
Inputs to this process are:
 a chroma location in full-sample units ($xInt_C$, $yInt_C$),
 a chroma location in 1/32 fractional-sample units ($xFrac_C$, $yFrac_C$),
 a chroma location in full-sample units (xSbIntC, ySbIntC) specifying the top-left sample of the bounding block for reference sample padding relative to the top-left chroma sample of the reference picture,
 a variable sbWidth specifying the width of the current subblock,
 a variable sbHeight specifying the height of the current subblock,
 the chroma reference sample array $refPicLX_C$.

Output of this process is a predicted chroma sample value predSampleLX$_C$

The variables shift1, shift2 and shift3 are derived as follows:

The variable shift1 is set equal to Min(4, BitDepth$_C$−8), the variable shift2 is set equal to 6 and the variable shift3 is set equal to Max(2, 14−BitDepth$_C$).

The variable picW$_C$ is set equal to pic_width_in_luma_samples/SubWidthC and the variable picH$_C$ is set equal to pic_height_in_luma_samples/SubHeightC.

The chroma interpolation filter coefficients f$_C$[p] for each 1/32 fractional sample position p equal to xFrac$_C$ or yFrac$_C$ are specified in Table 3.

The variable xOffset is set equal to sps_ref_wraparound_offset_minus1+1)*MinCbSizeY)/SubWidthC.

The chroma locations in full-sample units (xInt$_i$, yInt$_i$) are derived as follows for i=0 . . . 3:

If subpic_treated_as_pic_flag[SubPicIdx] is equal to 1, the following applies:

xInt$_i$=Clip3(SubPicLeftBoundaryPos/SubWidthC, SubPicRightBoundaryPos/SubWidthC,xInt$_L$+i)  (8-785)

yInt$_i$=Clip3(SubPicTopBoundaryPos/SubHeightC, SubPicBotBoundaryPos/SubHeightC,yInt$_L$+i)  (8-786)

Otherwise (subpic_treated_as_pic_flag[SubPicIdx] is equal to 0), the following applies:

xInt$_i$=Clip3(0,picW$_C$−1,sps_ref_wraparound_enabled_flag?ClipH(xOffset,picW$_C$,xInt$_C$+i−1): xInt$_C$+i−1)  (8-787)

yInt$_i$=Clip3(0,picH$_C$−1,yInt$_C$+i−1)  (8-788)

The chroma locations in full-sample units (xInt, yInt$_i$) are further modified as follows for i=0 . . . 3:

xInt$_i$=Clip3(xSbIntC−1,xSbIntC+sbWidth+2,xInt$_i$)  (8-789)

yInt$_i$=Clip3(ySbIntC−1,ySbIntC+sbHeight+2,yInt$_i$)  (8-790)

The predicted chroma sample value predSampleLX$_C$ is derived as follows:

If both xFrac$_C$ and yFrac$_C$ are equal to 0, the value of predSampleLX$_C$ is derived as follows:

predSampleLX$_C$=refPicLX$_C$[xInt$_1$][yInt$_1$]<<shift3  (8-791)

Otherwise, if xFrac$_C$ is not equal to 0 and yFrac$_C$ is equal to 0, the value of predSampleLX$_C$ is derived as follows:

predSampleLX$_C$=($\Sigma_{i=0}^{3}$ f$_C$[xFrac$_C$][i]*refPicLX$_C$[xInt$_i$][yInt$_1$])>>shift1  (8-792)

Otherwise, if xFrac$_C$ is equal to 0 and yFrac$_C$ is not equal to 0, the value of predSampleLX$_C$ is derived as follows:

predSampleLX$_C$=($\Sigma_{i=0}^{3}$ f$_C$[yFrac$_C$][i]*refPicLX$_C$[xInt$_1$][yInt$_1$])>>shift1  (8-793)

Otherwise, if xFrac$_C$ is not equal to 0 and yFrac$_C$ is not equal to 0, the value of predSampleLX$_C$ is derived as follows:

The sample array temp[n] with n=0 . . . 3, is derived as follows:

temp[n]=($\Sigma_{i=0}^{3}$ f$_C$[xFrac$_C$][i]*refPicLX$_C$[xInt$_i$][yInt$_n$])>>shift1  (8-794)

The predicted chroma sample value predSampleLX$_C$ is derived as follows:

predSampleLX$_C$=(f$_C$[yFrac$_C$][0]*temp[0]+f$_C$[yFrac$_C$][1]*temp[1]+f$_C$[yFrac$_C$][2]*temp[2]+f$_C$[yFrac$_C$][3]*temp[3])>>shift2  (8-795)

TABLE 8-13

Specification of the chroma interpolation filter coefficients f$_{C[p]}$ for each 1/32 fractional sample position p

| Fractional sample position p | interpolation filter coefficients | | | |
|---|---|---|---|---|
| | f$_{C[p][0]}$ | f$_{C[p][1]}$ | f$_{C[p][2]}$ | f$_{C[p][3]}$ |
| 1 | −1 | 63 | 2 | 0 |
| 2 | −2 | 62 | 4 | 0 |
| 3 | −2 | 60 | 7 | −1 |
| 4 | −2 | 58 | 10 | −2 |
| 5 | −3 | 57 | 12 | −2 |
| 6 | −4 | 56 | 14 | −2 |
| 7 | −4 | 55 | 15 | −2 |
| 8 | −4 | 54 | 16 | −2 |
| 9 | −5 | 53 | 18 | −2 |
| 10 | −6 | 52 | 20 | −2 |
| 11 | −6 | 49 | 24 | −3 |
| 12 | −6 | 46 | 28 | −4 |
| 13 | −5 | 44 | 29 | −4 |
| 14 | −4 | 42 | 30 | −4 |
| 15 | −4 | 39 | 33 | −4 |
| 16 | −4 | 36 | 36 | −4 |
| 17 | −4 | 33 | 39 | −4 |
| 18 | −4 | 30 | 42 | −4 |
| 19 | −4 | 29 | 44 | −5 |
| 20 | −4 | 28 | 46 | −6 |
| 21 | −3 | 24 | 49 | −6 |
| 22 | −2 | 20 | 52 | −6 |
| 23 | −2 | 18 | 53 | −5 |
| 24 | −2 | 16 | 54 | −4 |
| 25 | −2 | 15 | 55 | −4 |
| 26 | −2 | 14 | 56 | −4 |
| 27 | −2 | 12 | 57 | −3 |
| 28 | −2 | 10 | 58 | −2 |
| 29 | −1 | 7 | 60 | −2 |
| 30 | 0 | 4 | 62 | −2 |
| 31 | 0 | 2 | 63 | −1 |

2.5. Refined Sub-Block Based Affine Motion Compensated Prediction

The techniques disclosed herein include a method to refine the sub-block based affine motion compensated prediction with optical flow. After the sub-block based affine motion compensation is performed, prediction sample is refined by adding a difference derived by the optical flow equation, which is referred as prediction refinement with optical flow (PROF). The proposed method can achieve inter prediction in pixel level granularity without increasing the memory access bandwidth.

To achieve a finer granularity of motion compensation, this contribution proposes a method to refine the sub-block based affine motion compensated prediction with optical flow. After the sub-block based affine motion compensation is performed, luma prediction sample is refined by adding a difference derived by the optical flow equation. The proposed PROF (prediction refinement with optical flow) is described as following four steps.

Step 1) The sub-block-based affine motion compensation is performed to generate sub-block prediction I(i, j).

Step 2) The spatial gradients g$_x$(i, j) and g$_y$(i, j) of the sub-block prediction are calculated at each sample location using a 3-tap filter [−1, 0, 1].

$$g_x(i, j) = I(i+1, j) - I(i-1, j)$$

$$g_y(i, j) = I(i, j+1) - I(i, j-1)$$

The sub-block prediction is extended by one pixel on each side for the gradient calculation. To reduce the memory bandwidth and complexity, the pixels on the extended borders are copied from the nearest integer pixel position in the reference picture. Therefore, additional interpolation for padding region is avoided.

Step 3) The luma prediction refinement (denoted ΔI) as is calculated by the optical flow equation.

$$\Delta I(i, j) = g_x(i, j) * \Delta v_x(i, j) + g_y(i, j) * \Delta v_y(i, j)$$

where the delta MV (denoted as Δv(i, j)) is the difference between pixel MV computed for sample location (i, j), denoted by v(i, j), and the sub-block MV of the sub-block to which pixel (i, j) belongs, as shown in FIG. 1.

Since the affine model parameters and the pixel location relative to the sub-block center are not changed from sub-block to sub-block, Δv(i, j) can be calculated for the first sub-block, and reused for other sub-blocks in the same CU. Let x and y be the horizontal and vertical offset from the pixel location to the center of the sub-block, Δv(x, y) can be derived by the following equation, $$\begin{cases} \Delta v_x(x, y) = c * x + d * y \\ \Delta v_y(x, y) = e * x + f * y \end{cases}$$

For 4-parameter affine model, $$\begin{cases} c = f = \dfrac{v_{1x} - v_{0x}}{w} \\ e = -d = \dfrac{v_{1y} - v_{0y}}{w} \end{cases}$$

For 6-parameter affine model, $$\begin{cases} c = \dfrac{v_{1x} - v_{0x}}{w} \\ d = \dfrac{v_{2x} - v_{0x}}{h} \\ e = \dfrac{v_{1y} - v_{0y}}{w} \\ f = \dfrac{v_{2y} - v_{0y}}{h} \end{cases}$$

where $(v_{0x}, v_{0y})$, $(v_{1x}, v_{1y})$, $(v_{2x}, v_{2y})$ are the top-left, top-right and bottom-left control point motion vectors, w and h are the width and height of the CU.

Step 4) Finally, the luma prediction refinement is added to the sub-block prediction I(i, j). The final prediction I' is generated as the following equation.

$$I'(i, j) = I(i, j) + \Delta I(i, j)$$

Some details are described below:
a) How to derive the gradients for PROF

In some embodiments, the gradients are calculated for each sub-block (4×4 sub-block in VTM-4.0) for each reference list. For each sub-block, the nearest integer samples of the reference block are fetched to pad the four side outer lines of samples.

Suppose the MV for the current sub-block is (MVx, MVy). Then the fractional part is calculated as (FracX, FracY)=(MVx&15, MVy&15). The integer part is calculated as (IntX, IntY)=(MVx>>4, MVy>>4). The offsets (OffsetX, OffsetY) are derived as:

OffsetX=FracX>7?1:0;

OffsetY=FracY>7?1:0;

Suppose the top-left coordinate of the current sub-block is (xCur, yCur) and the dimensions of the current sub-block is W×H. Then (xCor0, yCor0), (xCor1, yCor1), (xCor2, yCor2) and (xCor3, yCor3) are calculated as:

(xCor0,yCor0)=(xCur+IntX+OffsetX−1,yCur+IntY+OffsetY−1);

(xCor1,yCor1)=(xCur+IntX+OffsetX−1,yCur+IntY+OffsetY+H);

(xCor2,yCor2)=(xCur+IntX+OffsetX−1,yCur+IntY+OffsetY);

(xCor3,yCor3)=(xCur+IntX+OffsetX+W,yCur+IntY+OffsetY);

Suppose PredSample[x][y] with x=0 . . . W−1, y=0 . . . H−1 stores the prediction samples for the sub-block. Then the padding samples are derived as:

PredSample[x][−1]=(Ref(xCor0+x,yCor0)<<Shift0)−Rounding, for x=−1 . . . W;

PredSample[x][H]=(Ref(xCor1+x,yCor1)<<Shift0)−Rounding, for x=−1 . . . W;

PredSample[−1][y]=(Ref(xCor2,yCor2+y)<<Shift0)−Rounding, for y=0 . . . H−1;

PredSample[W][y]=(Ref(xCor3,yCor3+y)<<Shift0)−Rounding, for y=0 . . . H−1;

where Rec represents the reference picture. Rounding is an integer, which is equal to $2^{13}$ in the exemplary PROF implementation. Shift0=Max(2, (14−BitDepth)); PROF attempts to increase the precision of the gradients, unlike BIO in VTM-4.0, where the gradients are output with the same precision as input luma samples.

The gradients in PROF are calculated as below:

Shift1=Shift0−4.

gradientH[x][y]=(predSamples[x+1][y]−predSample[x][y])>>Shift1 gradientV[x][y]=(predSample[x][y+1]−predSample[x][y−1])>>Shift1

It should be noted that predSamples[x][y] keeps the precision after interpolation.

b) How to derive Δv for PROF

The derivation of Δv (denoted as dMvH[posX][posY] and dMvV[posX][posY] with posX=0 . . . W−1, posY=0 . . . H−1) can be described as below.

Suppose the dimensions of the current block is cbWidth× cbHeight, the number of control point motion vectors is numCpMv, and the control point motion vectors are cpMvLX[cpIdx], with cpIdx=0 . . . numCpMv−1 and X being 0 or 1 representing the two reference lists.

The variables log 2CbW and log 2CbH are derived as follows:

log 2CbW=Log 2(cbWidth)

log 2CbH=Log 2(cbHeight)

The variables mvScaleHor, mvScaleVer, dHorX and dVerX are derived as follows:

mvScaleHor=cpMvLX[0][0]<<7 mvScaleVer=cpMvLX[0][1]<<7

$dHorX=(cpMvLX[1][0]-cpMvLX[0][0])<<(7-\log 2CbW)$ $dVerX=(cpMvLX[1][1]-cpMvLX[0][1])<<(7 \log 2CbW)$ The variables dHorY and dVerY are derived as follows:
If numCpMv is equal to 3, the following applies:

$dHorY=(cpMvLX[2][0]-cpMvLX[0][0])<<(7-\log 2CbH)$ $dVerY=(cpMvLX[2][1]-cpMvLX[0][1])<<(7-\log 2CbH)$ Otherwise (numCpMv is equal to 2), the following applies:

$dHorY=-dVerX$ $dVerY=dHorX$

The variable qHorX, qVerX, qHorY and qVerY are derived as:

$qHorX=dHorX<<2;$ $qVerX=dVerX<<2;$ $qHorY=dHorY<<2;$ $qVerY=dVerY<<2;$ dMvH[0][0] and dMvV[0][0] are calculated as:

$dMvH[0][0]=((dHorX+dHorY)<<1)-((qHorX+qHorY)<<1);$ $dMvV[0][0]=((dVerX+dVerY)<<1)-((qVerX+qVerY)<<1);$ dMvH[xPos][0] and dMvV[xPos][0] for xPos from 1 to W−1 are derived as:

$dMvH[xPos][0]=dMvH[xPos-1][0]+qHorX;$ $dMvV[xPos][0]=dMvV[xPos-1][0]+qVerX;$

For yPos from 1 to H−1, the following applies:

$dMvH[xPos][yPos]=dMvH[xPos][yPos-1]+qHorY$
with xPos=0 ... W−1

$dMvV[xPos][yPos]=dMvV[xPos][yPos-1]+qVerY$
with xPos=0 ... W−1

Finally, dMvH[xPos][yPos] and dMvV[xPos][yPos] with posX=0 ... W−1, posY=0 ... H−1 are right shifted as:

$dMvH[xPos][yPos]=SatShift(dMvH[xPos][yPos],7+2-1);$ $dMvV[xPos][yPos]=SatShift(dMvV[xPos][yPos],7+2-1);$ where SatShift(x, n) and Shift(x, n) is defined as:

$$SatShift(x, n) = \begin{cases} (x + \textit{offsset0}) \gg n & \text{if } x \geq 0 \\ -((-x + \textit{offset1}) \gg n) & \text{if } x < 0 \end{cases}$$

$Shift(x,n)=(x+\text{offset0})>>n$

In one example, offset0 and/or offset1 are set to $(1<<n)>>1$.

c) How to derive ΔI for PROF

For a position (posX, posY) inside a sub-block, its corresponding Δv(i, j) is denoted as (dMvH[posX][posY], dMvV[posX][posY]). Its corresponding gradients are denoted as (gradientH[posX][posY], gradientV[posX][posY]).

Then ΔI(posX, posY) is derived as follows.

(dMvH[posX][posY], dMvV[posX][posY]) are clipped as:

$dMvH[posX][posY]=Clip3(-32768,32767,dMvH[posX][posY]);$ $dMvV[posX][posY]=Clip3(-32768,32767,dMvV[posX][posY]);$ $\Delta I(posX,posY)=dMvH[posX][posY]\times gradientH[posX][posY]+dMvV[posX][posY]\times gradientV[posX][posY];$ $\Delta I(posX,posY)=Shift(\Delta I(posX,posY),1+1+4);$ $\Delta I(posX,posY)=Clip3(-(2^{13}-1),2^{13}-1,\Delta I(posX,posY));$ d) How to derive I' for PROF If the current block is not coded as bi-prediction or weighted-prediction, $I'(posX,posY)=Shift((I(posX,posY)+\Delta I(posX,posY)),Shift0),$ $I'(posX,posY)=ClipSample(I'(posX,posY)),$ where Clip Sample clips a sample value to a valid output sample value. Then I'(posX, posY) is output as the inter-prediction value.

Otherwise (the current block is coded as bi-prediction or weighted-prediction). I'(posX, posY) will be stored and used to generate the inter-prediction value according to other prediction values and/or weighting values.

2.6. Example Slice Header

| slice_header( ) { | Descriptor |
|---|---|
| slice_pic_parameter_set_id | ue(v) |
| if( rect_slice_flag \|\| NumBricksInPic > 1 ) | |
|   slice_address | u(v) |
| if( !rect_slice_flag && !single_brick_per_slice_flag ) | |
|   num_bricks_in_slice_minus1 | ue(v) |
| non_reference_picture_flag | u(1) |
| slice_type | ue(v) |
| if( separate_colour_plane_flag = = 1 ) | |
|   colour_plane_id | u(2) |
| slice_pic_order_cnt_lsb | u(v) |
| if( nal_unit_type = = GDR_NUT ) | |
|   recovery_poc_cnt | ue(v) |
| if( nal_unit_type = = IDR_W_RADL \|\| nal_unit_type = = IDR_N_LP \|\| nal_unit_type = = CRA_NUT \|\| NalUnitType = = GDR_NUT ) | |
|   no_output_of_prior_pics_flag | u(1) |
| if( output_flag_present_flag ) | |
|   pic_output_flag | u(1) |

-continued

| slice_header( ) { | Descriptor |
|---|---|
|   if( ( nal_unit_type != IDR_W_RADL && nal_unit_type != IDR_N_LP ) \|\| | |
|     sps_idr_rpl_present_flag ) { | |
|     for( i = 0; i < 2; i++ ) { | |
|       if( num_ref_pic_lists_in_sps[ i ] > 0 && !pps_ref_pic_list_sps_idc[ i ] && | |
|         ( i = = 0 \|\| ( i = = 1 && rpl1_idx_present_flag ) ) ) | |
|         ref_pic_list_sps_flag[ i ] | u(1) |
|       if(ref_pic_list_sps_flag[ i ]) { | |
|         if(num_ref_pic_lists_in_sps[ i ] > 1 && | |
|           ( i = = 0 \|\| (i = = 1 && rpl1_idx_present_flag ) ) ) | |
|           ref_pic_list_idx[ i ] | u(v) |
|       } else | |
|         ref_pic_list_struct(i, num_ref_pic_lists_in_sps[ i ] ) | |
|       for( j = 0; j < NumLtrpEntries[ i ][ RplsIdx[ i ] ]; j++ ) { | |
|         if( ltrp_in_slice_header_flag[ i ][ RplsIdx[ i ] ] ) | |
|           slice_poc_lsb_lt[ i ][ j ] | u(v) |
|         delta_poc_msb_present_flag[ i ][ j ] | u(1) |
|         if( delta_poc_msb_present_flag[ i ][ j ] ) | |
|           delta_poc_msb_cycle_lt[ i ][ j ] | ue(v) |
|       } | |
|     } | |
|     if( ( slice_type != I && num_ref_entries[ 0 ][ RplsIdx[ 0 ] ] > 1 ) \|\| | |
|       ( slice_type = = B && num_ref_entries[ 1 ][ RplsIdx[ 1 ] ] > 1 ) ) { | |
|       num_ref_idx_active_override_flag | u(1) |
|       if( num_ref_idx_active_override_flag ) | |
|         for( i = 0; i < ( slice_type = = B ? 2: 1 ); i++ ) | |
|           if( num_ref_entries[ i ][ RplsIdx[ i ] ] > 1 ) | |
|             num_ref_idx_active_minus1[ i ] | ue(v) |
|     } | |
|   } | |
|   if( partition_constraints_override_enabled_flag ) { | |
|     partition_constraints_override_flag | ue(v) |
|     if( partition_constraints_override_flag ) { | |
|       slice_log2_diff_min_qt_min_cb_luma | ue(v) |
|       slice_max_mtt_hierarchy_depth_luma | ue(v) |
|       if( slice_max_mtt_hierarchy_depth_luma != 0 ) | |
|         slice_log2_diff_max_bt_min_qt_luma | ue(v) |
|         slice_log2_diff_max_tt_min_qt_luma | ue(v) |
|       } | |
|       if( slice_type = = I && qtbtt_dual_tree_intra_flag ) { | |
|         slice_log2_diff_min_qt_min_cb_chroma | ue(v) |
|         slice_max_mtt_hierarchy_depth_chroma | ue(v) |
|         if( slice_max_mtt_hierarchy_depth_chroma != 0 ) | |
|           slice_log2_diff_max_bt_min_qt_chroma | ue(v) |
|           slice_log2_diff_max_tt_min_qt_chroma | ue(v) |
|         } | |
|       } | |
|     } | |
|   } | |
|   if ( slice_type != I ) { | |
|     if( sps_temporal_mvp_enabled_flag && !pps_temporal_mvp_enabled_idc ) | |
|       slice_temporal_mvp_enabled_flag | u(1) |
|     if( slice_type = = B && !pps_mvd_l1_zero_idc ) | |
|       mvd_l1_zero_flag | u(1) |
|     if( cabac_init_present_flag ) | |
|       cabac_init_flag | u(1) |
|     if( slice_temporal_mvp_enabled_flag ) { | |
|       if( slice_type = = B && !pps_collocated_from_l0_idc ) | |
|         collocated_from_l0_flag | u(1) |
|       if( ( collocated_from_l0_flag && NumRefIdxActive[ 0 ] > 1 ) \|\| | |
|         ( !collocated_from_l0_flag && NumRefIdxActive[ 1 ] > 1 ) ) | |
|         collocated_ref_idx | ue(v) |
|     } | |
|     if( ( pps_weighted_pred_flag && slice_type = = P ) \|\| | |
|       ( pps_weighted_bipred_flag && slice_type = = B ) ) | |
|       pred_weight_table( ) | |
|     if( !pps_six_minus_max_num_merge_cand_plus1 ) | |
|       six_minus_max_num_merge_cand | ue(v) |
|     if( sps_affine_enabled_flag && | |
|       !pps_five_minus_max_num_subblock_merge_cand_plus1 ) | |
|       five_minus_max_num_subblock_merge_cand | ue(v) |
|     if( sps_fpel_mmvd_enabled_flag ) | |
|       slice_fpel_mmvd_enabled_flag | u(1) |
|     if( sps_bdof_dmvr_slice_present_flag ) | |
|       slice_disable_bdof_dmvr_flag | u(1) |
|     if( sps_triangle_enabled_flag && MaxNumMergeCand >= 2 && | |
|       !pps_max_num_merge_cand_minus_max_num_triangle_cand_minus1 ) | |
|       max_num_merge_cand_minus_max_num_triangle_cand | ue(v) |

-continued

| slice_header( ) { | Descriptor |
|---|---|
|   } | |
|   if ( sps_ibc_enabled_flag ) | |
|     slice_six_minus_max_num_ibc_merge_cand | ue(v) |
|   if( sps_joint_cbcr_enabled_flag ) | |
|     slice_joint_cbcr_sign_flag | u(1) |
|   slice_qp_delta | se(v) |
|   if( pps_slice_chroma_qp_offsets_present_flag ) { | |
|     slice_cb_qp_offset | se(v) |
|     slice_cr_qp_offset | se(v) |
|     if( sps_joint_cbcr_enabled_flag ) | |
|       slice_joint_cbcr_qp_offset | se(v) |
|   } | |
|   if( sps_sao_enabled_flag ) { | |
|     slice_sao_luma_flag | u(1) |
|     if( ChromaArrayType != 0 ) | |
|       slice_sao_chroma_flag | u(1) |
|   } | |
|   if( sps_alf_enabled_flag ) { | |
|     slice_alf_enabled_flag | u(1) |
|     if( slice_alf_enabled_flag ) { | |
|       slice_num_alf_aps_ids_luma | u(3) |
|       for( i = 0; i < slice_num_alf_aps_ids_luma; i++ ) | |
|         slice_alf_aps_id_luma[ i ] | u(3) |
|       if( ChromaArrayType != 0 ) | |
|         slice_alf_chroma_idc | u(2) |
|       if( slice_alf_chroma_idc ) | |
|         slice_alf_aps_id_chroma | u(3) |
|     } | |
|   } | |
|   if ( !pps_dep_quant_enabled_flag ) | |
|     dep_quant_enabled_flag | u(1) |
|   if( !dep_quant_enabled_flag ) | |
|     sign_data_hiding_enabled_flag | u(1) |
|   if( deblocking_filter_override_enabled_flag ) | |
|     deblocking_filter_override_flag | u(1) |
|   if( deblocking_filter_override_flag ) { | |
|     slice_deblocking_filter_disabled_flag | u(1) |
|     if( !slice_deblocking_filter_disabled_flag ) { | |
|     slice_beta_offset_div2 | se(v) |
|     slice_tc_offset_div2 | se(v) |
|     } | |
|   } | |
|   if( sps_lmcs_enabled_flag ) { | |
|     slice_lmcs_enabled_flag | u(1) |
|     if( slice_lmcs_enabled_flag ) { | |
|       slice_lmcs_aps_id | u(2) |
|       if( ChromaArrayType != 0 ) | |
|         slice_chroma_residual_scale_flag | u(1) |
|     } | |
|   } | |
|   if( sps_scaling_list_enabled_flag ) { | |
|     slice_scaling_list_present_flag | u(1) |
|     if( slice_scaling_list_present_flag ) | |
|       slice_scaling_list_aps_id | u(3) |
|   } | |
|   if( entry_point_offsets_present_flag && NumEntryPoints > 0 ) { | |
|     offset_len_minus1 | ue(v) |
|     for( i = 0; i < NumEntryPoints; i++ ) | |
|       entry_point_offset_minus1[ i ] | u(v) |
|   } | |
|   if( slice_header_extension_present_flag ) { | |
|     slice_header_extension_length | ue(v) |
|     for( i = 0; i < slice_header_extension_length; i++) | |
|       slice_header_extension_data_byte[ i ] | u(8) |
|   } | |
|   byte_alignment( ) | |
| } | |

2.7. Example Sequence Parameter Set

| seq_parameter_set_rbsp( ) { | Descriptor |
|---|---|
|   sps_decoding_parameter_set_id | u(4) |
|   sps_video_parameter_set_id | u(4) |

-continued

| seq_pammeter_set_rbsp( ) { | Descriptor |
|---|---|
|   sps_max_sub_layers_minus1 | u(3) |
|   sps_reserved_zero_5bits | u(5) |
|   profile_tier_level( sps_max_sub_layers_minus1 ) | |
|   gdr_enabled_flag | u(1) |
|   sps_seq_parameter_set_id | ue(v) |
|   chroma_format_idc | ue(v) |
|   if( chroma_format_idc = = 3 ) | |
|     separate_colour_plane_flag | u(1) |
|   pic_width_max_in_luma samples | ue(v) |
|   pic_height_max_in_luma_samples | ue(v) |
|   subpics_present_flag | u(1) |
|   if( subpics_present_flag ) { | |
|     max_subpics_minus1 | u(8) |
|     subpic_grid_col_width_minus1 | u(v) |
|     subpic_grid_row_height_minus1 | u(v) |
|     for( i = 0; i < NumSubPicGridRows; i++ ) | |
|       for( j = 0; j < NumSubPicGridCols; j++ ) | |
|         subpic_grid_idx[ i ][ j ] | u(v) |
|     for( i = 0; i <= NumSubPics; i++ ) { | |
|       subpic_treated_as_pic_flag[ i ] | u(1) |
|       loop_filter_across_subpic_enabled_flag[ i ] | u(1) |
|     } | |
|   } | |
|   bit_depth_luma_minus8 | ue(v) |
|   bit_depth_chroma_minus8 | ue(v) |
|   min_qp_prime_ts_minus4 | ue(v) |
|   log2_max_pic_order_cnt_lsb_minus4 | ue(v) |
|   if( sps_max_sub_layers_minus1 > 0 ) | |
|     sps_sub_layer_ordering_info_present_flag | u(1) |
|   for( i = ( sps_sub_layer_ordering_info_present_flag ? 0 : sps_max_sub_layers_minus1 ); | |
|     i <= sps_max_sub_layers_minus1; i++ ) { | |
|     sps_max_dec_pic_buffering_minus1[ i ] | ue(v) |
|     sps_max_num_reorder_pics[ i ] | ue(v) |
|     sps_max_latency_increase_plus1[ i ] | ue(v) |
|   } | |
|   long_term_ref_pics_flag | u(1) |
|   inter_layer_ref_pics_present_flag | u(1) |
|   sps_idr_rpl_present_flag | u(1) |
|   rpl1_same_as_rpl0_flag | u(1) |
|   for( i = 0; i < !rpl1_same_as_rpl0_flag ? 2 : 1; i++ ) { | |
|     num_ref_pic_lists_in_sps[ i ] | ue(v) |
|     for(j = 0; j < num_ref_pic_lists_in_sps[ i ]; j++) | |
|       ref_pic_list_struct( i, j ) | |
|   } | |
|   if( ChromaArrayType != 0 ) | |
|     qtbtt_dual_tree_infra_flag | u(1) |
|   log2_ctu_size_minus5 | u(2) |
|   log2_min_luma_coding_block_size_minus2 | ue(v) |
|   partition_constraints_override_enabled_flag | u(1) |
|   sps_log2_diff_min_qt_min_cb_intra_slice_luma | ue(v) |
|   sps_log2_diff_min_qt_min_cb_inter_slice | ue(v) |
|   sps_max_mtt_hierarchy_depth_inter_slice | ue(v) |
|   sps_max_mtt_hierarchy_depth_intra_slice_luma | ue(v) |
|   if( sps_max_mtt_hierarchy_depth_intra_slice_luma != 0 ) { | |
|     sps_log2_diff_max_bt_min_qt_intra_slice_luma | ue(v) |
|     sps_log2_diff_max_tt_min_qt_intra_slice_luma | ue(v) |
|   } | |
|   if( sps_max_mtt_hierarchy_depth_inter_slices != 0 ) { | |
|     sps_log2_diff_max_bt_min_qt_inter_slice | ue(v) |
|     sps_log2_diff_max_tt_min_qt_inter_slice | ue(v) |
|   } | |
|   if( qtba_dual_tree_intra_flag) { | |
|     sps_log2_diff_min_qt_min_cb_intra_slice_chroma | ue(v) |
|     sps_max_mtt_hierarchy_depth_intra_slice_chroma | ue(v) |
|     if ( sps_max_mtt_hierarchy_depth_intra_slice_chroma != 0 ) { | |
|       sps_log2_diff_max_bt_min_qt_intra_slice_chroma | ue(v) |
|       sps_log2_diff_max_tt_min_qt_intra_slice_chroma | ue(v) |
|     } | |
|   } | |
|   sps_max_luma_transform_size_64_flag | u(1) |
|   if( ChromaArrayType != 0 ) { | |
|     same_qp_table_for_chroma | u(1) |
|     for( i = 0; i < same_qp_table_for_chroma ? 1 : 3; i++ ) { | |
|       num_points_in_qp_table_minus1[ i ] | ue(v) |
|       for(j = 0; j <= num_points_in_qp_table_minus1[ i ]; j++) { | |
|         delta_qp_in_val_minus1[ i ][ j ] | ue(v) |
|         delta_qp_out_val[ i ][ j ] | ue(v) |

-continued

| seq_parameter_set_rbsp( ) { | Descriptor |
|---|---|
|     } | |
|   } | |
| } | |
|   sps_weighted_pred_flag | u(1) |
|   sps_weighted_bipred_flag | u(1) |
|   sps_sao_enabled_flag | u(1) |
|   sps_alf_enabled_flag | u(1) |
|   sps_transform_skip_enabled_flag | u(1) |
|   if( sps_transform_skip_enabled_flag ) | |
|     sps_bdpcm_enabled_flag | u(1) |
|   sps_joint_cbcr_enabled_flag | u(1) |
|   sps_ref_wraparound_enabled_flag | u(1) |
|   if( sps_ref_wraparound_enabled_flag ) | |
|     sps_ref_wraparound_offset_minus1 | ue(v) |
|   sps_temporal_mvp_enabled_flag | u(1) |
|   if( sps_temporal_mvp_enabled_flag ) | |
|     sps_sbtmvp_enabled_flag | u(1) |
|   sps_amvr_enabled_flag | u(1) |
|   sps_bdof_enabled_flag | u(1) |
|   sps_smvd_enabled_flag | u(1) |
|   sps_dmvr_enabled_flag | u(1) |
|   if( sps_bdof_enabled_flag \|\| sps_dmvr_enabled_flag) | |
|     sps_bdof_dmvr_slice_present_flag | u(1) |
|   sps_mmvd_enabled_flag | u(1) |
|   sps_isp_enabled_flag | u(1) |
|   sps_mrl_enabled_flag | u(1) |
|   sps_mip_enabled_flag | u(1) |
|   if( ChromaArrayType != 0 ) | |
|     sps_cclm_enabled_flag | u(1) |
|     if( sps_cclm_enabled_flag && chroma_format_idc = = 1 ) | |
|       sps_cclm_colocated_chroma_flag | u(1) |
|   sps_mts_enabled_flag | u(1) |
|   if( sps_mts_enabled_flag ) { | |
|     sps_explicit_mts_intra_enabled_flag | u(1) |
|     sps_explicit_mts_inter_enabled_flag | u(1) |
|   } | |
|   sps_sbt_enabled_flag | u(1) |
|   if( sps_sbt_enabled_flag ) | |
|     sps_sbt_max_size_64_flag | u(1) |
|   sps_affine_enabled_flag | u(1) |
|   if( sps_affine_enabled_flag ) { | |
|     sps_affine_type_flag | u(1) |
|     sps_affine_amvr_enabled_flag | u(1) |
|     sps_affine_prof_enabled_flag | u(1) |
|   } | |
|   if( chroma_format_idc = = 3 ) | |
|     sps_palette_enabled_flag | u(1) |
|   sps_bcw_enabled_flag | u(1) |
|   sps_ibc_enabled_flag | u(1) |
|   sps_ciip_enabled_flag | u(1) |
|   if( sps_mmvd_enable_flag ) | |
|     sps_fpel_mmvd_enabled_flag | u(1) |
|   sps_triangle_enabled_flag | u(1) |
|   sps_lmcs_enabled_flag | u(1) |
|   sps_lfnst_enabled_flag | u(1) |
|   sps_ladf_enabled_flag | u(1) |
|   if ( sps_ladf_enabled_flag ) { | |
|     sps_num_ladf_intervals_minus2 | u(2) |
|     sps_ladf_lowest_interval_qp_offset | se(v) |
|     for( i = 0; i < sps_num_ladf_intervals_minus2 + 1; i++ ) { | |
|       sps_ladf_qp_offset[ i ] | se(v) |
|       sps_ladf_delta threshold_minus1[ i ] | ue(v) |
|     } | |
|   } | |
|   sps_scaling_list_enabled_flag | u(1) |
|   hrd_parameters_present_flag | u(1) |
|   if( general_hrd_parameters_present_flag ) { | |
|     num_units_in_tick | u(32) |
|     time_scale | u(32) |
|     sub_layer_cpb_parameters_present_flag | u(1) |
|     if( sub_layer_cpb_parameters_present_flag ) | |
|       general_hrd_parameters( 0, sps_max_sub_layers_minus1 ) | |
|     else | |
|       general_hrd_parameters( sps_max_sub_layers_minus1, sps_max_sub_layers_minus1 ) | |
|   } | |
|   vui_parameters_present_flag | u(1) |
|   if( vui_parameters_present_flag ) | |

| seq_pammeter_set_rbsp( ) { | Descriptor |
|---|---|
|    vui_parameters( ) | |
|    sps_extension_flag | u(1) |
|    if( sps_extension_flag ) | |
|      while( more_rbsp_data( ) ) | |
|        sps_extension_data_flag | u(1) |
|    rbsp_trailing_bits( ) | |
| } | |

2.8 Example Picture Parameter Set

| pic_parameter_set_rbsp( ) { | Descriptor |
|---|---|
|   pps_pic_parameter_set_id | ue(v) |
|   pps_seq_parameter_set_id | ue(v) |
|   pic_width_in_luma_samples | ue(v) |
|   pic_height_in_luma_samples | ue(v) |
|   conformance_window_flag | u(1) |
|   if( conformance_window_flag ) { | |
|     conf_win_left_offset | ue(v) |
|     conf_win_right_offset | ue(v) |
|     conf_win_top_offset | ue(v) |
|     conf_win_bottom_offset | ue(v) |
|   } | |
|   output_flag_present_flag | u(1) |
|   single_tile_in_pic_flag | u(1) |
|   if( !single_tile_in_pic_flag ) { | |
|     uniform_tile_spacing_flag | u(1) |
|     if( uniform_tile_spacing_flag ) { | |
|       tile_cols_width_minus1 | ue(v) |
|       tile_rows_height_minus1 | ue(v) |
|     } else { | |
|       num_tile_columns_minus1 | ue(v) |
|       num_tile_rows_minus1 | ue(v) |
|       for( i = 0; i < num_tile_columns_minus1; i++ ) | |
|         tile_column_width_minus1[ i ] | ue(v) |
|       for( i = 0; i < num_tile_rows_minus1; i++ ) | |
|         tile_row_height_minus1[ i ] | ue(v) |
|     } | |
|     brick_splitting_present_flag | u(1) |
|     if( uniform_tile_spacing_flag && brick_splitting_present_flag ) | |
|       num_tiles_in_pic_minus1 | ue(v) |
|     for( i = 0; brick_splitting_present_flag && i <= num_tiles_in_pic_minus1 + 1; i++ ) { | |
|       if( RowHeight[ i ] > 1 ) | |
|         brick_split_flag[ i ] | u(1) |
|       if( brick_split_flag[ i ] ) { | |
|         if( RowHeight[ i ] > 2 ) | |
|           uniform_brick_spacing_flag[ i ] | u(1) |
|         if( uniform_brick_spacing_flag[ i ] ) | |
|           brick_height_minus1[ i ] | ue(v) |
|         else { | |
|           num_brick_rows_minus2[ i ] | ue(v) |
|           for( j = 0; j <= num_brick_rows_minus2[ i ]; j++ ) | |
|             brick_row_height_minus1[ i ][ j ] | ue(v) |
|         } | |
|       } | |
|     } | |
|     single_brick_per_slice_flag | u(1) |
|     if( !single_brick_per_slice_flag ) | |
|       rect_slice_flag | u(1) |
|     if( rect_slice_flag && !single_brick_per_slice_flag ) { | |
|       num_slices_in_pic_minus1 | ue(v) |
|       bottom_right_brick_idx_length_minus1 | ue(v) |
|       for( i = 0; i < num_slices_in_pic_minus1; i++ ) { | |
|         bottom_right_brick_idx_delta[ i ] | u(v) |
|         brick_idx_delta_sign_flag[ i ] | u(1) |
|       } | |
|     } | |
|     loop_filter_across_bricks_enabled_flag | u(1) |
|     if( loop_filter_across_bricks_enabled_flag ) | |
|       loop_filter_across_slices_enabled_flag | u(1) |
|   } | |
|   if( rect_slice_flag) { | |
|     signalled_slice_id_flag | u(1) |
|     if( signalled_slice_id_flag ) { | |

-continued

| pic_parameter_set_rbsp( ) { | Descriptor |
|---|---|
|     signalled_slice_id_length_minus1 | ue(v) |
|     for( i = 0; i <= num_slices_in_pic_minus1; i++ ) | |
|       slice_id[ i ] | u(v) |
|     } | |
|   } | |
|   entropy_coding_sync_enabled_flag | u(1) |
|   if( !single_tile_in_pic_flag \|\| entropy_coding_sync_enabled_flag ) | |
|     entry_point_offsets_present_flag | u(1) |
|   cabac_init_present_flag | u(1) |
|   for( i = 0; i < 2; i++ ) | |
|     num_ref_idx_default_active_minus1[ i ] | ue(v) |
|   rpl1_idx_present_flag | u(1) |
|   init_qp_minus26 | se(v) |
|   if( sps_transform_skip_enabled_flag ) | |
|     log2_transform_skip_max_size_minus2 | ue(v) |
|   cu_qp_delta_enabled_flag | u(1) |
|   if( cu_qp_delta_enabled_flag ) | |
|     cu_qp_delta_subdiv | ue(v) |
|   pps_cb_qp_offset | se(v) |
|   pps_cr_qp_offset | se(v) |
|   pps_joint_cbcr_qp_offset | se(v) |
|   pps_slice_chroma_qp_offsets_present_flag | u(1) |
|   cu_chroma_qp_offset_enabled_flag | u(1) |
|   if( cu_chroma_qp_offset_enabled_flag ) { | |
|     cu_chroma_qp_offset_subdiv | ue(v) |
|     chroma_qp_offset_list_len_minus1 | ue(v) |
|     for( i = 0; i <= chroma_qp_offset_list_len_minus1; i++ ) { | |
|       cb_qp_offset_list[ i ] | se(v) |
|       cr_qp_offset_list[ i ] | se(v) |
|       joint_cbcr_qp_offset_list[ i ] | se(v) |
|     } | |
|   } | |
|   pps_weighted_pred_flag | u(1) |
|   pps_weighted_bipred_flag | u(1) |
|   deblocking_filter_control_present_flag | u(1) |
|   if( deblocking_filter_control_present_flag) { | |
|     deblocking_filter_override_enabled_flag | u(1) |
|     pps_deblocking_filter_disabled_flag | u(1) |
|     if( !pps_deblocking_filter_disabled_flag) { | |
|       pps_beta_offset_div2 | se(v) |
|       pps_tc_offset_div2 | se(v) |
|     } | |
|   } | |
|   constant_slice_header_params_enabled_flag | u(1) |
|   if( constant_slice_header_params_enabled_flag ) { | |
|     pps_dep_quant_enabled_idc | u(2) |
|     for( i = 0; i < 2; i++ ) | |
|       pps_ref_pic_list_sps_idc[ i ] | u(2) |
|     pps_temporal_mvp_enabled_idc | u(2) |
|     pps_mvd_l1_zero_idc | u(2) |
|     pps_collocated_from_l0_idc | u(2) |
|     pps_six_minus_max_num_merge_cand_plus1 | ue(v) |
|     pps_five_minus_max_num_subblock_merge_cand_plus1 | ue(v) |
|     pps_max_num_merge_cand_minus_max_num_triangle_cand_minus1 | ue(v) |
|   } | |
|   pps_loop_filter_across_virtual_boundaries_disabled_flag | u(1) |
|   if( pps_loop_filter_across_virtual_boundaries_disabled_flag ) { | |
|     pps_num_ver_virtual_boundaries | u(2) |
|     for( i = 0; i < pps_num_ver_virtual_boundaries; i++ ) | |
|       pps_virtual_boundaries_pos_x[ i ] | u(13) |
|     pps_num_hor_virtual_boundaries | u(2) |
|     for( i = 0; i < pps_num_hor_virtual_boundaries; i++ ) | |
|       pps_virtual_boundaries_pos_y[ i ] | u(13) |
|   } | |
|   slice_header_extension_present_flag | u(1) |
|   pps_extension_flag | u(1) |
|   if( pps_extension_flag ) | |
|     while( more_rbsp_data( ) ) | |
|       pps_extension_data_flag | u(1) |
|   rbsp_trailing_bits( ) | |
| } | |

2.9. Example Adaptive Parameter Set

| adaptation_parameter_set_rbsp( ) { | Descriptor |
|---|---|
|   adaptation_parameter_set_id | u(5) |
|   aps_params_type | u(3) |
|   if( aps_params_type = = ALF_APS ) | |
|     alf_data( ) | |
|   else if( aps_params_type = = LMCS_APS ) | |
|     lmcs_data( ) | |
|   else if( aps_params_type = = SCALING_APS ) | |
|     scaling_list_data( ) | |
|   aps_extension_flag | u(1) |
|   if( aps_extension_flag ) | |
|     while( more_rbsp_data( ) ) | |
|       aps_extension_data_flag | u(1) |
|   rbsp_trailing_bits( ) | |
| } | |

| lmcs_data ( ) { | Descriptor |
|---|---|
|   lmcs_min_bin_idx | ue(v) |
|   lmcs_delta_max_bin_idx | ue(v) |
|   lmcs_delta_cw_prec_minus1 | ue(v) |
|   for ( i = lmcs_min_bin_idx; i <= LmcsMaxBinIdx; i++ ) { | |
|     lmcs_delta_abs_cw[ i ] | u(v) |
|     if ( lmccs_delta_abs_cw[ i ] ) > 0 ) | |
|       lmcs_delta sign_cw_flag[ i ] | u(1) |
|   } | |
| } | |

| alf_data( ) { | Descriptor |
|---|---|
|   alf_luma_filter_signal_flag | u(1) |
|   alf_chroma_filter_signal_flag | u(1) |
|   if( alf_luma_filter_signal_flag ) { | |
|     alf_luma_clip_flag | u(1) |
|     alf_luma_num_filters_signalled_minus1 | ue(v) |
|     if( alf_luma_num_filters_signalled_minus1 > 0 ) { | |
|       for( filtIdx = 0; filtIdx < NumAlfFilters; filtIdx++ ) | |
|         alf_luma_coeff_delta_idx[ filtIdx ] | u(v) |
|     } | |
|     alf_luma coeff_signalled_flag | u(1) |
|     if( alf_luma_coeff_signalled_flag ) { | |
|       for( sfIdx = 0; sfIdx <= alf_luma_num_filters_signalled_minus1; sfIdx++ ) | |
|         alf_luma_coeff_flag[ sfIdx ] | u(1) |
|     } | |
|     for( sfIdx = 0; sfIdx <= alf_luma_num_filters_signalled_minus1; sfIdx++ ) { | |
|       if( alf_luma_coeff_flag[ sfIdx ] ) { | |
|         for(j = 0; j < 12; j++ ) { | |
|         alf_luma_coeff_abs[ sfIdx ][ j ] | uek(v) |
|         if( alf_luma_coeff_abs[ sfIdx ][ j ] ) | |
|           alf_luma_coeff_sign[ sfIdx ][ j ] | u(1) |
|         } | |
|       } | |
|     } | |
|     if( alf_luma_clip_flag ) { | |
|       for( sfIdx = 0; sfIdx <= alf_luma_num_filters_signalled_minus1; sfIdx++ ) { | |
|         if( alf_luma_coeff_flag[ sfIdx ] ) { | |
|           for( j = 0; j < 12; j++ ) | |
|             alf_luma_clip_idx[ sfIdx ][ j ] | u(2) |
|         } | |
|       } | |
|     } | |
|   } | |
|   if( alf_chroma_filter_signal_flag ) { | |
|     alf_chroma_num_alt_filters_minus1 | ue(v) |
|     for( altIdx = 0; altIdx <= alf_chroma_num_alt_filters_minus1; altIdx++ ) { | |
|       alf_chroma_clip_flag[ altIdx ] | u(1) |
|       for(j = 0; j < 6; j++ ) { | |
|         alf_chroma_coeff_abs[ altIdx ][ j ] | uek(v) |
|         if( alf_chroma_coeff_abs[ altIdx ][ j ] > 0 ) | |
|           alf_chroma_coeff_sign[ altIdx ][ j ] | u(1) |
|       } | |
|       if( alf_chroma_clip_flag[ altIdx ] ) { | |
|         for( j = 0; j < 6; j++ ) | |
|           alf_chroma_clip_idx[ altIdx ][ j ] | u(2) |
|       } | |
|     } | |
|   } | |
| } | |

| scaling_list_data( ) { | Descriptor |
|---|---|
|   for( sizeId = 1; sizeId < 7; sizeId++ ) | |
|     for( matrixId = 0; matrixId < 6; matrixId++ ) { | |
|       if( ! ( ( ( sizeId = = 1 ) && ( matrixId % 3 = = 0 ) ) \|\| | |
|         ( ( sizeId = = 6 ) && (matrixId % 3 != 0) ) ) ) { | |
|         scaling_list_pred_mode_flag[ sizeId ][ matrixId ] | u(1) |
|         if( !scaling_list_pred_mode_flag[ sizeId ][ matrixId ] ) | |
|           scaling_list_pred_matrix_id_delta[ sizeId ][ matrixId ] | ue(v) |
|         else { | |
|           nextCoef = 8 | |
|           coefNum = Min( 64, ( 1 << ( sizeId << 1 ) ) ) | |
|           if( sizeId > 3 ) { | |
|             scaling_list_dc_coef_minus8[ sizeId − 4 ][ matrixId ] | se(v) |
|             nextCoef = scaling_list_dc_coef_minus8[ sizeId − 4 ][ matrixId ] + 8 | |
|           } | |
|           for( i = 0; i < coefNum;i++ ) { | |
|             x = DiagScanOrder[ 3 ][ 3 ][ i ][ 0 ] | |
|             y = DiagScanOrder[ 3 ][ 3 ][ i ][ 1 ] | |
|             if ( !( sizeId = = 6 && x >= 4 && y >= 4)) { | |
|               scaling_list_delta_coef | se(v) |
|               nextCoef = (nextCoef + scaling_list_delta_coef + 256) % 256 | |
|               ScalingList[ sizeId ][ matrixId ][ i ] = nextCoef | |
|             } | |
|           } | |
|         } | |
|       } | |
|     } | |
| } | |

2.10. Example Picture Header

In some embodiments, the picture header is designed to have the following properties:

1. Temporal Id and layer Id of picture header NAL unit are the same as temporal Id and layer Id of layer access unit that contains the picture header.

2. Picture header NAL unit shall precede NAL unit containing the first slice of its associated picture. This established the association between a picture header and slices of picture associated with the picture header without the need of having picture header Id signalled in picture header and referred to from slice header.

3. Picture header NAL unit shall follow picture level parameter sets or higher level such as DPS, VPS, SPS, PPS, etc. This consequently requires those parameter sets to be not repeated/present within a picture or within an access unit.

4. Picture header contains information about picture type of its associated picture. The picture type may be used to define the following (not an exhaustive list)
  a. The picture is an IDR picture
  b. The picture is a CRA picture
  c. The picture is a GDR picture
  d. The picture is a non-IRAP, non-GDR picture and contains I-slices only
  e. The picture is a non-IRAP, non-GDR picture and may contain P- and I-slices only
  f. The picture is a non-IRAP, non-GDR picture and contains any of B-, P-, and/or I-slices 5. Move signalling of picture level syntax elements in slice header to picture header.

6. Signal non-picture level syntax elements in slice header that are typically the same for all slices of the same picture in picture header. When those syntax elements are not present in picture header, they may be signalled in slice header.

In some implementations, a mandatory picture header concept is used to be transmitted once per picture as the first VCL NAL unit of a picture. It is also proposed to move syntax elements currently in the slice header to this picture header. Syntax elements that functionally only need to be transmitted once per picture could be moved to the picture header instead of being transmitted multiple times for a given picture, e.g., syntax elements in the slice header are transmitted once per slice. Moving slice header syntax elements constrained to be the same within a picture The syntax elements are already constrained to be the same in all slices of a picture. It is asserted that moving these fields to the picture header so they are signalled only once per picture instead of once per slice avoids unnecessary redundant transmission of bits without any change to the functionality of these syntax elements.

1. In some implementations, there is the following semantic constraint:

When present, the value of each of the slice header syntax elements slice_pic_parameter_set_id, non_reference_picture_flag, colour_plane_id, slice_pic_order_cnt_lsb, recovery_poc_cnt, no_output_of_prior_pics_flag, pic_output_flag, and slice_temporal_mvp_enabled_flag shall be the same in all slice headers of a coded picture. Thus each of these syntax elements could be moved to the picture header to avoid unnecessary redundant bits.

The recovery_poc_cnt and no_output_of_prior_pics_flag are not moved to the picture header in this contribution. Their presence in the slice header is dependent on a conditional check of the slice header nal_unit_type, so they are suggested to be studied if there is a desire to move these syntax elements to the picture header.

2. In some implementations, there are the following semantic constraints:

When present, the value of slice_lmcs_aps_id shall be the same for all slices of a picture.

When present, the value of slice_scaling_list_aps_id shall be the same for all slices of a picture. Thus each of these syntax elements could be moved to the picture header to avoid unnecessary redundant bits.

In some embodiments, the syntax elements are not currently constrained to be the same in all slices of a picture. It is suggested to assess the anticipated usage of these syntax elements to determine which can be moved into the picture header to simplify the overall VVC design as it is claimed there is a complexity impact to processing a large number of syntax elements in every slice header.

1. The following syntax elements are proposed to be moved to the picture header. There are currently no restrictions on them having different values for different slices but it is claimed there is no/minimal benefit and coding loss to transmitting them in every slice header as their anticipated usage would change at the picture level:
   a. six_minus_max_num_merge_cand
   b. five_minus_max_num_subblock_merge_cand
   c. slice_fpel_mmvd_enabled_flag
   d. slice_disable_bdof_dmvr_flag
   e. max_num_merge_cand_minus_max_num_triangle_cand
   f. slice_six_minus_max_num_ibc_merge_cand 2. The following syntax elements are proposed to be moved to the picture header. There are currently no restrictions on them having different values for different slices but it is claimed there is no/minimal benefit and coding loss to transmitting them in every slice header as their anticipated usage would change at the picture level:
   a. partition_constraints_override_flag
   b. slice_log 2_diff_min_qt_min_cb_luma
   c. slice_max_mtt_hierarchy_depth_luma
   d. slice_log 2_diff_max_bt_min_qt_luma
   e. slice_log 2_diff_max_tt_min_qt_luma
   f. slice_log 2_diff_min_qt_min_cb_chroma
   g. slice_max_mtt_hierarchy_depth_chroma
   h. slice_log 2_diff_max_bt_min_qt_chroma
   i. slice_log 2_diff_max_tt_min_qt_chroma The conditional check "slice_type==I" associated with some of these syntax elements has been removed with the move to the picture header.

3. The following syntax elements are proposed to be moved to the picture header. There are currently no restrictions on them having different values for different slices but it is claimed there is no/minimal benefit and coding loss to transmitting them in every slice header as their anticipated usage would change at the picture level:
   a. mvd_l1_zero_flag The conditional check "slice_type==B" associated with some of these syntax elements has been removed with the move to the picture header.

4. The following syntax elements are proposed to be moved to the picture header. There are currently no restrictions on them having different values for different slices but it is claimed there is no/minimal benefit and coding loss to transmitting them in every slice header as their anticipated usage would change at the picture level:
   a. dep_quant_enabled_flag
   b. sign_data_hiding_enabled_flag 2.10.1 Example Syntax Tables 7.3.2.8 Picture Header RBSP Syntax

| | Descriptor |
|---|---|
| picture_header_rbsp( ) { | |
|   non_reference_picture_flag | u(1) |
|   gdr_pic_flag | u(1) |
|   no_output_of_prior_pics_flag | u(1) |
|   if( gdr_pic_flag ) | |
|     recovery_poc_cnt | ue(v) |
|   ph_pic_parameter_set_id | ue(v) |
|   if( sps_subpic_id_present_flag && !sps_subpic_id_signalling_flag ) { | |
|     ph_subpic_id_signalling_present_flag | u(1) |
|     if( ph_subpics_id_signalling_present_flag ) { | |
|       ph_subpic_id_len_minus1 | ue(v) |
|       for(i = 0; i < Num SubPics; i++ ) | |
|         ph_subpic_id[ i ] | u(v) |
|     } | |
|   } | |
|   if( !sps_loop_filter_across_virtual_boundaries_disabled_present_flag ) { | |
|     ph_loop_filter_across_sirtual_boundaries_disabled_present_flag | u(1) |
|     if( ph_loop_filter_across_virtual_boundaries_disabled_present_flag ) { | |
|       ph_num_ver_virtual_boundaries | u(2) |
|       for( i =0; i < ph_num_ver_virtual_boundaries; i++ ) | |
|         ph_virtual_boundaries_pos_x[ i ] | u(13) |
|       ph_num_hor_virtual_boundaries | u(2) |
|       for( i = 0; i < ph_num_hor_virtual_boundaries; i++ ) | |
|         ph_virtual_boundaries_pos_y[ i ] | u(13) |
|     } | |
|   } | |
|   if( separate_colour_plane_flag = =1 ) | |
|     colour_plane_id | u(2) |
|   if( output_flag_present_flag) | |
|     pic_output_flag | u(1) |
|   pic_rpl_present_flag | u(1) |
|   if( pic_rpl_present_flag ) { | |
|     for( i = 0; i < 2; i++ ) { | |
|       if( num_ref_pic_lists_in_sps[ i ] > 0 && !pps_ref_pic_list_sps_idc[ i ] && | |
|         ( i = = 0 | | ( i = = 1 && rpl1_idx_present_flag ) ) ) | |
|         pic_rpl_sps_flag [ i ] | u(1) |
|       if( pic_rpl_sps_flag[ i ] ) { | |
|         if( num_ref_pic_lists_in_sps[ i ] > 1 && | |
|           ( i = = 0 | | ( i = = 1 && rpl1_idx_present_flag) ) ) | |
|           pic_rpl_idx[ i ] | u(v) |
|       } else | |
|         ref_pic_list_struct(i, num_ref_pic_lists_in_sps[ i ] ) | |
|       for(j = 0;j < NumLtrpEntries[ i ][ RplsIdx[ i ] ]; j++ ) { | |

-continued

| | Descriptor |
|---|---|
|       if( ltrp_in_slice_header_flag[ i ][ RplsIdx[ i ] ] ) | |
|         pic_poc_lsb_lt[ i ][ j ] | u(v) |
|       pic_delta_poc_msb_present_flag[ i ][ j ] | u(1) |
|       if( pic_delta_poc_msb_present_flag[ i ][ j ] ) | |
|         pic_delta_poc_msb_cycle_lt[ i ][ j ] | ue(v) |
|     } | |
|   } | |
| } | |
| if( partition_constraints_override_enabled_flag ) { | |
|   partition_constraints_override_flag | ue(v) |
|   if( partition_constraints_override_flag ) { | |
|     pic_log2_diff_min_qt_min_cb_intra_slice_luma | ue(v) |
|     pic_log2_diff_min_qt_min_cb_inter_slice | ue(v) |
|     pic_max_mtt_hierarchy_depth_inter_slice | ue(v) |
|     pic_max_mtt_hierarchy_depth_intra_slice_luma | ue(v) |
|     if( pic_max_mtt_hierarchy_depth_intra_slice_luma != 0 ) { | |
|       pic_log2_diff_max_bt_min_qt_intra_slice_luma | ue(v) |
|       pic_log2_diff_max_tt_min_qt_intra_slice_luma | ue(v) |
|     } | |
|     if( pic_max_mtt_hierarchy_depth_inter_slice != 0 ) { | |
|       pic_log2_diff_max_bt_min_qt_inter_slice | ue(v) |
|       pic_log2_diff_max_tt_min_qt_inter_slice | ue(v) |
|     } | |
|     if( qtba_dual_tree_intra_flag ) { | |
|       pic_log2_diff_min_qt_min_cb_intra_slice_chroma | ue(v) |
|       pic_max_mtt_hierarchy_depth_intra_slice_chroma | ue(v) |
|       if( pic_max_mtt_hierarchy_depth_intra_slice_chroma != 0 ) { | |
|         pic_log2_diff_max_bt_min_qt_intra_slice_chroma | ue(v) |
|         pic_log2_diff_max_tt_min_qt_intra_slice_chroma | ue(v) |
|       } | |
|     } | |
|   } | |
| } | |
| if( cu_qp_delta_enabled_flag ) { | |
|   pic_cu_qp_delta_subdiv_intra_slice | ue(v) |
|   pic_cu_qp_delta_subdiv_inter_slice | ue(v) |
| } | |
| if( cu_chroma_qp_offset_enabled_flag ) { | |
|   pic_cu_chroma_qp_offset_subdiv_intra_slice | ue(v) |
|   pic_cu_chroma_qp_offset_subdiv_inter_slice | ue(v) |
| } | |
| if( sps_temporal_mvp_enabled_flag && !pps_temporal_mvp_enabled_idc ) | |
|   pic_temporal_mvp_enabled_flag | u(1) |
| if(!pps_mvd_l1_zero_idc ) | |
|   mvd_l1_zero_flag | u(1) |
| if( !pps_six_minus_max_num_merge_cand_plus1 ) | |
|   pic_six_minus_max_num_merge_cand | ue(v) |
| if( sps_affine_enabled_flag && | |
|   !pps_five_minus_max_num_subblock_merge_cand_plus1 ) | |
|   pic_five_minus_mn_num_subblock_merge_cand | ue(v) |
| if( sps_fpel_mmvd_enabled_flag) | |
|   pic_fpel_mmvd_enabled_flag | u(1) |
| if( sps_bdof_dmvr_slice_present_flag) | |
|   pic_disable_bdof_dmvr_flag | u(1) |
| if( sps_triangle_enabled_flag && MaxNumMergeCand >= 2 && | |
|   !pps_max_num_merge_cand_minus_max_num_triangle_cand_minus1 ) | |
|   pic_max_num_merge_cand_minus_max_num_triangle_cand | ue(v) |
| if ( sps_ibc_enabled_flag ) | |
|   pic_six_minus_max_num_ibc_merge_cand | ue(v) |
| if( sps_joint_cbcr_enabled_flag ) | |
|   pic_oint_cbcr_sign_flag | u(1) |
| if( sps_sao_enabled_flag ) { | |
|   pic_sao_enabled_present_flag | u(1) |
|   if( pic_sao_enabled_present_flag ) { | |
|     pic_sao_luma_enabled_flag | u(1) |
|     if( ChromaArrayType != 0 ) | |
|       pic_sao_chroma_enabled_flag | u(1) |
|   } | |
| } | |
| if( sps_alf_enabled_flag ) { | |
|   pic_alf_enabled_present_flag | u(1) |
|   if( pic_alf_enabled_present_flag ) { | |
|     pic_alf_enabled_flag | u(1) |
|     if( pic_alf_enabled_flag ) { | |
|       pic_num_alf_aps_ids_luma | u(3) |
|       for( i = 0; i < pic_num_alf_aps_ids_luma; i++ ) | |
|         pic_alf_aps_id_luma[ i ] | u(3) |

-continued

|  | Descriptor |
|---|---|
|     if( ChromaArrayType != 0 ) | |
|       pic_alf_chroma_idc | u(2) |
|       if( pic_alf_chroma_idc ) | |
|         pic_alf_aps_id_chroma | u(3) |
|     } | |
|   } | |
| } | |
| if ( !pps_dep_quant_enabled_flag ) | |
|   pic_dep_quant_enabled_flag | u(1) |
| if( !pic_dep_quant_enabled_flag ) | |
|   sign_data_hiding_enabled_flag | u(1) |
| if( deblocking_filter_override_enabled_flag ) { | |
|   pic_deblocking_filter_override_present_flag | u(1) |
|   if( pic_deblocking_filter_override_present_flag ) { | |
|     pic_deblocking_filter_override_flag | u(1) |
|     if( pic_deblocking_filter_override_flag ) { | |
|       pic_deblocking_filter_disabled_flag | u(1) |
|       if( !pic_deblocking_filter_disabled_flag ) { | |
|         pic_beta_offset_div2 | se(v) |
|         pic_tc_offset_div2 | se(v) |
|       } | |
|     } | |
|   } | |
| } | |
| if( sps_lmcs_enabled_flag ) { | |
|   pic_lmcs_enabled_flag | u(1) |
|   if( pic_lmcs_enabled_flag ) { | |
|     pic_lmcs_aps_id | u(2) |
|     if( ChromaArrayType != 0 ) | |
|       pic_chroma_residual_scale_flag | u(1) |
|   } | |
| } | |
| if( sps_scaling_list_enabled_flag ) { | |
|   pic_scaling_list_present_flag | u(1) |
|   if( pic_scaling_list_present_flag ) | |
|     pic_scaling_list_aps_id | u(3) |
| } | |
| if( picture_header_extension_present_flag ) { | |
|   ph_extension_length | ue(v) |
|   for( i = 0; i < ph_extension_length; i++ ) | |
|     ph_extension_data_byte[ i ] | u(8) |
| } | |
| rbsp_trailing_bits() | |
| } | |

3. Drawbacks of Existing Implementations

DMVR and BIO do not involve the original signal during refining the motion vectors, which may result in coding blocks with inaccurate motion information. Also, DMVR and BIO sometimes employ the fractional motion vectors after the motion refinements while screen videos usually have integer motion vectors, which makes the current motion information more inaccurate and make the coding performance worse.

When RPR is applied in VVC, RPR (ARC) may have the following problems:

1. With RPR, the interpolation filters may be different for adjacent samples in a block, which is undesirable in SIMD (Single Instruction Multiple Data) implementation.

2. The bounding region does not consider RPR.

3. It is noted that "The conformance cropping window offset parameters are only applied at the output. All internal decoding processes are applied to the uncropped picture size." However, those parameters may be used in the decoding process when RPR is applied.

4. When deriving the reference sample position, RPR only considers the ratio between two conformance windows. But the top-left offset difference between two conformance windows should also be considered.

5. The ratio between the width/height of a reference picture and that of the current picture is constrained in VVC. However, the ratio between the width/height of the conformance window of a reference picture and that of the conformance window of the current picture is not constrained.

6. Not all the syntax elements are handled properly in the picture header.

7. In current VVC, for TPM, GEO prediction mode, the chroma blending weights are derived regardless of the chroma sample location type of a video sequence. For example, in TPM/GEO, if chroma weights are derived from luma weights, the luma weights may be needed to be downsampled to match the sampling of the chroma signal. The chroma downsampling are normally applied assumes the chroma sample location type 0, which is widely used in ITU-R BT.601 or ITU-R BT.709 container. However, if a different chroma sample location type is used, this could result in a misalignment between the chroma samples and the downsampled luma samples, which may reduce the coding performance.

4. Example Techniques and Embodiments

The detailed embodiments described below should be considered as examples to explain general concepts. These embodiments should not be interpreted narrowly way. Furthermore, these embodiments can be combined in any manner.

The methods described below may be also applicable to other decoder motion information derivation technologies in addition to the DMVR and BIO mentioned below.

A motion vector is denoted by (mv_x, mv_y) wherein mv_x is the horizontal component and mv_y is the vertical component.

In this disclosure, the resolution (or dimensions, or width/height, or size) of a picture may refer to the resolution (or dimensions, or width/height, or size) of the coded/decoded picture, or may refer to the resolution (or dimensions, or width/height, or size) of the conformance window in the coded/decoded picture.

Motion Compensation in RPR

Figure 2:
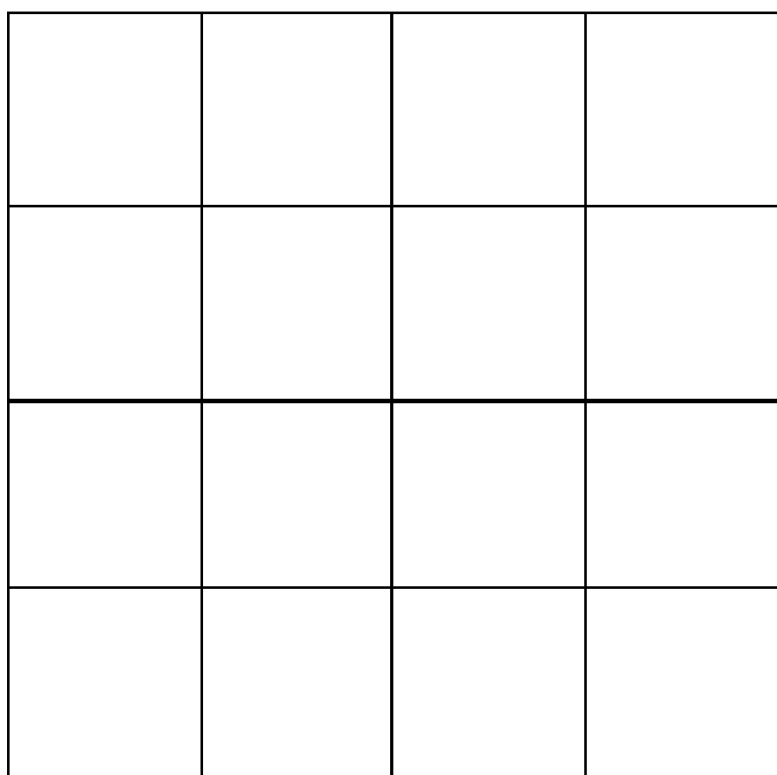
FIG. 2 shows an example of a 16×16 video block divided into 16 4×4 regions.
Figure 3A:
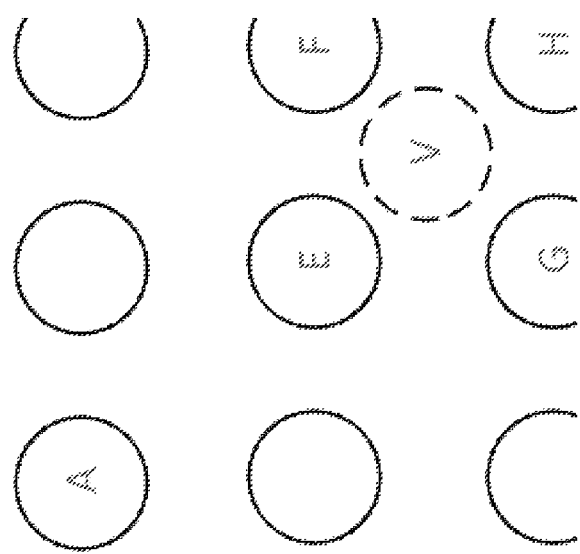
FIG. 3A shows an example of a specific position in a sample.
Figure 4A:
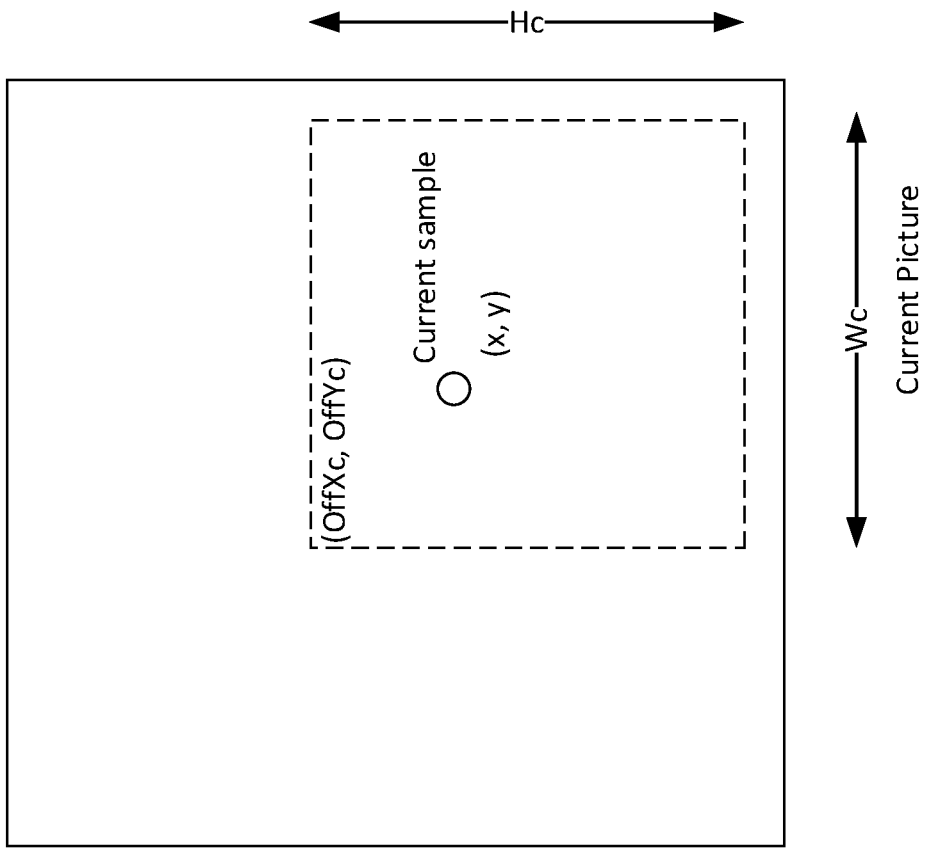
FIG. 4A shows an example of positions of the current sample and its reference sample.
Figure 4A:
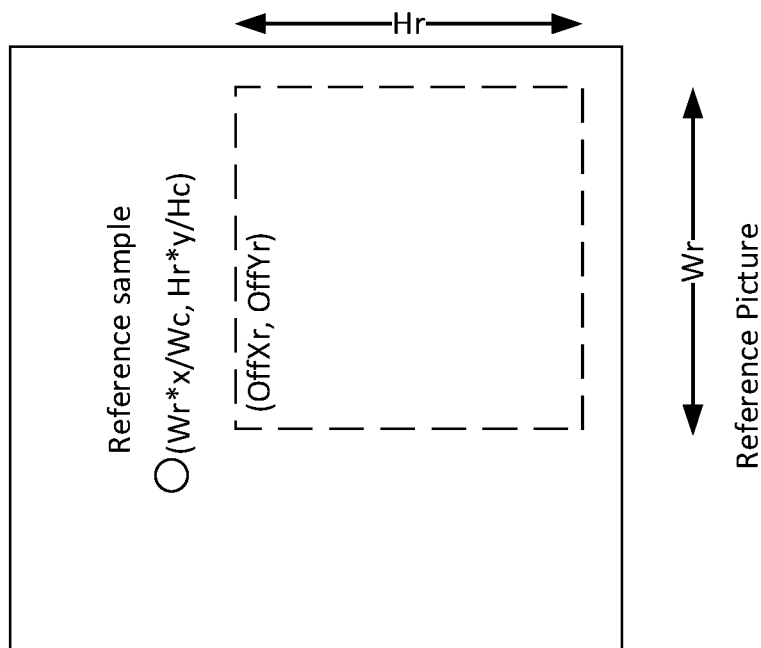
Figure 4B:
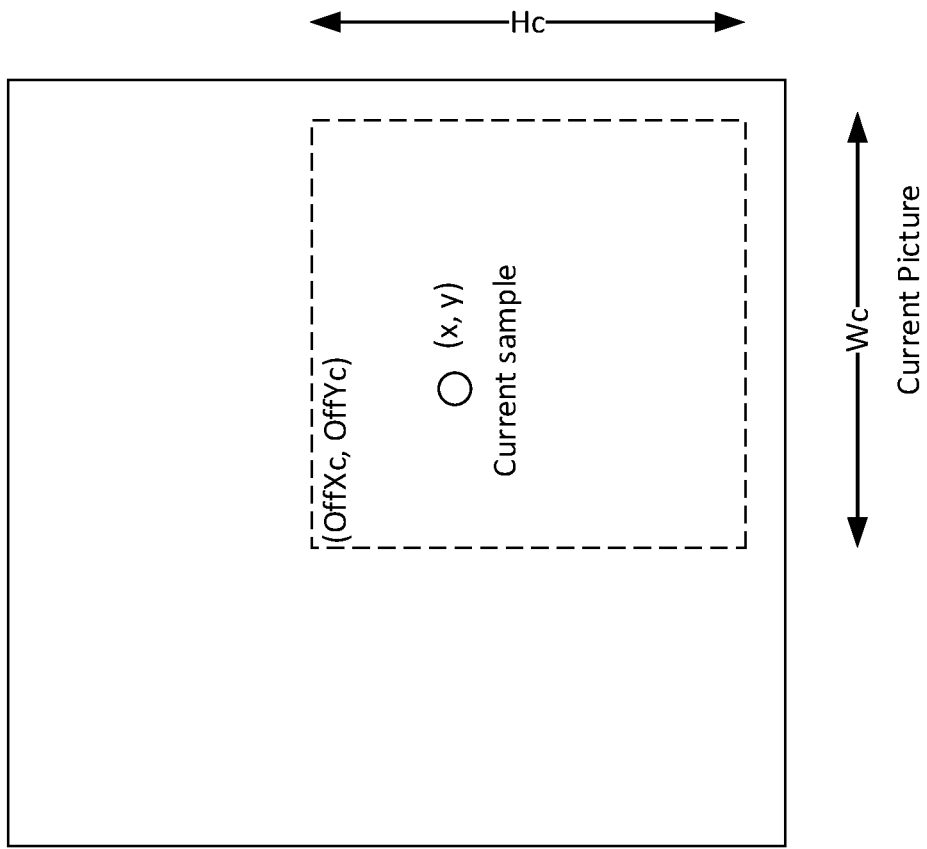
FIG. 4B shows another example of positions of the current sample and its reference sample.
Figure 4B:
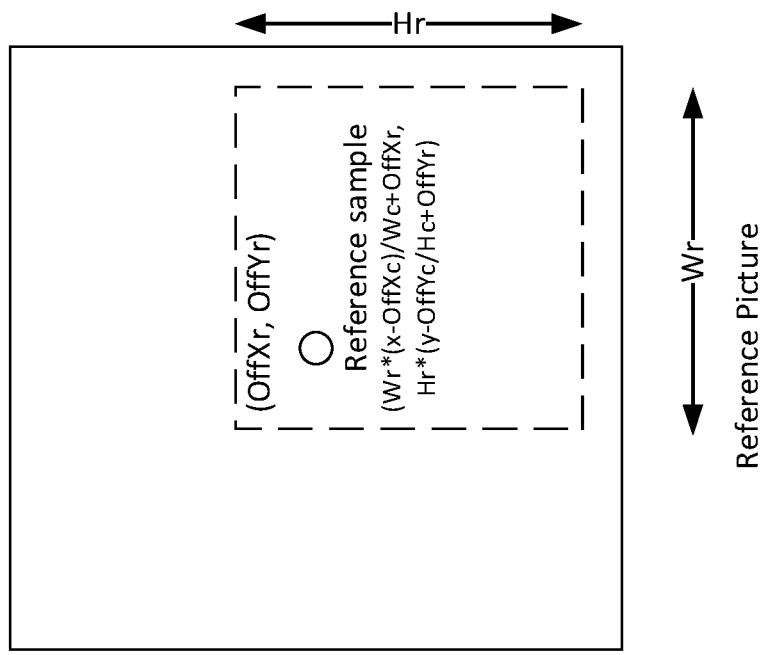

1. When the resolution of the reference picture is different to the current picture, or when the width and/or height of the reference picture is larger that of the current picture, predicted values for a group of samples (at least two samples) of a current block may be generated with the same horizontal and/or vertical interpolation filter.
   a. In one example, the group may comprise all samples in a region of the block.
      i. For example, a block may be divided into S M×N rectangles not overlapped with each other. Each M×N rectangle is a group. In an example as shown in FIG. 2, a 16×16 block can be divided into 16 4×4 rectangles, each of which is a group.
      ii. For example, a row with N samples is a group. N is an integer no larger than the block width. In one example, N is 4 or 8 or the block width.
      iii. For example, a column with N samples is a group. N is an integer no larger than the block height. In one example, N is 4 or 8 or the block height.
      iv. M and/or N may be pre-defined or derived on-the-fly, such as based on block dimension/coded information or signaled.
   b. In one example, samples in the group may have the same MV (denoted as shared MV).
   c. In one example, samples in the group may have MVs with the same horizontal component (denoted as shared horizontal component).
   d. In one example, samples in the group may have MVs with the same vertical component (denoted as shared vertical component).
   e. In one example, samples in the group may have MVs with the same fractional part of the horizontal component (denoted as shared fractional horizontal component).
      i. For example, suppose the MV for a first sample is (MV1x, MV1y) and the MV for a second sample is (MV2x, MV2y), it should be satisfied that MV1x & ($2^M-1$) is equal to MV2x & ($2^M-1$), where M denotes MV precision. For example, M=4.
   f. In one example, samples in the group may have MVs with the same fractional part of the vertical component (denoted as shared fractional vertical component).
      i. For example, suppose the MV for a first sample is (MV1x, MV1y) and the MV for a second sample is (MV2x, MV2y), it should be satisfied that MV1y & ($2^M-1$) is equal to MV2y & ($2^M-1$), where M denotes MV precision. For example, M=4.
   g. In one example, for a sample in the group to be predicted, the motion vector, denoted by $MV_b$, may be firstly derived according to the resolutions of the current picture and the reference picture (e.g. ($refx_L$, $refy_L$) derived in 8.5.6.3.1 in JVET-O2001-v14). Then, $MV_b$ may be further modified (e.g., being rounded/truncated/clipped) to MV' to satisfy the requirements such as the above bullets, and MV' will be used to derive the prediction sample for the sample.
      i. In one example, MV' has the same integer part as $MV_b$, and the fractional part of the MV' is set to be the shared fractional horizontal and/or vertical component.
      ii. In one example, MV' is set to be the one with the shared fractional horizontal and/or vertical component, and closest to $MV_b$.
   h. The shared motion vector (and/or shared horizontal component and/or shared vertical component and/or shared fractional vertical component and/or shared fractional vertical component) may be set to be the motion vector (and/or horizontal component and/or vertical component and/or fractional vertical component and/or fractional vertical component) of a specific sample in the group.
      i. For example, the specific sample may be at a corner of a rectangle-shaped group, such as "A", "B', "C" and "D" shown in FIG. 3A.
      ii. For example, the specific sample may be at a center of a rectangle-shaped group, such as "E", "F', "G" and "H" shown in FIG. 3A.
      iii. For example, the specific sample may be at an end of a row-shaped or column-shaped group, such as "A" and "D" shown in FIGS. 3B and 3C.
      iv. For example, the specific sample may be at a middle of a row-shaped or column-shaped group, such as "B" and "C" shown in FIGS. 3B and 3C.
      v. In one example, the motion vector of the specific sample may be the $MV_b$ mentioned in bullet g.
   i. The shared motion vector (and/or shared horizontal component and/or shared vertical component and/or shared fractional vertical component and/or shared fractional vertical component) may be set to be the motion vector (and/or horizontal component and/or vertical component and/or fractional vertical component and/or fractional vertical component) of a virtual sample located at a different position compared to all samples in this group.
      i. In one example, the virtual sample is not in the group, but it locates in the region covering all samples in the group.
         1) Alternatively, the virtual sample is located outside the region covering all samples in the group, e.g., next to the bottom-right position of the region.
      ii. In one example, the MV of a virtual sample is derived in the same way as a real sample but with different positions.
      iii. "V" in FIGS. 3A-3C shows three examples of virtual samples.
   j. The shared MV (and/or shared horizontal component and/or shared vertical component and/or shared fractional vertical component and/or shared fractional vertical component) may be set to be a function of MVs (and/or horizontal components and/or vertical components and/or fractional vertical components and/or fractional vertical components) of multiple samples and/or virtual samples.
   i. For example, the shared MV (and/or shared horizontal component and/or shared vertical component and/or shared fractional vertical component and/or shared fractional vertical component) may be set to be the average of MVs (and/or horizontal components and/or vertical components and/or fractional vertical components and/or fractional vertical components) of all or partial of samples in the group, or of sample "E", "F", "G", "H" in FIG. 3A, or of sample "E", "H" in FIG. 3A, or of sample "A", "B", "C", "D" in FIG. 3A, or of sample "A", "D" in FIG. 3A, or of sample "B", "C" in FIG. 3B, or of sample "A", "D" in FIG. 3B, or of sample "B", "C" in FIG. 3C, or of sample "A", "D" in FIG. 3C,
2. It is proposed that only integer MVs are allowed to perform the motion compensation process to derive the prediction block of a current block when the resolution of the reference picture is different to the current picture, or when the width and/or height of the reference picture is larger that of the current picture.
   a. In one example, the decoded motion vectors for samples to be predicted are rounded to integer MVs before being used.
   b. In one example, the decoded motion vector for samples to be predicted are rounded to the integer MV that is closest to the decoded motion vector.
   c. In one example, the decoded motion vector for samples to be predicted are rounded to the integer MV that is closest to the decoded motion vector in horizontal direction.
   d. In one example, the decoded motion vector for samples to be predicted are rounded to the integer MV that is closest to the decoded motion vector in vertical direction.
3. The motion vectors used in the motion compensation process for samples in a current block (e.g., shared MV/shared horizontal or vertical or fractional component/MV' mentioned in above bullets) may be stored in the decoded picture buffer and utilized for motion vector prediction of succeeding blocks in current/different pictures.
   a. Alternatively, the motion vectors used in the motion compensation process for samples in a current block (e.g., shared MV/shared horizontal or vertical or fractional component/MV' mentioned in above bullets) may be disallowed to be utilized for motion vector prediction of succeeding blocks in current/different pictures.
      i. In one example, the decoded motion vectors (e.g., $MV_b$ in above bullets) may be utilized for motion vector prediction of succeeding blocks in current/different pictures.
   b. In one example, the motion vectors used in the motion compensation process for samples in a current block may be utilized in the filtering process (e.g., deblocking filter/SAO/ALF).
      i. Alternatively, the decoded motion vectors (e.g., $MV_b$ in above bullets) may be utilized in the filtering process.
   c. In one example, such MV may be derived at sub-block level and may be stored for each sub-block.
4. It is proposed that the interpolation filters used in the motion compensation process to derive the prediction block of a current block may be selected depending on whether the resolution of the reference picture is different to the current picture, or whether the width and/or height of the reference picture is larger that of the current picture.
   a. In one example, the interpolation filters with less taps may be applied when condition A is satisfied, wherein condition A depends on the dimensions of the current picture and/or the reference picture.
      i. In one example, condition A is the resolution of the reference picture is different to the current picture.
      ii. In one example, condition A is the width and/or height of the reference picture is larger than that of the current picture.
      iii. In one example, condition A is W1>a*W2 and/or H1>b*H2, wherein (W1, H1) represents the width and height of the reference picture and (W2, H2) represents the width and height of the current picture, a and b are two factors, e.g. a=b=1.5.
      iv. In one example, condition A may also depend on whether bi-prediction is used.
      v. In one example, 1-tap filters are applied. In other words, an integer pixel without filtering is output as the interpolation result.
      vi. In one example, bi-linear filters are applied when the resolution of the reference picture is different to the current picture.
      vii. In one example, 4-tap filters or 6-tap filters are applied when the resolution of the reference picture is different to the current picture, or the width and/or height of the reference picture is larger than that of the current picture.
         1) The 6-tap filters may also be used for the affine motion compensation.
         2) The 4-tap filters may also be used for interpolation for chroma samples.
   b. In one example, padding samples are used to perform interpolation when the resolution of the reference picture is different to the current picture, or the width and/or height of the reference picture is larger that of the current picture.
   c. Whether to and/or how to apply the methods disclosed in bullet 4 may depend on the color components.
      i. For example, the methods are only applied on the luma component.
   d. Whether to and/or how to apply the methods disclosed in bullet 4 may depend on the interpolation filtering direction.
      i. For example, the methods are only applied on horizontal filtering.
      ii. For example, the methods are only applied on vertical filtering.
5. It is proposed that a two-stage process for prediction block generation is applied when the resolution of the reference picture is different to the current picture, or when the width and/or height of the reference picture is larger that of the current picture.
   a. In the first stage, a virtual reference block is generated by up-sampling or down-sampling a region in the reference picture depending on width and/or height of the current picture and the reference picture.
   b. In the second stage, the prediction samples are generated from the virtual reference block by applying interpolation filtering, independent of width and/or height of the current picture and the reference picture.

6. It is proposed that the calculation of top-left coordinate of the bounding block for reference sample padding (xSbInt$_L$, ySbInt$_L$) as in some embodiments may be derived depending on width and/or height of the current picture and the reference picture.
   a. In one example, the luma locations in full-sample units are modified as:

$x\text{Int}_i = \text{Clip3}(x\text{SbInt}_L - Dx, x\text{SbInt}_L + \text{sbWidth} + Ux, x\text{Int}_i)$, $y\text{Int}_i = \text{Clip3}(y\text{SbInt}_L - Dy, y\text{SbInt}_L + \text{sbHeight} + Uy, y\text{Int}_i)$ where Dx and/or Dy and/or Ux and/or Uy may depend on width and/or height of the current picture and the reference picture.
   b. In one example, the chroma locations in full-sample units are modified as:

$x\text{Int}i = \text{Clip3}(x\text{SbInt}_C - Dx, x\text{SbInt}_C + \text{sbWidth} + Ux, x\text{Int}i)$ $y\text{Int}i = \text{Clip3}(y\text{SbInt}_C - Dy, y\text{SbInt}_C + \text{sbHeight} + Uy, y\text{Int}i)$ where Dx and/or Dy and/or Ux and/or Uy may depend on width and/or height of the current picture and the reference picture.
7. Instead of storing/using the motion vectors for a block based on the same reference picture resolution as current picture, it is proposed to use the real motion vectors with the resolution difference taken into consideration.
   a. Alternatively, furthermore, when using the motion vector to generate the prediction block, there is no need to further change the motion vector according to the resolutions of the current picture and the reference picture (e.g. (refx$_L$, refy$_L$)).

Interaction Between RPR and Other Coding Tools

8. Whether to/how to apply filtering process (e.g., deblocking filter) may depend on the resolutions of reference pictures and/or the resolution of the current picture.
   a. In one example, the boundary strength (BS) settings in the deblocking filters may take the resolution differences into consideration in addition to motion vector differences.
      i. In one example, the scaled motion vector difference according to the current and reference pictures' resolutions may be used to determine the boundary strength.
   b. In one example, the strength of deblocking filter for a boundary between block A and block B may be set differently (e.g., being increased/decreased) if the resolution of at least one reference picture of block A is different to (or smaller than or larger than) the resolution of at least one reference picture of block B compared to the case that same resolutions are utilized for the two blocks.
   c. In one example, a boundary between block A and block B is marked as to be filtered (e.g., BS is set to 2) if the resolution of at least one reference picture of block A is different to (or smaller than or larger than) the resolution of at least one reference picture of block B.
   d. In one example, the strength of deblocking filter for a boundary between block A and block B may be set differently (e.g., being increased/decreased) if the resolution of at least one reference picture of block A and/or block B is different to (or smaller than or larger than) the resolution of the current picture compared to the case same resolution is utilized of the reference picture and current picture.
   e. In one example, a boundary between two blocks is marked to be filtered (e.g., BS is set to 2) if at least one reference picture of at least one block of the two has a resolution different to that of the current picture.
9. When a sub-picture exists, a conformance bitstream may should satisfy the reference picture must have the same resolution as the current picture.
   a. Alternatively, when a reference picture has a different resolution to the current picture, there must be no sub-picture in the current picture.
   b. Alternatively, for a sub-picture in the current picture, it is disallowed to use a reference picture that is with different resolution as the current picture.
      i. Alternatively, furthermore, the reference picture management may be invoked to exclude those reference pictures with different resolutions.
10. In one example, sub-pictures (e.g., how to split one picture to multiple sub-pictures) may be defined separately for pictures with different resolutions.
    In one example, the corresponding sub-picture in the reference picture can be derived by scaling and/or offsetting a sub-picture of the current picture, if the reference picture has a different resolution to the current picture.
11. PROF (prediction refinement with optical flow) may be enabled when the reference picture has a resolution different to that of the current picture.
    a. In one example, one set of MV (denoted as MV$_g$) may be generated for a group of samples and may be used for motion compensation as described in bullet 1. On the other hand, MV (denoted as MV$_p$) may be derived for each sample, and the difference (e.g., corresponds to the Av used in PROF) between the MV$_p$ and MV$_g$ together with the gradients (e.g., spatial gradients of the motion compensated blocks) may be used for deriving the prediction refinement.
    b. In one example, MV$_p$ may be with a different precision from MV$_g$. For example, MV$_p$ may be with 1/N-pel (N>0) precision, N=32, 64 etc.
    c. In one example, MV$_g$ may be with a different precision form the internal MV precision (e.g., 1/16-pel).
    d. In one example, the prediction refinement is added to the prediction block to generate refined prediction block.
    e. In one example, such method may be applied in each prediction direction.
    f. In one example, such method may be applied only in uni-prediction case.
    g. In one example, such method may be applied in uni-prediction or/and bi-prediction.
    h. In one example, such method may be applied only when the reference picture has a different resolution from the current picture.
12. It is proposed that only one MV may be utilized for a block/sub-block to perform the motion compensation process to derive the prediction block of a current block when the resolution of the reference picture is different to that of the current picture.
    a. In one example, the only MV for the block/sub-block may be defined as a function (e.g., average) of all MVs associated with each sample within the block/sub-block.

b. In one example, the only MV for the block/sub-block may be defined as a selected MV associated with a selected sample (e.g., center sample) within the block/sub-block.
c. In one example, only one MV may be utilized a 4×4 block or subblock (e.g., 4×1).
d. In one example, BIO may be further applied to compensate the precision loss due to a block-based motion vector.

13. A lazy mode without signalling any block-based motion vectors may be applied when the width and/or height of the reference picture is different from that of the current picture.
a. In one example, no motion vectors may be signaled and the motion compensation process is to approximate the case of a pure resolution change of a still image.
b. In one example, only a motion vector at picture/tile/brick/CTU level may be signal and related blocks may use the motion vector when resolution changes.

14. PROF may be applied to approximate motion compensation when the width and/or height of the reference picture is different to that of the current picture for blocks coded with affine prediction mode and/or non-affine prediction mode.
a. In one example, PROF may be enabled when the width and/or height of the reference picture and that of the current picture are different.
b. In one example, a set of affine motions may be generated by combining the indicated motion and resolution scaling and used by PROF.

15. Interweaved prediction (e.g. as proposed in JVET-K0102) may be applied to approximate motion compensation when the width and/or height of the reference picture is different to that of the current picture.
a. In one example, resolution change (zooming) is represented as an affine motion, and interweaved motion prediction may be applied.

16. LMCS and/or chroma residual scaling may be disabled when the width and/or height of the current picture is different to that of the IRAP picture in a same IRAP period.
a. In one example, when LMCS is disabled, the slice level flags such as slice_lmcs_enabled_flag, slice_lmcs_aps_id, and slice_chroma_residual_scale_flag may be not signaled and inferred to be 0.
b. In one example, when chroma residual scaling is disabled, the slice level flags such as slice_chroma_residual_scale_flag may be not signaled and inferred to be 0.

Constrains on RPR

17. RPR may be applied to coding blocks with block dimensions constrains.
a. In one example, for an M×N coding block, with M as the block width and N as the block height, when M*N<T or M*N<=T (such as T=256), RPR may be not used.
b. In one example, when M<K (or M<=K) (such as K=16) and/or N<L (or N<=L) (such as L=16), RPR may be not used.

18. Bitstream conformance may be added to restrict the ratio between the width and/or height of an active reference picture (or its conformance window) and that of the current picture (or its conformance window). Suppose refPicW and refPicH denote the width and height of reference picture, curPicW and curPicH denote the width and height of current picture,
a. In one example, when (refPicW÷curPicW) is equal to an integer number, the reference picture may be marked as active reference picture.
  i. Alternatively, when (refPicW÷curPicW) is equal to a factional number, the reference picture may be marked as not available.
b. In one example, when (refPicW÷curPicW) is equal to (X*n), where X denotes a fractional number such as X=½, and n denotes an integer number such as n=1, 2, 3, 4 . . . , the reference picture may be marked as active reference picture.
  i. In one example, when (refPicW÷curPicW) is not equal to (X*n), the reference picture may be marked as not available.

19. Whether to and/or how to enable a coding tool (e.g., bi-prediction/the whole triangular prediction mode (TPM)/blending process in TPM) for a M×N block may depend on the resolutions of reference pictures (or their conformance windows) and/or that of the current picture (or its conformance window).
a. In one example, M*N<T or M*N<=T (such as T=64).
b. In one example, M<K (or M<=K) (such as K=16) and/or N<L (or N<=L) (such as L=16).
c. In one example, the coding tool is not allowed when width/height of at least one reference picture is different to the current picture,
  i. In one example, the coding tool is not allowed when width/height of at least one reference picture of the block is larger that of the current picture.
d. In one example, the coding tool is not allowed when width/height of each reference picture of the block is different to that of the current picture,
  i. In one example, the coding tool is not allowed when width/height of each reference pictures is larger that of the current picture.
e. Alternatively, furthermore, when the coding tool is not allowed, motion compensation may be conducted with one MV as a uni-prediction.

Conformance Window Related

20. The conformance cropping window offset parameters (e.g., conf_win_left_offset) are signaled in N-pel precision instead of 1-pel wherein N is an positive integer greater than 1.
a. In one example, the actual offset may be derived as the signaled offset multiplied by N.
b. In one example, N is set to 4 or 8.

21. It is proposed that the conformance cropping window offset parameters are not only applied at the output. Certain internal decoding processes may depend on the cropped picture size (i.e., the resolution of a conformance window in a picture).

22. It is proposed that the conformance cropping window offset parameters in a first video unit (e.g. PPS) and in a second video unit may be different when the width and/or height of a picture denoted as (pic_width_in_luma_samples, pic_height_in_luma_samples) in the first video unit and second video unit are the same.

23. It is proposed that the conformance cropping window offset parameters in a first video unit (e.g. PPS) and in a second video unit should be the same in a conformance bitstream when the width and/or height of a picture denoted as (pic_width_in_luma_samples, pic_height_in_luma_samples) in the first video unit and second video unit are different.
a. It is proposed that the conformance cropping window offset parameters in a first video unit (e.g. PPS) and in a second video unit should be the same in a conformance bitstream no matter the width and/or height of a picture denoted as (pic_width_in_luma_samples, pic_height_in_luma_samples) in the first video unit and second video unit are the same or not.

24. Suppose the width and height of the conformance window defined in a first video unit (e.g. PPS) are denoted as W1 and H1, respectively. The width and height of the conformance window defined in a second video unit (e.g. PPS) are denoted as W2 and H2, respectively. The top-left position of the conformance window defined in a first video unit (e.g. PPS) are denoted as X1 and Y1. The top-left position of the conformance window defined in a second video unit (e.g. PPS) are denoted as X2 and Y2. The width and height of the coded/decoded picture (e.g. pic_width_in_luma_samples and pic_height_in_luma_samples) defined in a first video unit (e.g. PPS) are denoted as PW1 and PH1, respectively. The width and height of the coded/decoded picture defined in a second video unit (e.g. PPS) are denoted as PW2 and PH2.
   a. In one example, W1/W2 should be equal to X1/X2 in a conformance bitstream.
      i. Alternatively, W1/X1 should be equal to W2/X2 in a conformance bitstream.
      ii. Alternatively, W1*X2 should be equal to W2*X1 in a conformance bitstream.
   b. In one example, H1/H2 should be equal to Y1/Y2 in a conformance bitstream.
      i. Alternatively, H1/Y1 should be equal to H2/Y2 in a conformance bitstream.
      ii. Alternatively, H1*Y2 should be equal to H2*Y1 in a conformance bitstream.
   c. In one example, PW1/PW2 should be equal to X1/X2 in a conformance bitstream.
      i. Alternatively, PW1/X1 should be equal to PW2/X2 in a conformance bitstream.
      ii. Alternatively, PW1*X2 should be equal to PW2*X1 in a conformance bitstream.
   d. In one example, PH1/PH2 should be equal to Y1/Y2 in a conformance bitstream.
      i. Alternatively, PH1/Y1 should be equal to PH2/Y2 in a conformance bitstream.
      ii. Alternatively, PH1*Y2 should be equal to PH2*Y1 in a conformance bitstream.
   e. In one example, PW1/PW2 should be equal to W1/W2 in a conformance bitstream.
      i. Alternatively, PW1/W1 should be equal to PW2/W2 in a conformance bitstream.
      ii. Alternatively, PW1*W2 should be equal to PW2*W1 in a conformance bitstream.
   f. In one example, PH1/PH2 should be equal to H1/H2 in a conformance bitstream.
      i. Alternatively, PH1/H1 should be equal to PH2/H2 in a conformance bitstream.
      ii. Alternatively, PH1*H2 should be equal to PH2*H1 in a conformance bitstream.
   g. In a conformance bitstream, if PW1 is greater than PW2, W1 must be greater than W2.
   h. In a conformance bitstream, if PW1 is smaller than PW2, W1 must be smaller than W2.
   i. In a conformance bitstream, (PW1−PW2)*(W1−W2) must be no smaller than 0.
   j. In a conformance bitstream, if PH1 is greater than PH2, H1 must be greater than H2.
   k. In a conformance bitstream, if PH1 is smaller than PH2, H1 must be smaller than H2.
   l. In a conformance bitstream, (PH1−PH2)*(H1−H2) must be no smaller than 0.
   m. In a conformance bitstream, W1/W2 must be no larger than (or smaller than) PW1/PW2 if PW1>=PW2
   n. In a conformance bitstream, H1/H2 must be no larger than (or smaller than) PH1/PH2 if PH1>=PH2.

25. Suppose the width and height of the conformance window of the current picture are denoted as W and H, respectively. The width and height of the conformance window of a reference picture are denoted as W' and H', respectively. Then at least one constraint below should be followed by a conformance bit-stream.
   a. W*pw>=W'; pw is an integer such as 2.
   b. W*pw>W'; pw is an integer such as 2.
   c. W'*pw'>=W; pw' is an integer such as 8.
   d. W'*pw'>W; pw' is an integer such as 8.
   e. H*ph>=H'; ph is an integer such as 2.
   f. H*ph>H'; ph is an integer such as 2.
   g. H'*ph'>=H; ph' is an integer such as 8.
   h. H'*ph'>H; ph' is an integer such as 8.
   i. In one example, pw is equal to pw'.
   j. In one example, ph is equal to ph'.
   k. In one example, pw is equal to ph.
   l. In one example, pw' is equal to ph'.
   m. In one example, the above sub-bullets may be required to be satisfied by a conformance bitstream when W and H represent the width and height of the current picture, respectively. W' and H' represent the width and height of a reference picture.

26. It is proposed that the conformance window parameters are partially signaled.
   a. In one example, the top-left sample in a conformance window of a picture is the same one as that in the picture.
   b. For example, conf_win_left_offset as defined in VVC is not signaled and inferred to be zero.
   c. For example, conf_win_top_offset as defined in VVC is not signaled and inferred to be zero.

27. It is proposed that the derivation of the position (e.g. (refx$_L$, refy$_L$) as defined in VVC) of a reference sample may depend on the top-left position (e.g. (conf_win_left_offset, conf_win_top_offset) as defined in VVC) of the conformance window of the current picture and/or the reference picture. FIG. 4 shows examples of the samples positions derived as in VVC (a) and in a proposed method (b). Dashed rectangles represent the conformance windows.
   a. In one example, the dependency exists only when the width and/or the height of the current picture and that of the reference picture are different.
   b. In one example, the derivation of the horizontal position (e.g. refx$_L$ as defined in VVC) of a reference sample may depend on the left position (e.g. conf_win_left_offset as defined in VVC) of the conformance window of the current picture and/or the reference picture.
      i. In one example, the horizontal position (denoted as xSb') of the current sample relative to the top-left position of the conformance window in the current picture is calculated and used to derive the position of the reference sample.
         1) For example, xSb'=xSb (conf_win_left_offset<<Prec) is calculated and used to derive the position of the reference sample, wherein xSb represents the horizontal position of the current sample in the current picture. conf_win_left_offset represents the horizontal position of the top-left sample in the conformance window of the current picture. Prec presents the precision of xSb and xSb' wherein (xSb>>Prec) may show the actual horizontal coordinate of current sample relative to the current picture. For example, Prec=0 or Prec=4.

ii. In one example, horizontal position (denoted as Rx') of the reference sample relative to the top-left position of the conformance window in the reference picture is calculated.
1) The calculation of Rx' may depend on xSb', and/or a motion vector, and/or a resampling ratio.

iii. In one example, horizontal position (denoted as Rx) of the reference sample relative in the reference picture is calculated depending on Rx'.
1) For example, Rx=Rx'+(conf_win_left_offset ref<<Prec) is calculated, wherein conf_win_left_offset ref represents the horizontal position of the top-left sample in the conformance window of the reference picture. Prec presents the precision of Rx and Rx'. For example, Prec=0 or Prec=4.

iv. In one example, Rx may be calculated directly depending on xSb', and/or a motion vector, and/or a resampling ratio. In other words, the two steps of derivation on Rx' and Rx are combined into a one-step calculation.

v. Whether to and/or how to use the left position (e.g. conf_win_left_offset as defined in VVC) of the conformance window of the current picture and/or the reference picture may depend on the color components and/or color formats.
1) For example, conf_win_left_offset may be revised as conf_win_left_offset=conf_win_left_offset* SubWidthC, wherein SubWidthC defines the horizontal sampling step of a color component E.g., SubWidthC is equal to 1 for the luma component. SubWidthC is equal to 2 for a chroma component when the color format is 4:2:0 or 4:2:2.
2) For example, conf_win_left_offset may be revised as conf_win_left_offset=conf_win_left_offset/ SubWidthC, wherein SubWidthC defines the horizontal sampling step of a color component E.g., SubWidthC is equal to 1 for the luma component. SubWidthC is equal to 2 for a chroma component when the color format is 4:2:0 or 4:2:2.

c. In one example, the derivation of the vertical position (e.g. refy$_L$ as defined in VVC) of a reference sample may depend on the top position (e.g. conf_win_top_offset as defined in VVC) of the conformance window of the current picture and/or the reference picture.

i. In one example, the vertical position (denoted as ySb') of the current sample relative to the top-left position of the conformance window in the current picture is calculated and used to derive the position of the reference sample.
1) For example, ySb'=ySb−(conf_win_top_offset<<Prec) is calculated and used to derive the position of the reference sample, wherein ySb represents the vertical position of the current sample in the current picture. conf_win_top_offset represents the vertical position of the top-left sample in the conformance window of the current picture. Prec presents the precision of ySb and ySb'. For example, Prec=0 or Prec=4.

ii. In one example, the vertical position (denoted as Ry') of the reference sample relative to the top-left position of the conformance window in the reference picture is calculated.
1) The calculation of Ry' may depend on ySb', and/or a motion vector, and/or a resampling ratio.

iii. In one example, the vertical position (denoted as Ry) of the reference sample relative in the reference picture is calculated depending on Ry'.
1) For example, Ry=Ry'+(conf_win_top_offset ref<<Prec) is calculated, wherein conf_win_top_offset ref represents the vertical position of the top-left sample in the conformance window of the reference picture. Prec presents the precision of Ry and Ry'. For example, Prec=0 or Prec=4.

iv. In one example, Ry may be calculated directly depending on ySb', and/or a motion vector, and/or a resampling ratio. In other words, the two steps of derivation on Ry' and Ry are combined into a one-step calculation.

v. Whether to and/or how to use the top position (e.g. conf_win_top_offset as defined in VVC) of the conformance window of the current picture and/or the reference picture may depend on the color components and/or color formats.
1) For example, conf_win_top_offset may be revised as conf_win_top_offset=conf_win_top_offset* SubHeightC, wherein SubHeightC defines the vertical sampling step of a color component E.g., SubHeightC is equal to 1 for the luma component. SubHeightC is equal to 2 for a chroma component when the color format is 4:2:0.
2) For example, conf_win_top_offset may be revised as conf_win_top_offset=conf_win_top_offset/ SubHeightC, wherein SubHeightC defines the vertical sampling step of a color component E.g., SubHeightC is equal to 1 for the luma component. SubHeightC is equal to 2 for a chroma component when the color format is 4:2:0.

28. It is proposed that the integer part of the horizontal coordinate of a reference sample may be clipped to [minW, maxW]. Suppose the width and height of the conformance window of the reference picture are denoted as W and H, respectively. The width and height of the conformance window of a reference picture are denoted as W' and H'. The top-left position of the conformance window in the reference picture are denoted as (X0, Y0).
a. In one example, minW is equal to 0.
b. In one example, minW is equal to X0.
c. In one example, maxW is equal to W−1.

d. In one example, maxW is equal to W'−1.
e. In one example, maxW is equal to X0+W'−1.
f. In one example, minW and/or maxW may be modified based on color format and/or color component.
  i. For example, minW is modified to be minW*SubC.
  ii. For example, minW is modified to be minW/SubC.
  iii. For example, maxW is modified to be maxW*SubC.
  iv. For example, maxW is modified to be maxW/SubC.
  v. In one example, SubC is equal to 1 for the luma component.
  vi. In one example, SubC is equal to 2 for a chroma component when the color format is 4:2:0.
  vii. In one example, SubC is equal to 2 for a chroma component when the color format is 4:2:2.
  viii. In one example, SubC is equal to 1 for a chroma component when the color format is 4:4:4.
g. In one example, the whether to and/or how to do the clipping may depend on the dimensions of the current picture (or the conformance window in it) and the dimensions of the reference picture (or the conformance window in it).
  i. In one example, the clipping is done only when the dimensions of the current picture (or the conformance window in it) and the dimensions of the reference picture (or the conformance window in it) are different.

29. It is proposed that the integer part of the vertical coordinate of a reference sample may be clipped to [minH, maxH]. Suppose the width and height of the conformance window of the reference picture are denoted as W and H, respectively. The width and height of the conformance window of a reference picture are denoted as W' and H'. The top-left position of the conformance window in the reference picture are denoted as (X0, Y0).
a. In one example, minH is equal to 0.
b. In one example, minH is equal to Y0.
c. In one example, maxH is equal to H−1.
d. In one example, maxH is equal to H'−1.
e. In one example, maxH is equal to Y0+H'−1.
f. In one example, minH and/or maxH may be modified based on color format and/or color component.
  i. For example, minH is modified to be minH*SubC.
  ii. For example, minH is modified to be minH/SubC.
  iii. For example, maxH is modified to be maxH*SubC.
  iv. For example, maxH is modified to be maxH/SubC.
  v. In one example, SubC is equal to 1 for the luma component.
  vi. In one example, SubC is equal to 2 for a chroma component when the color format is 4:2:0.
  vii. In one example, SubC is equal to 1 for a chroma component when the color format is 4:2:2.
  viii. In one example, SubC is equal to 1 for a chroma component when the color format is 4:4:4.
g. In one example, the whether to and/or how to do the clipping may depend on the dimensions of the current picture (or the conformance window in it) and the dimensions of the reference picture (or the conformance window in it).
  i. In one example, the clipping is done only when the dimensions of the current picture (or the conformance window in it) and the dimensions of the reference picture (or the conformance window in it) are different.

In the following discussion, a first syntax element is asserted to be "corresponding" to a second syntax element, if the two syntax elements have an equivalent functionality but may be signaled at different video unit (e.g. VPS/SPS/PPS/slice header/picture header etc.)

30. It is proposed that a syntax element may be signaled in a first video unit (e.g. picture header or PPS) and no corresponding syntax element is signaled in a second video unit at a higher level (such as SPS) or a lower level (such as slice header).
a. Alternatively, a first syntax element may be signaled in the first video unit (e.g. picture header or PPS) and a corresponding second syntax element may be signaled in a second video unit at a lower level (such as slice header).
  i. Alternatively, an indicator may be signaled in the second video unit to inform whether the second syntax element is signaled thereafter.
  ii. In one example, the slice associated with the second video unit (such as slice header) may follow the indication of the second syntax element instead of the first one if the second one is signaled.
  iii. An indicator associated with the first syntax element may be signaled in the first video unit to inform whether the second syntax element is signaled in any slice (or other video unit) associated with the first video unit.
b. Alternatively, a first syntax element may be signaled in a first video unit at a higher level (such as VPS/SPS/PPS), and a corresponding second syntax element may be signaled in the second video unit (such as picture header).
  i. Alternatively, an indicator may be signaled to inform whether the second syntax element is signaled thereafter.
  ii. In one example, the picture (which may be partitioned into slices) associated with the second video unit may follow the indication of the second syntax element instead of the first one if the second one is signaled.
c. A first syntax element in the picture header may have an equivalent functionality as a second syntax element in the slice header as specified in section 2.6 (such as but limited to slice_temporal_mvp_enabled_flag, cabac_init_flag, six_minus_max_num_merge_cand, five_minus_max_num_subblock_merge_cand, slice_fpel_mmvd_enabled_flag, slice_disable_bdof_dmvr_flag, max_num_merge_cand_minus_max_num_triangle_cand, slice_fpel_mmvd_enabled_flag, slice_six_minus_max_num_ibc_merge_cand, slice_joint_cbcr_sign_flag, slice_qp_delta, . . . ) but control all slices of the picture.
d. A first syntax element in SPS as specified in section 2.6 may have an equivalent functionality as a second syntax element in the picture header (such as but limited to sps_bdof_dmvr_slice_present_flag, sps_mmvd_enabled_flag, sps_isp_enabled_flag, sps_mrl_enabled_flag, sps_mip_enabled_flag, sps_cclm_enabled_flag, sps_mts_enabled_flag) but control only the associated picture (which may be partitioned into slices).

e. A first syntax element in PPS as specified in section 2.7 may have an equivalent functionality as a second syntax element in the picture header (such as but limited to entropy_coding_sync_enabled_flag, entry_point_offsets_present_flag, cabac_init_present_flag, rpl1_idx_present_flag . . . ) but control only the associated picture (which may be partitioned into slices).
31. Syntax elements signaled in the picture header are decoupled from other syntax elements signaled or derived in the SPS/VPS/DPS.
32. Indications of enabling/disabling of DMVR and BDOF may be signaled separately in picture header, instead of being controlled by the same flag (e.g, pic_disable_bdof_dmvr_flag).
33. Indications of enabling/disabling of PROF/cross-component ALF/inter prediction with geometric partitioning (GEO) may be signaled in picture headers.
    a. Alternatively, the indication of enabling/disabling PROF in picture header may be conditionally signaled according to the PROF enabling flag in SPS.
    b. Alternatively, the indication of enabling/disabling cross-component ALF (CCALF) in picture header may be conditionally signaled according to the CCALF enabling flag in SPS.
    c. Alternatively, the indication of enabling/disabling GEO in picture header may be conditionally signaled according to the GEO enabling flag in SPS.
    d. Alternatively, furthermore, indications of enabling/disabling of PROF/cross-component ALF/inter prediction with geometric partitioning (GEO) in slice headers may be conditionally signaled according to those syntax elements signaled in picture header instead of SPS.
34. Indications of prediction types of slices/bricks/tiles (or other video units smaller than a picture) in the same picture may be signaled in picture header.
    a. In one example, an indication of whether all slices/bricks/tiles (or other video units smaller than a picture) are all intra-coded (e.g., all I slices) may be signaled in the picture header.
        i. Alternatively, furthermore, the slice types may not be signaled in slice header if the indication tells all slices within the picture are I slices.
    b. Alternatively, an indication of whether at least one of slices/bricks/tiles (or other video units smaller than a picture) is not intra-coded (e.g., at least one non-I slices) may be signaled in the picture header.
    c. Alternatively, an indication of whether all slices/bricks/tiles (or other video units smaller than a picture) are all with the same prediction types (e.g., I/P/B slices) may be signaled in the picture header.
        i. Alternatively, furthermore, the slice types may not be signaled in slice header.
        ii. Alternatively, furthermore, indication of tools which are allowed for specific prediction types (e.g, DMVR/BDOF/TPM/GEO are only allowed for B slices; dual tree is only allowed for I slices) may be conditionally signaled according to the indication of prediction types.
    d. Alternatively, furthermore, signaling of indications of enabling/disabling tools may depend on the indications of prediction types mentioned in above sub-bullets.
        i. Alternatively, furthermore, indications of enabling/disabling tools may be derived according to the indications of prediction types mentioned in above sub-bullets.
35. In this disclosure (bullet 1-bullet 29), the term "conformance window" may be replaced by other terms such as "scaling window". A scaling window may be signaled differently to the conformance window and is used to derive the scaling ratio and/or top-left offset used to derive the reference sample position for RPR.
    a. In one example, the scaling window may be constrained by the conformance window. For example, in a conformance bit-stream, the scaling window must be contained by the conformance window.
36. Whether and/or how to signal the allowed max block size for transform-skip-coded blocks may depend on the max block size for transform-coded blocks.
    a. Alternatively, the max block size for transform-skip-coded blocks cannot be larger than max block size for transform-coded blocks in a conformance bit-stream.
37. Whether and how to signal the indication of enabling Joint Cb—Cr Residue (JCCR) coding (such as sps_joint_cbcr_enabled_flag) may depend the color format (such as 4:0:0, 4:2:0 etc.)
    a. For example, the indication of enabling Joint Cb—Cr Residue (JCCR) may not be signaled if the color format is 4:0:0. An exemplary syntax design is as below:

| *if(ChromaArrayType!=0)* | |
|---|---|
| sps_joint_cbcr_enabled_flag | u(1) |

Downsampling Filter Type for Chroma Blending Mask Generation in TPM/GEO
38. The type of downsampling filter used for blending weights derivation for chroma samples may be signalled at video unit level (such as SPS/VPS/PPS/Picture header/Subpicture/Slice/Slice header/Tile/Brick/CTU/VPDU level).
    a. In one example, a high level flag may be signaled to switch between different chroma format types of content.
        i. In one example, a high level flag may be signaled to switch between chroma format type 0 and chroma format type 2.
        ii. In one example, a flag may be signaled for specifying whether the top-left downsampled luma weights in TPM/GEO prediction mode is collocated with the top-left luma weights (i.e., chroma sample location type 0).
        iii. In one example, a flag may be signaled for specifying whether the top-left downsampled luma sample in TPM/GEO prediction mode is horizontally co-sited with the top-left luma sample but vertically shifted by 0.5 units of luma samples relatively to the top-left luma sample (i.e., chroma sample location type 2).
    b. In one example, the type of downsampling filter may be signaled for 4:2:0 chroma format and/or 4:2:2 chroma format.
    c. In one example, a flag may be signaled for specifying the type of chroma downsampling filter used for TPM/GEO prediction.

i. In one example, the flag may be signaled for whether to use downsampling filter A or downsampling filter B for the chroma weights derivation in TPM/GEO prediction mode.
39. The type of downsampling filter used for blending weights derivation for chroma samples may be derived at video unit level (such as SPS/VPS/PPS/Picture header/Subpicture/Slice/Slice header/Tile/Brick/CTU/VPDU level).
   a. In one example, a look up table may be defined to specify the correspondence relationship between the chroma subsampling filter type and the chroma format types of content.
40. A specified downsampling filter may be used for TPM/GEO prediction mode in case of different chroma sample location type.
   a. In one example, chroma weights of TPM/GEO may be sub sampled from the collocated top-left luma weights in case of a certain chroma sample location type (e.g., chroma sample location type 0).
   b. In one example, in case of a certain chroma sample location type (e.g., chroma sample location type 0 or 2), a specified X-tap filter (X is a constant such as X=6 or 5) may be used for chroma weights sub sampling in TPM/GEO prediction mode.
41. In a video unit (e.g. SPS, PPS, picture header, slice header etc.), a first syntax element (such as a flag) may be signaled to indicate whether Multiple Transform Selection (MTS) is disabled for all blocks (slices/pictures).
   a. A second syntax element indicating how to apply MTS (such as enable MTS/disable MTS/implicit MTS/explicit MTS) on intra-coding blocks (slices/pictures) is signaled conditionally on the first syntax element. For example, the second syntax element is signaled only when the first syntax element indicates that MTS is not disabled for all blocks (slices/pictures).
   b. A third syntax element indicating how to apply MTS (such as enable MTS/disable MTS/implicit MTS/explicit MTS) on inter-coding blocks (slices/pictures) is signaled conditionally on the first syntax element. For example, the third syntax element is signaled only when the first syntax element indicates that MTS is not disabled for all blocks (slices/pictures).
   c. An exemplary syntax design is as below

```
...
enable_mts_flag
if( enable_mts_flag ){
   mts_control_intra
   mts_control_inter
}
...
``` d. The third syntax element may be signaled conditionally on whether Sub-Block Transform (SBT) is applied or not. An exemplary syntax design is as below

```
...
if (sps_sbt_enabled_flag)
   mts_control_inter
...
``` e. An exemplary syntax design is as below

| | |
|---|---|
| _if(sps_isp_enabled_flag)_ | — |
| _sps_isp_non_ dct2_enabled_flag_ | _u(1)_ |
| ... | — |
| _sps_intra_ mts_selection_ | _ue(v)_ |
| _sps_inter_ mts_selection_ | ue(v) |

5. Additional Embodiments

In the following, text changes are shown in underlined bold italicized font.

5.1. Embodiment of Constrains on the Conformance Window conf_win_left_offset, conf_win_right_offset, conf_win_top_offset, and conf_win_bottom_offset specify the samples of the pictures in the CVS that are output from the decoding process, in term sofa rectangular region specified in picture coordinates for output. When conformance_window_flag is equal to 0, the values of conf_win_left_offset, conf_win_right_offset, conf_win_top_offset, and conf_win_bottom_offset are inferred to be equal to 0.

The conformance cropping window contains the luma samples with horizontal picture coordinates from SubWidthC*conf_win_left_offset to pic_width_in_luma_samples−(SubWidthC*conf_win_right_offset+1) and vertical picture coordinates from SubHeightC*conf_win_top_offset to pic_height_in_luma_samples−(SubHeightC*conf_win_bottom_offset+1), inclusive.

The value of SubWidthC*(conf_win_left_offset+conf_win_right_offset) shall be less than pic_width_in_luma_samples, and the value of SubHeightC*(conf_win_top_offset+conf_win_bottom_offset) shall be less than pic_height_in_luma_samples.

The variables PicOutputWidthL and PicOutputHeightL are derived as follows:

$$\text{PicOutputWidth}L = \text{pic\_width\_in\_luma\_samples} - \text{SubWidth}C*(\text{conf\_win\_right\_offset} + \text{conf\_win\_left\_offset}) \quad (7\text{-}43)$$

$$\text{PicOutputHeight}L = \text{pic\_height\_in\_pic\_size\_units} - \text{SubHeight}C*(\text{conf\_win\_bottom\_offset} + \text{conf\_win\_top\_offset}) \quad (7\text{-}44)$$

When ChromaArrayType is not equal to 0, the corresponding specified samples of the two chroma array s are the samples having picture coordinates (x/SubWidthC, y/SubHeightC), where (x, y) are the picture coordinates of the specified luma samples.

_Let refPicOutput Width L and re fPicOutput HeightL be the PicOutputWidth L and PicOutput HeightL, respectively. reference picture of a current picture referring to this PPS. It is a requirement of bitstream conformance that all of the following conditions are satisified:_
- **_PicOutput WidthL * 2 shall be greater than or equal to refPicOutput WidthL._**
- **_PicOutput HeightL * 2 shall be greater than or equal to refPicOutput HeightL._**
- **_PicOutput WidthL shall be less than or equal to refPicOutput WidthL * 8._**

- *PicOutput HeightL shall be less than or equal to refPic Output HeightL * 8.*

5.2. Embodiment 1 of Reference Sample Position Derivation 8.5.6.3.1 General
. . .

The variable fRefWidth is set equal to the PicOutputWidthL of the reference picture in luma samples.

The variable fRefHeight is set equal to PicOutputHeightL of the reference picture in_luma_samples.

*The vairable fRefLeftOff is set equal to the conf_win_left_offset of the reference picture in luma samples.*

*The vairable fRefTopOffis set equal to the conf_win_top_offset of the reference picture in luma samples.*

The motion vector mvLX is set equal to (refMvLX mvOffset).

If cIdx is equal to 0, the following applies:
  The scaling factors and their fixed-point representations are defined as hori_scale_fp=((fRefWidth<<14)+(PicOutputWidth$L$>>1))/PicOutputWidth$L$    (8-753)

vert_scale_fp=((fRefHeight<<14)+(PicOutputHeight$L$>>1))/PicOutputHeight$L$    (8-754)

Let (xIntL, yIntL) be a luma location given in full-sample units and ($xFrac_L$, $yFrac_L$) be an offset given in 1/16-sample units. These variables are used only in this clause for specifying fractional-sample locations inside the reference sample arrays refPicLX.

The top-left coordinate of the bounding block for reference sample padding ($xSbInt_L$, $ySbInt_L$) is set equal to (xSb+(mvLX[0]>>4), ySb+(mvLX[1]>>4)).

For each luma sample location ($x_L$=0 . . . sbWidth 1+brdExtSize, $y_L$=0 . . . sbHeight-1+brdExtSize) inside the prediction luma sample array predSamplesLX, the corresponding prediction luma sample value predSamplesLX[$x_L$][$y_L$] is derived as follows:

Let ($refxSb_L$, $refySb_L$) and ($refx_L$, $refy_L$) be luma locations pointed to by a motion vector (refMvLX[0], refMvLX[1]) given in 1/16-sample units. The variables $refxSb_L$, $refx_L$, $refySb_L$, and $refy_L$ are derived as follows:

$refxSb_L$=((*(xSb - conf_win_left_offset)*<<4)+refMvLX[0])*hori_scale_fp    (8-755)

$refx_L$=((Sign(refxSb)*((Abs(refxSb)+128)>>8)+*$x_L$*((hori_scale_fp+8)>>4))+32)>>6    (8-756)

$refySb_L$=((*(ySb - conf_win_top_offset)*<<4)+refMvLX[1])*vert_scale_fp    (8-757)

$refy_L$=((Sign(refySb)*((Abs(refxSb)+128)>>8)+$y_L$*((vert_scale_fp+8)>>4))+32)>>6    (8-758)

-*$refx_L$ = $refx_L$+ (fRefLeftOff<<4).*
  -*$refy_L$= $refy_L$+ (fRefLeftOff<<4).*

The variables $xInt_L$, $yInt_L$, $xFrac_L$ and $yFrac_L$ are derived as follows:

$xInt_L$=$refx_L$>>4    (8-759)

$yInt_L$=$refy_L$>>4    (8-760)

$xFrac_L$=$refx_L$& 15    (8-761)

$yFrac_L$=$refy_L$& 15    (8-762)

If bdofFlag is equal to TRUE or (sps_affine_prof_enabled_flag is equal to TRUE and inter_affine_flag[xSb][ySb] is equal to TRUE), and one or more of the following conditions are true, the prediction luma sample value predSamplesLX[$x_L$][$y_L$] is derived by invoking the luma integer sample fetching process as specified in clause 8.5.6.3.3 with ($xInt_L$+($xFrac_L$>>3)−1), $yInt_L$+($yFrac_L$>>3)−1) and refPicLX as inputs.
    $x_L$ is equal to 0.
    $x_L$ is equal to sbWidth+1.
    $y_L$ is equal to 0.
    $y_L$ is equal to sbHeight+1.
  Otherwise, the prediction luma sample value predSamplesLX[$x_L$][$y_L$] is derived by invoking the lumasample 8-tap interpolation filtering process as specified in clause 8.5.6.3.2 with ($xIntL$−(brdExtSize>0? 1:0), $yIntL$−(brdExtSize>0? 1:0)), ($xFrac_L$, $yFrac_L$), ($xSbInt_L$, $ySbInt_L$), refPicLX, hpelIfIdx, sbWidth, sbHeight and (xSb, ySb) as inputs.

Otherwise (cIdx is not equal to 0), the following applies:
  Let ($xInt_C$, $yInt_C$) be a chromalocation given in full-sample units and (xFracC, yFracC) be an offset given in 1/32 sample units. The se variables are used only in this clause for specifying general fractional-sample locations inside the reference sample arrays refPicLX.

The top-left coordinate of the bounding block for reference sample padding (xSbIntC, ySbIntC) is set equal to ((xSb/SubWidthC)+(mvLX[0]>>5), (ySb/SubHeightC)+(mvLX[1]>>5)).

For each chroma sample location (xC=0 . . . sbWidth−1, yC=0 . . . sbHeight−1) inside the prediction chroma sample arrays predSamplesLX, the corresponding prediction chroma sample value pred SamplesLX[xC][yC] is derived as follows:

Let ($refxSb_C$, $refySb_C$) and ($refx_C$, $refy_C$) be chroma locations pointed to by a motion vector (mvLX[0], mvLX[1]) given in 1/32-sample units. The variables $refxSb_C$, $refySb_C$, $refx_C$ and $refy_C$ are derived as follows:

$refxSb_C$=((*(xSb - conf_win_left_offset)*/SubWidthC<<5)+mvLX[0])*hori_scale_fp    (8-763)

$refx_C$=((Sign($refxSb_C$)*((Abs($refxSb_C$)+256)>>9)+xC*((hori_scale_fp+8)>>4))+16)>>5    (8-764)

$refySb_C$=((*(ySb - conf_win_top_offset)*/SubHeightC<<5)+mvLX[1])*vert_scale_fp    (8-765)

$refy_C$=((Sign($refySb_C$)*((Abs($refySb_C$)+256)>>9)+yC*((vert_scale_fp+8)>>4))+16)>>5    (8-766)

-*$refx_C$ = $refx_C$+ (fRefLftOff/ SubWidthC<<5).*
  -*$refy_C$= $refy_C$+( fRefTopOff/Sub HeightC<<5).*

The variables $xInt_C$, $yInt_C$, $xFrac_C$ and $yFrac_C$ are derived as follows:

$xInt_C$=$refx_C$>>5    (8-767)

$yInt_C$=$refy_C$>>5    (8-768)

$xFrac_C = refy_C\ \&\ 31$ (8-769)

$yFrac_C = refy_C\ \&\ 31$ (8-770)

5.3. Embodiment 2 of Reference Sample Position Derivation 8.5.6.3.1 General

. . .

The variable fRefWidth is set equal to the PicOutputWidthL of the reference picture in luma samples.

The variable fRefHeight is set equal to PicOutputHeightL of the reference picture in_luma_samples.

*The vairable fRefLeftOff is set equal to the conf_win_left_offset of the reference picture in luma samples*

*The vairable fRefTopOff if set equal to the conf_win_top_offset of the reference picture in luma samples.*

The motion vector mvLX is set equal to (refMvLX−mvOffset).

If cIdx is equal to 0, the following applies:

The scaling factors and their fixed-point representations are defined as hori_scale_fp=((fRefWidth<<14)+(PicOutputWidthL>>1))/PicOutputWidthL (8-753)

vert_scale_fp=((fRefHeight<<14)+(PicOutputHeightL>>1))/PicOutputHeightL (8-754)

Let (xIntL, yIntL) be a luma location given in full-sample units and (xFracL, yFracL) be an offset given in 1/16-sample units. These variables are used only in this clause for specifying fractional-sample locations inside the reference sample arrays refPicLX.

The top-left coordinate of the bounding block for reference sample padding $(xSbInt_L, ySbInt_L)$ is set equal to (xSb+(mvLX[0]>>4), ySb+(mvLX[1]>>4)).

For each luma sample location ($x_L=0$ . . . sbWidth 1+brdExtSize, $y_L=0$ . . . sbHeight−1+brdExtSize) inside the prediction luma sample array predSamplesLX, the corresponding prediction luma sample value predSamplesLX[$x_L$][$y_L$] is derived as follows:

Let $(refxSb_L, refySb_L)$ and $(refx_L, refy_L)$ be luma locations pointed to by a motion vector (refMvLX[0], refMvLX[1]) given in 1/16-sample units. The variables $refxSb_L$, $refx_L$, $refySb_L$, and $refy_L$ are derived as follows:

$refxSb_L=((\underline{\textit{(xSb - conf\_win\_left\_offset)}}<<4)+refMvLX[0])$
*hori_scale_fp (8-755)

$refx_L=((Sign(refxSb)*((Abs(refxSb)+128)>>8)+x_L*((hori\_scale\_fp+8)>>4))\underline{\textbf{+(fRefLeftOff<<10)}}+32)>>6$ (8-756)

$refySb_L=((\underline{\textit{(ySb - conf\_win\_top\_offset)}}<<4)+refMvLX[1])*vert\_scale\_fp$ (8-757)

$refy_L=((Sign(refySb)*((Abs(refySb)+128)>>8)+y_L*((vert\_scale\_fp+8)>>4))\underline{\textbf{+(fRefTopOff<<10)}}+32)>>6$ (8-758)

The variables $xInt_L$, $yInt_L$, $xFrac_L$ and $yFrac_L$ are derived as follows:

$xInt_L = refx_L >> 4$ (8-759)

$yInt_L = refy_L >> 4$ (8-760)

$xFrac_L = refx_L\ \&\ 15$ (8-761)

$yFrac_L = refy_L\ \&\ 15$ (8-762)

If bdofFlag is equal to TRUE or (sps_affine_prof_enabled_flag is equal to TRUE and inter_affine_flag [xSb][ySb] is equal to TRUE), and one or more of the following conditions are true, the prediction luma sample value predSamplesLX[$x_L$][$y_L$] is derived by invoking the luma integer sample fetching process as specified in clause 8.5.6.3.3 with ($xInt_L+(xFrac_L>>3)-1$), $yInt_L+(yFrac_L>>3)-1$) and refPicLX as inputs.

$x_L$ is equal to 0.

$x_L$ is equal to sbWidth+1.

$y_L$ is equal to 0.

$y_L$ is equal to sbHeight+1.

Otherwise, the prediction luma sample value predSamplesLX[$x_L$][$y_L$] is derived by invoking the lumasample 8-tap interpolation filtering process as specified in clause 8.5.6.3.2 with ($xInt_L$−(brdExtSize>0? 1:0), yIntL−(brdExtSize>0? 1:0)), (xFracL, yFracL), ($xSbInt_L$, $ySbInt_L$), refPicLX, hpelIfIdx, sbWidth, sbHeight and (xSb, ySb) as inputs.

Otherwise (cIdx is not equal to 0), the following applies:

Let (xIntC, yIntC) be a chromalocation given in full-sample units and (xFracC, yFracC) be an offset given in 1/32 sample units. The se variables are used only in this clause for specifying general fractional-sample locations inside the reference sample arrays refPicLX.

The top-left coordinate of the bounding block for reference sample padding (xSbIntC, ySbIntC) is set equal to ((xSb/SubWidthC)+(mvLX[0]>>5), (ySb/SubHeightC)+(mvLX[1]>>5)).

For each chroma sample location (xC=0 . . . sbWidth 1, yC=0 . . . sbHeight−1) inside the prediction chroma sample arrays predSamplesLX, the corresponding prediction chroma sample value predSamplesLX[xC][yC] is derived as follows:

Let $(refxSb_C, refySb_C)$ and $(refx_C, refy_C)$ be chroma locations pointed to by a motion vector (mvLX[0], mvLX[1]) given in 1/32-sample units. The variables $refxSb_C$, $refySb_C$, $refx_C$ and $refy_C$ are derived as follows:

$refxSb_C=((\underline{\textit{(xSb - conf\_win\_left\_offset)}}/SubWidthC<<5)+mvLX[0])*hori\_scale\_fp$ (8-763)

$refx_C=((Sign(refxSb_C)*((Abs(refxSb_C)+256)>>9)+xC*((hori\_scale\_fp+8)>>4))+16)>>5$ (8-764)

$refySb_C=((\underline{\textit{(ySb - conf\_win\_top-offset)}}/SubHeightC<<5)+mvLX[1])*vert\_scale\_fp$ (8-765)

$refy_C=((Sign(refxSb_C)*((Abs(refxSb_C)+256)>>9)+yC*((vert\_scale\_fp+8)>>4))+16)>>5$ (8-766)

*−$refx_C = refx_C +(\ fRefLeftOff/\ SubWidthC<<5)$.*

*−$refy_C = refy_C +(\ fRefTopOff/\ SubHeightC<<5)$.*

The variables $xInt_C$, $yInt_C$, $xFrac_C$ and $yFrac_C$ are derived as follows:

$xInt_C = refx_C >> 5$ (8-767)

$yInt_C = refy_C >> 5$ (8-768)

$xFrac_C = refy_C\ \&\ 31$ (8-769)

$yFrac_C = refy_C\ \&\ 31$ (8-770)

5.4. Embodiment 3 of Reference Sample Position Derivation 8.5.6.3.1 General

...

The variable fRefWidth is set equal to the PicOutputWidthL of the reference picture in luma samples.

The variable fRefHeight is set equal to PicOutputHeightL of the reference picture in_luma_samples.

*The vairable fRefLeftOffis set equal to the conf_win_left_ offetofthe reference picture in luma samples.*

*The vairable fRefTopOffis set equal to the conf_win_top_ offset of the referencepicture in luma samples.*

The motion vector mvLX is set equal to (refMvLX−mvOffset).

If cIdx is equal to 0, the following applies:
The scaling factors and their fixed-point representations are defined as $$\text{hori\_scale\_}fp=((\text{fRefWidth}<<14)+(\text{PicOutputWidth}L>>1))/\text{PicOutputWidth}L \quad (8\text{-}753)$$

$$\text{vert\_scale\_}fp=((\text{fRefHeight}<<14)+(\text{PicOutputHeight}L>>1))/\text{PicOutputHeight}L \quad (8\text{-}754)$$

Let (xIntL, yIntL) be a luma location given in full-sample units and (xFracL, yFracL) be an offset given in 1/16-sample units. These variables are used only in this clause for specifying fractional-sample locations inside the reference sample arrays refPicLX.

The top-left coordinate of the bounding block for reference sample padding $(xSbInt_L, ySbInt_L)$ is set equal to $(xSb+(mvLX[0]>>4), ySb+(mvLX[1]>>4))$.

For each luma sample location $(x_L=0 \ldots \text{sbWidth}-1+\text{brdExtSize}, y_L=0 \ldots \text{sbHeight}-1+\text{brdExtSize})$ inside the prediction luma sample array predSamplesLX, the corresponding prediction luma sample value $\text{predSamplesLX}[x_L][y_L]$ is derived as follows:

Let $(\text{refxSb}_L, \text{refySb}_L)$ and $(\text{refx}_L, \text{refy}_L)$ be luma locations pointed to by a motion vector (refMvLX[0], refMvLX[1]) given in 1/16-sample units. The variables $\text{refxSb}_L$, $\text{refx}_L$, $\text{refySb}_L$, and $\text{refy}_L$ are derived as follows:

$$\text{refxSb}_L=((\boldsymbol{\textit{(xSb - conf\_win\_left\_offset)}})<<4)+\text{refMv}LX[0])*\text{hori\_scale\_}fp \quad (8\text{-}755)$$

$$\text{refx}_L=((\text{Sign}(\text{refxSb})*((\text{Abs}(\text{refxSb})+128)>>8)+x_L*((\text{hori\_scale\_}fp+8)>>4)) \boldsymbol{\textit{+(fRefLeftOff}<<10)}+32)>>6 \quad (8\text{-}756)$$

$$\text{refySb}_L=((\boldsymbol{\textit{(ySb - conf\_win\_top\_offset)}}<<4)+\text{refMv}LX[1])*\text{vert\_scale\_}fp \quad (8\text{-}757)$$

$$\text{refy}_L=((\text{Sign}(\text{refySb})*((\text{Abs}(\text{refySb})+128)>>8)+y_L*((\text{vert\_scale\_}fp+8)>>4))\boldsymbol{\textit{+(fRefTopOff}<<10)}+32)>>6 \quad (8\text{-}758)$$

The variables $\text{xInt}_L$, $\text{yInt}_L$, $\text{xFrac}_L$ and $\text{yFrac}_L$ are derived as follows:

$$x\text{Int}_L=\text{refx}_L>>4 \quad (8\text{-}759)$$

$$y\text{Int}_L=\text{refy}_L>>4 \quad (8\text{-}760)$$

$$x\text{Frac}_L=\text{refx}_L \ \& \ 15 \quad (8\text{-}761)$$

$$y\text{Frac}_L=\text{refy}_L \ \& \ 15 \quad (8\text{-}762)$$

If bdofFlag is equal to TRUE or (sps_affine_prof_enabled_flag is equal to TRUE and inter_affine_flag[xSb][ySb] is equal to TRUE), and one or more of the following conditions are true, the prediction luma sample value $\text{predSamplesLX}[x_L][y_L]$ is derived by invoking the luma integer sample fetching process as specified in clause 8.5.6.3.3 with $(x\text{Int}_L+(x\text{Frac}_L>>3)-1)$, $y\text{Int}_L+(y\text{Frac}_L>>3)-1)$ and refPicLX as inputs.

$x_L$ is equal to 0.

$x_L$ is equal to sbWidth+1.

$y_L$ is equal to 0.

$y_L$ is equal to sbHeight+1.

Otherwise, the prediction luma sample value $\text{predSamplesLX}[x_L][y_L]$ is derived by invoking the luma sample 8-tap interpolation filtering process as specified in clause 8.5.6.3.2 with (xIntL−(brdExtSize>0? 1:0), yIntL−(brdExtSize>0? 1:0)), (xFracL, yFracL), $(xSbInt_L, ySbInt_L)$, refPicLX, hpelIfIdx, sbWidth, sbHeight and (xSb, ySb) as inputs.

Otherwise (cIdx is not equal to 0), the following applies:

Let (xIntC, yIntC) be a chroma location given in full-sample units and (xFracC, yFracC) be an offset given in 1/32 sample units. These variables are used only in this clause for specifying general fractional-sample locations inside the reference sample arrays refPicLX.

The top-left coordinate of the bounding block for reference sample padding (xSbIntC, ySbIntC) is set equal to ((xSb/SubWidthC)+(mvLX[0]>>5), (ySb/SubHeightC)+(mvLX[1]>>5)).

For each chroma sample location (xC=0 . . . sbWidth−1, yC=0 . . . sbHeight−1) inside the prediction chroma sample arrays predSamplesLX, the corresponding prediction chroma sample value predSamplesLX[xC][yC] is derived as follows:

Let $(\text{refxSb}_C, \text{refySb}_C)$ and $(\text{refx}_C, \text{refy}_C)$ be chroma locations pointed to by a motion vector (mvLX[0], mvLX[1]) given in 1/32-sample units. The variables $\text{refxSb}_C$, $\text{refySb}_C$, $\text{refx}_C$ and $\text{refy}_C$ are derived as follows:

$$\text{refxSb}_C=((\boldsymbol{\textit{(xSb - conf\_win\_left\_offset)}}/\text{SubWidth}C<<5)+\text{mv}LX[0])*\text{hori\_scale\_}fp \quad (8\text{-}763)$$

$$\text{refx}_C=((\text{Sign}(\text{refxSb}_C)*((\text{Abs}(\text{refxSb}_C)+256)>>9)+xC*((\text{hori\_scale\_}fp+8)>>4))\boldsymbol{\textit{+ (fRefLeftOff/ (SubWidthC <<10)}}+16)>>5 \quad (8\text{-}764)$$

$$\text{refySb}_C=((\boldsymbol{\textit{(ySb - conf\_}}/\text{SubHeight}C<<5)+\text{mv}LX[1])*\text{vert\_scale\_}fp \quad (8\text{-}765)$$

$$\text{refy}_C=((\text{Sign}(\text{refySb}_C)*((\text{Abs}(\text{refySb}_C)+256)>>9)+yC*((\text{vert\_scale\_}fp+8)>>4))\boldsymbol{\textit{win\_top\_offset)}} \boldsymbol{\textit{+ (fRefTopOff/ SubHeightC <<10)}}+16)>>5 \quad (8\text{-}766)$$

The variables $\text{xInt}_C$, $\text{yInt}_C$, $\text{xFrac}_C$ and $\text{yFrac}_C$ are derived as follows:

$$x\text{Int}_C=\text{refx}_C>>5 \quad (8\text{-}767)$$

$$y\text{Int}_C=\text{refy}_C>>5 \quad (8\text{-}768)$$

$x\text{Frac}_C = \text{refy}_C \,\&\, 31$ \hfill (8-769)

$y\text{Frac}_C = \text{refy}_C \,\&\, 31$ \hfill (8-770)

5.5. Embodiment 1 of Reference Sample Position Clipping 8.5.6.3.1 General

Inputs to this process are:
 a luma location(xSb, ySb) specifying the top-left sample of the current coding subblock relative to the top-left luma sample of the current picture,
 a variable sbWidth specifying the width of the current coding subblock,
 a variable sbHeight specifying the height of the current coding subblock,
 a motion vector offset mvOffset,
 a refined motion vector refMvLX,
 the selected reference picture sample array refPicLX,
 the half sample interpolation filter index hpelIfIdx,
 the bi-directional optical flow flag bdofFlag,
 a variable cIdx specifying the colour component index of the current block.

Outputs of this process are:
 an (sbWidth+brdExtSize)×(sbHeight+brdExtSize) array predSamplesLX of prediction sample values.

The prediction block border extension size brdExtSize is derived as follows:

brdExtSize=(bdofFhg||(inter_affine_flag[xSb][ySb]&& sps_affine_prof_enabled_flag))?2:0 \hfill (8-752)

The variable fRefWidth is set equal to the PicOutputWidthL of the reference picture in luma samples.

The variable fRefHeight is set equal to PicOutputHeightL of the reference picture in luma samples.

The motion vector mvLX is set equal to (refMvLX−mvOffset).

If cIdx is equal to 0, the following applies:
  The scaling factors and their fixed-point representations are defined as hori_scale_fp=((fRefWidth<<14)+(PicOutputWidthL>>1))/PicOutputWidthL \hfill (8-753)

vert_scale_fp=((fRefHeight<<14)+(PicOutputHeightL>>1))/PicOutputHeightL \hfill (8-754)

Let (xIntL, yIntL) be a luma location given in full-sample units and (xFracL, yFracL) be an offset given in 1/16-sample units. These variables are used only in this clause for specifying fractional-sample locations inside the reference sample arrays refPicLX.
  The top-left coordinate of the bounding block for reference sample padding $(x\text{SbInt}_L, y\text{SbInt}_L)$ is set equal to (xSb+(mvLX[0]>>4), ySb+(mvLX[1]>>4)).
  For each luma sample location $(x_L=0 \ldots \text{sbWidth}-1+\text{brdExtSize}, y_L=0 \ldots \text{sbHeight }1+\text{brdExtSize})$ inside the prediction luma sample array predSamplesLX, the corresponding prediction luma sample value predSamplesLX$[x_L][y_L]$ is derived as follows:
   Let $(\text{refxSb}_L, \text{refySb}_L)$ and $(\text{refx}_L, \text{refy}_L)$ be luma locations pointed to by a motion vector (refMvLX[0], refMvLX[1]) given in 1/16-sample units. The variables $\text{refxSb}_L$, $\text{refx}_L$, $\text{refySb}_L$, and $\text{refy}_L$ are derived as follows:

$\text{refxSb}_L=((x\text{Sb}<<4)+\text{refMv}LX[0])*\text{hori\_scale\_}fp$ \hfill (8-755)

$\text{refx}_L=((\text{Sign}(\text{refxSb})*((\text{Abs}(\text{refxSb})+128)>>8)+x_L*((\text{hori\_scale\_}fp+8)>>4))+32)>>6$ \hfill (8-756)

$\text{refySb}_L=((y\text{Sb}<<4)+\text{refMv}LX[1])*\text{vert\_scale\_}fp$ \hfill (8-757)

$\text{refy}_L=((\text{Sign}(\text{refySb})*((\text{Abs}(\text{refySb})+128)>>8)+y_L*((\text{vert\_scale\_}fp+8)>>4))+32)>>6$ \hfill (8-758)

The variables $x\text{Int}_L$, $y\text{Int}_L$, $x\text{Frac}_L$ and $y\text{Frac}_L$ are derived as follows:

$x\text{Int}_L=$ Clip3(0, fRefWidth -1, refxL >> 4) \hfill (8-759)

$y\text{Int}_L=$ Clip3(0, fRefHeight -1, refyL >> 4) \hfill (8-760)

$x\text{Frac}_L=\text{refx}_L \,\&\, 15$ \hfill (8-761)

$y\text{Frac}_L=\text{refy}_L \,\&\, 15$ \hfill (8-762)

If bdofFlag is equal to TRUE or (sps_affine_prof_enabled_flag is equal to TRUE and inter_affine_flag [xSb][ySb] is equal to TRUE), and one or more of the following conditions are true, the prediction luma sample value predSamplesLX$[x_L][y_L]$ is derived by invoking the luma integer sample fetching process as specified in clause 8.5.6.3.3 with $(x\text{Int}_L+(x\text{Frac}_L>>3)-1)$, $y\text{Int}_L+(y\text{Frac}_L>>3)-1)$ and refPicLX as inputs.
   $x_L$ is equal to 0.
   $x_L$ is equal to sbWidth+1.
   $y_L$ is equal to 0.
   $y_L$ is equal to sbHeight+1.
  Otherwise, the prediction luma sample value predSamplesLX$[x_L][y_L]$ is derived by invoking the luma sample 8-tap interpolation filtering process as specified in clause 8.5.6.3.2 with (xIntL−(brdExtSize>0? 1:0), yIntL−(brdExtSize>0? 1:0)), (xFracL, yFracL), $(x\text{SbInt}_L, y\text{SbInt}_L)$, refPicLX, hpelIfIdx, sbWidth, sbHeight and (xSb, ySb) as inputs.
 Otherwise (cIdx is not equal to 0), the following applies:
  Let (xIntC, yIntC) be a chroma location given in full-sample units and $(x\text{Frac}_C, y\text{Frac}_C)$ be an offset given in 1/32 sample units. These variables are used only in this clause for specifying general fractional-sample locations inside the reference sample arrays refPicLX.
  The top-left co ordinate of the bounding block for reference sample padding (xSbIntC, ySbIntC) is set equal to ((xSb/SubWidthC)+(mvLX[0]>>5), (ySb/SubHeightC)+(mvLX[1]>>5)).
  For each chroma sample location (xC=0 ... sbWidth−1, yC=0 ... sbHeight−1) inside the prediction chroma sample arrays predSamplesLX, the corresponding prediction chroma sample value predSamplesLX[xC][yC] is derived as follows:
   Let $(\text{refxSb}_C, \text{refySb}_C)$ and $(\text{refx}_C, \text{refy}_C)$ be chroma locations pointed to by a motion vector (mvLX[0], mvLX[1]) given in 1/32-sample units. The variables $\text{refxSb}_C$, $\text{refySb}_C$, $\text{refx}_C$ and $\text{refy}_C$ are derived as follows:

$\text{refxSb}_C=((x\text{Sb}/\text{SubWidth}C<<5)+\text{mv}LX[0])*\text{hori\_scale\_}fp$ \hfill (8-763)

$\text{refx}_C=((\text{Sign}(\text{refxSb}_C)*((\text{Abs}(\text{refxSb}_C)+256)>>9)+xC*((\text{hori\_scale\_}fp+8)>>4))+16)>>5$ \hfill (8-764)

$\text{refySb}_C=((y\text{Sb}/\text{SubHeight}C<<5)+\text{mv}LX[1])*\text{vert\_scale\_}fp$ \hfill (8-765)

$\text{refy}_C=((\text{Sign}(\text{refySb}_C)\text{refySb}C)*((\text{Abs}(\text{refySb}_C)+256)>>9)+yC*((\text{vert\_scale\_}fp+8)>>4))+16)>>5$ \hfill (8-766)

The variables $xInt_C$, $yInt_C$, $xFrac_C$ and $yFrac_C$ are derived as follows:

$xInt_C =$ *Clip3(0,fRe fWidth/Sub WidthC-1,refxC >> 5)* (8-767)

$yInt_C =$ *Clip3(0,fRe fHeight/Sub HeightC-1, refyC >> 5)* (8-768)

$xFrac_C = refy_C$ & 31 (8-769)

$yFrac_C = refy_C$ & 31 (8-770)

The prediction sample value predSamplesLX[xC][yC] is derived by invoking the process specified in clause 8.5.6.3.4 with $(xInt_C, yInt_C)$, $(xFrac_C, yFrac_C)$, (xSbIntC, ySbIntC), sbWidth, sbHeight and refPicLX as inputs.

5.6. Embodiment 2 of Reference Sample Position Clipping 8.5.6.3.1 General

Inputs to this process are:
- a luma location(xSb, ySb) specifying the top-left sample of the current coding subblock relative to the top-left luma sample of the current picture,
- a variable sbWidth specifying the width of the current coding subblock,
- a variable sbHeight specifying the height of the current coding subblock,
- a motion vector offset mvOffset,
- a refined motion vector refMvLX,
- the selected reference picture sample array refPicLX,
- the half sample interpolation filter index hpelIfIdx,
- the bi-directional optical flow flag bdofFlag,
- a variable cIdx specifying the colour component index of the current block.

Outputs of this process are:
- an (sbWidth+brdExtSize)×(sbHeight+brdExtSize) array predSamplesLX of prediction sample values.

The prediction b lock border extension size brdExtSize is derived as follows:

brdExtSize=(bdofFlag||(inter_affine_flag[xSb][ySb] && *sps*_affine_prof_enabled_flag))?2:0 (8-752)

The variable fRefWidth is set equal to the PicOutputWidthL of the reference picture in luma samples.
The variable fRefHeight is set equal to PicOutputHeightL of the reference picture in luma samples.
*The vairable fRefLeftOffis equal to the conf_win_top_ offset of the reference picture in luma samples.*
*The vairable fRefTopOffis set equal to the conf_win_top_ offset of the reference picture in luma samples*

The motion vector mvLX is set equal to (refMvLX mvOffset).

If cIdx is equal to 0, the following applies:
The scaling factors and their fixed-point representations are defined as hori_scale_*fp*=((fRefWidth<<14)+(PicOutputWidth*L*>>1))/PicOutputWidth*L* (8-753)

vert_scale_*fp*=((fRefHeight<<14)+(PicOutputHeight*L*>>1))/PicOutputHeight*L* (8-754)

Let (xIntL, yIntL) be a luma location given in full-sample units and (xFracL, yFracL) be an offset given in 1/16-sample units. These variables are used only in this clause for specifying fractional-sample locations inside the reference sample arrays refPicLX.

The top-left coordinate of the bounding block for reference sample padding $(xSbInt_L, ySbInt_L)$ is set equal to (xSb+(mvLX[0]>>4), ySb+(mvLX[1]>>4)).

For each luma sample location $(x_L=0 \ldots$ sbWidth$-1+$brdExtSize, $y_L=0 \ldots$ sbHeight 1+brdExtSize) inside the prediction luma sample array predSamplesLX, the corresponding prediction luma sample value predSamplesLX$[x_L][y_L]$ is derived as follows:

Let $(refxSb_L, refySb_L)$ and $(refx_L, refy_L)$ be luma locations pointed to by a motion vector (refMvLX[0], refMvLX[1]) given in 1/16-sample units. The variables $refxSb_L$, $refx_L$, $refySb_L$, and $refy_L$ are derived as follows:

$refxSb_L=((xSb<<4)+refMvLX[0])*hori\_scale\_fp$ (8-755)

$refx_L=((\text{Sign}(refxSb)*((\text{Abs}(refxSb)+128)>>8)+x_L* ((hori\_scale\_fp+8)>>4))+32)>>6$ (8-756)

$refySb_L=((ySb<<4)+refMvLX[1])*vert\_scale\_fp$ (8-757)

$refy_L=((\text{Sign}(refySb)*((\text{Abs}(refySb)+128)>>8)+y_L* ((vert\_scale\_fp+8)>>4))+32)>>6$ (8-758)

The variables $xInt_L$, $yInt_L$, $xFrac_L$ and $yFrac_L$ are derived as follows:

$xInt_L=$ *Clip3(fRefLe ftOff,fRefLeft Off+fRefWidth -1, refxL >> 4)* (8-759)

$yInt_L=$ *Clip3(fRefTop Off,fRefTopOff +fRefHeight -1, refyL >> 4)* (8-760)

$xFrac_L = refx_L$ & 15 (8-761)

$yFrac_L = refy_L$ & 15 (8-762)

If bdofFlag is equal to TRUE or (sps_affine_prof_enabled_flag is equal to TRUE and inter_affine_flag [xSb][ySb] is equal to TRUE), and one or more of the following conditions are true, the prediction luma sample value predSamplesLX$[x_L][y_L]$ is derived by invoking the luma integer sample fetching process as specified in clause 8.5.6.3.3 with $(xInt_L+(xFrac_L>>3)-1)$, $yInt_L+(yFrac_L>>3)-1)$ and refPicLX as inputs.

$x_L$ is equal to 0.
$x_L$ is equal to sbWidth+1.
$y_L$ is equal to 0.
$y_L$ is equal to sbHeight+1.

Otherwise, the prediction luma sample value predSamplesLX$[x_L][y_L]$ is derived by invoking the luma sample 8-tap interpolation filtering process as specified in clause 8.5.6.3.2 with $(xInt_L-(brdExtSize>0?1:0), yIntL-(brdExtSize>0?1:0))$, (xFracL, yFracL), $(xSbInt_L, ySbInt_L)$, refPicLX, hpelIfIdx, sbWidth, sbHeight and (xSb, ySb) as inputs.

Otherwise (cIdx is not equal to 0), the following applies:
Let (xIntC, yIntC) be a chroma location given in full-sample units and (xFracC, yFracC) be an offset given in 1/32 sample units. These variables are used only in this clause for specifying general fractional-sample locations inside the reference sample arrays refPicLX.

The top-left coordinate of the bounding block for reference sample padding (xSbIntC, ySbIntC) is set equal to ((xSb/SubWidthC)+(mvLX[0]>>5), (ySb/SubHeightC)+(mvLX[1]>>5)).

For each chroma sample location (xC=0 . . . sbWidth−1, yC=0 . . . sbHeight−1) inside the prediction chroma sample arrays predSamplesLX, the corresponding prediction chroma sample value pred SamplesLX[xC][yC] is derived as follows:

Let (refxSb$_C$, refySb$_C$) and (refx$_C$, refy$_C$) be chroma locations pointed to by a motion vector (mvLX[0], mvLX[1]) given in 1/32-sample units. The variables refxSb$_C$, refySb$_C$, refx$_C$ and refy$_C$ are derived as follows:

refxSb$_C$=((xSb/SubWidthC<<5)+mvLX[0])*hori_scale_fp (8-763)

refx$_C$=((Sign(refxSb$_C$)*((Abs(refxSb$_C$)+256)>>9)+xC*((hori_scale_fp+8)>>4))+16)>>5 (8-764)

refySb$_C$=((ySb/SubHeightC<<5)+mvLX[1])*vert_scale_fp (8-765)

refy$_C$=((Sign(refySb$_C$)*((Abs(refySb$_C$)+256)>>9)+yC*((vert_scale_fp+8)>>4))+16)>>5 (8-766)

The variables xInt$_C$, yInt$_C$, xFrac$_C$ and yFrac$_C$ are derived as follows:

xInt$_C$= _Clip3(fRefLeft Off/SubWidth (fRefWidth+ fRefLeftOff)/ SubWidthC-1, refxC >> 5)_ (8-767)

yInt$_C$= _Clip3(fRef TopOff/Sub HeightC, (fRefHeight+ fRefTopOff)/ SubHeightC-1, refyC >> 5)_ (8-768)

xFrac$_C$=refy$_C$ & 31 (8-769)

yFrac$_C$=refy$_C$ & 31 (8-770)

The prediction sample value predSamplesLX[xC][yC] is derived by invoking the process specified in clause 8.5.6.3.4 with (xIntC, yIntC), (xFracC, yFracC), (xSbIntC, ySbIntC), sbWidth, sbHeight and refPicLX as inputs.

6. Example Implementations of the Disclosed Technology

Figure 5:
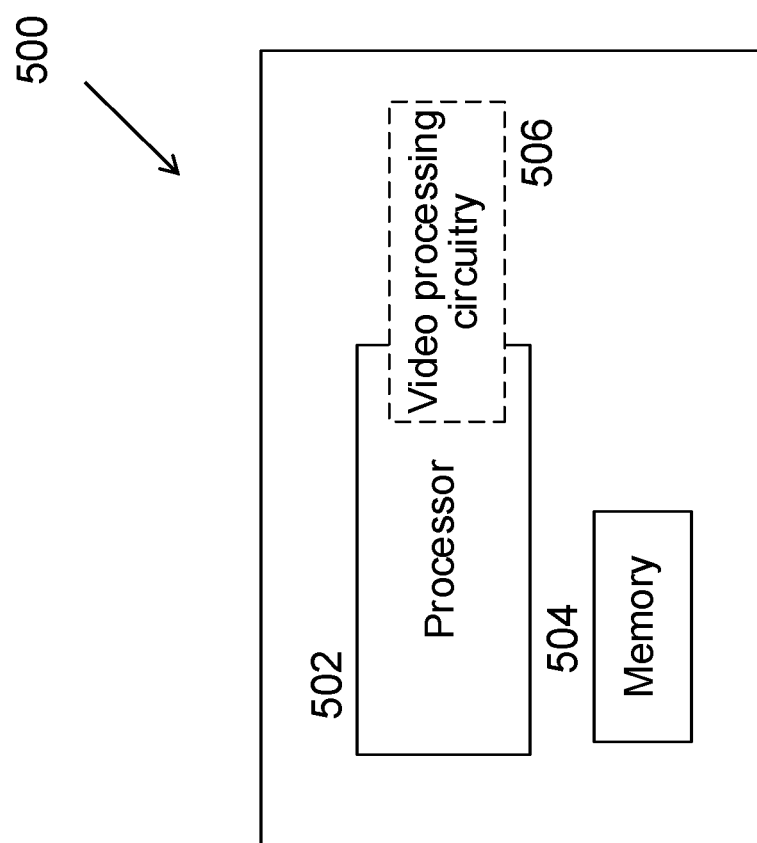
FIG. 5 is a block diagram of an example of a hardware platform for implementing a visual media decoding or a visual media encoding technique described in the present document.

FIG. 5 is a block diagram of a video processing apparatus 500. The apparatus 500 may be used to implement one or more of the methods described herein. The apparatus 500 may be embodied in a smartphone, tablet, computer, Internet of Things (IoT) receiver, and so on. The apparatus 500 may include one or more processors 502, one or more memories 504 and video processing hardware 506. The processor(s) 502 may be configured to implement one or more methods described in the present document. The memory (memories) 504 may be used for storing data and code used for implementing the methods and techniques described herein. The video processing hardware 506 may be used to implement, in hardware circuitry, some techniques described in the present document, and may be partly or completely be a part of the processors 502 (e.g., graphics processor core GPU or other signal processing circuitry).

In the present document, the term "video processing" or coding may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream.

It will be appreciated that the disclosed methods and techniques will benefit video encoder and/or decoder embodiments incorporated within video processing devices such as smartphones, laptops, desktops, and similar devices by allowing the use of the techniques disclosed in the present document.

Figure 6:
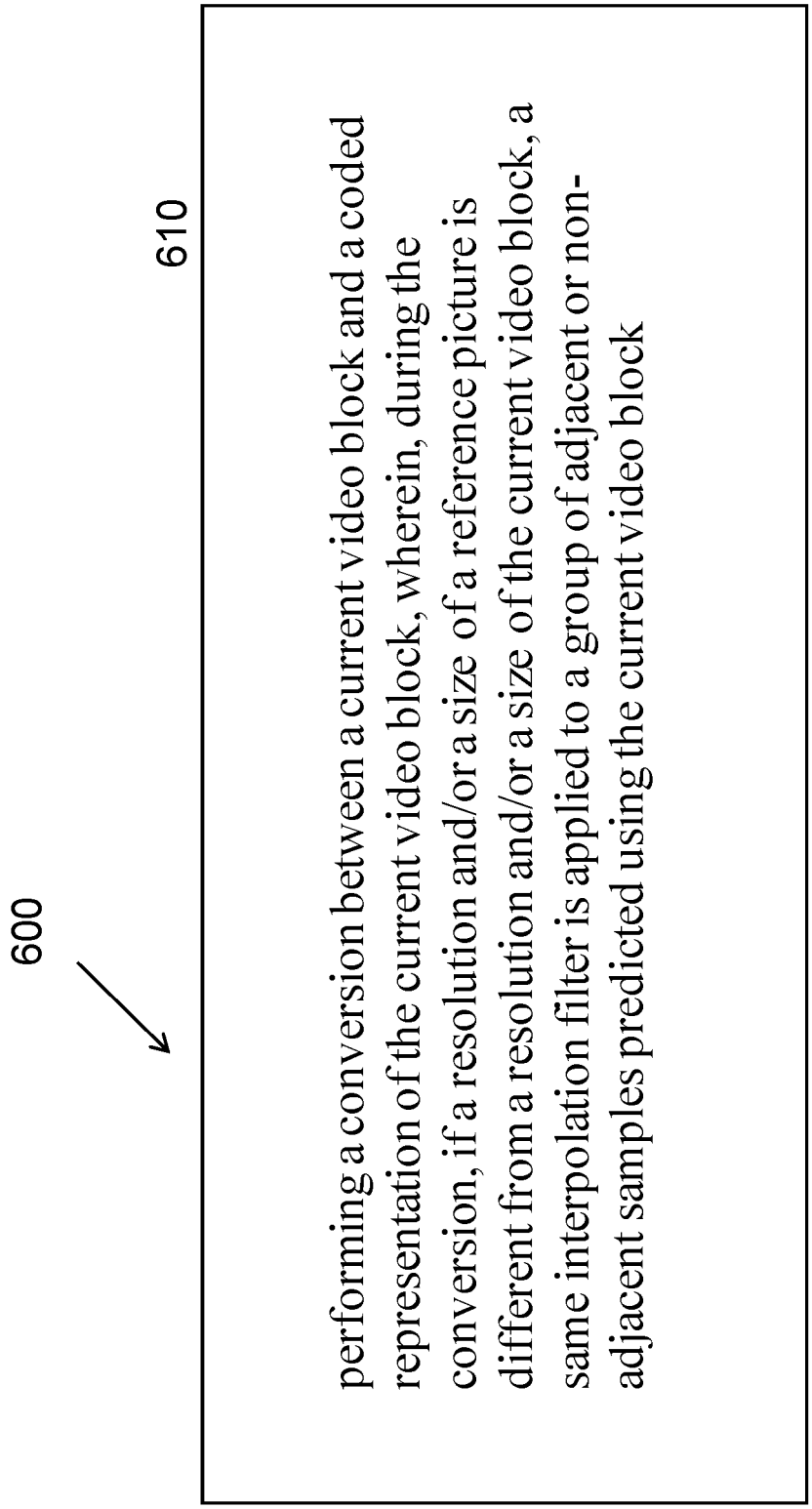
FIG. 6 shows a flowchart of an example method for video coding.

FIG. 6 is a flowchart for an example method 600 of video processing. The method 600 includes, at 610, performing a conversion between a current video block and a coded representation of the current video block, wherein, during the conversion, if a resolution and/or a size of a reference picture is different from a resolution and/or a size of the current video block, a same interpolation filter is applied to a group of adjacent or non-adjacent samples predicted using the current video block.

Some embodiments may be described using the following clause-based format.

1. A method of video processing, comprising:
performing a conversion between a current video block and a coded representation of the current video block, wherein, during the conversion, if a resolution and/or a size of a reference picture is different from a resolution and/or a size of the current video block, a same interpolation filter is applied to a group of adjacent or non-adjacent samples predicted using the current video block.

2. The method of clause 1, wherein the same interpolation filter is a vertical interpolation filter.

3. The method of clause 1, wherein the same interpolation filter is a horizontal interpolation filter.

4. The method of clause 1, wherein the group of adjacent or non-adjacent samples include all samples located in a region of the current video block.

5. The method of clause 4, wherein the current video blocks is divided into multiple rectangles each of size M×N.

6. The method of clause 5, wherein M and/or N are pre-determined.

7. The method of clause 5, wherein M and/or N are derived from dimensions of the current video block.

8. The method of clause 5, wherein M and/or N are signaled in the coded representation of the current video block.

9 The method of clause 1, wherein the group of samples share a same motion vector.

10. The method of clause 9, wherein the group of samples share a same horizontal component and/or a same fractional part of a horizontal component.

11. The method of clause 9, wherein the group of samples share a same vertical component and/or a same fractional part of a vertical component.

12. The method of one or more of clauses 9-11, wherein the same motion vector or components thereof satisfy one or more rules based at least on one of: the resolution of the reference picture, the size of the reference picture, the resolution of the current video block, the size of the current video block, or a precision value.

13. The method of one or more of clauses 9-11, wherein the same motion vector or components thereof corresponds to a motion information of a sample located in the current video block.

14. The method of one or more of clauses 9-11, wherein the same motion vector or components thereof are set to a motion information of a virtual sample located inside or outside the group.

15. A method of video processing, comprising:
performing a conversion between a current video block and a coded representation of the current video block, wherein, during the conversion, if a resolution and/or a size of a reference picture is different from a resolution and/or a size of the current video block, wherein blocks predicted using the current video block are only allowed to use integer-valued motion information related to the current block.

16. The method of clause 15, wherein the integer-valued motion information is derived by rounding an original motion information of the current video block.

17. The method of clause 15, wherein the original motion information of the current video block is in a horizontal direction and/or a vertical direction.

18. A method of video processing, comprising:
performing a conversion between a current video block and a coded representation of the current video block, wherein, during the conversion, if a resolution and/or a size of a reference picture is different from a resolution and/or a size of the current video block, an interpolation filter is applied to derive blocks predicted using the current video block, and wherein the interpolation filter is selected based on a rule.

19. The method of clause 18, whether the rule is related to the resolution and/or the size of the reference picture relative to the resolution and/or the size of the current video block.

20. The method of clause 18, wherein the interpolation filter is a vertical interpolation filter.

21. The method of clause 18, wherein the interpolation filter is a horizontal interpolation filter.

22. The method of clause 18, wherein the interpolation filter is one of: a 1-tap filter, a bilinear filter, a 4-tap filter, or a 6-tap filter.

23. The method of clause 22, wherein the interpolation filter is used as part of other steps of the conversion.

24. The method of clause 18, wherein the interpolation filter includes a use of padding samples.

25. The method of clause 18, wherein a use of the interpolation filter depends on a color component of a sample of the current video block.

26. A method of video processing, comprising:
performing a conversion between a current video block and a coded representation of the current video block, wherein, during the conversion, if a resolution and/or a size of a reference picture is different from a resolution and/or a size of the current video block, selectively applying a deblocking filter, wherein a strength of the deblocking filter set in accordance with a rule related to the resolution and/or the size of the reference picture relative to the resolution and/or the size of the current video block.

27. The method of clause 27, wherein the strength of the deblocking filter varies from one video block to another.

28. A method of video processing, comprising:
performing a conversion between a current video block and a coded representation of the current video block, wherein, during the conversion, if a sub-picture of the current video block exists, a conformance bitstream satisfies a rule related to the resolution and/or the size of the reference picture relative to the resolution and/or the size of the current video block.

29. The method of clause 28, further comprising:
splitting the current video block into one or more sub-pictures, wherein the splitting depends at least on the resolution of the current video block.

30. A method of video processing, comprising:
performing a conversion between a current video block and a coded representation of the current video block, wherein, during the conversion, a reference picture of the current video block is resampled in accordance with a rule based on dimensions of the current video block.

31. A method of video processing, comprising:
performing a conversion between a current video block and a coded representation of the current video block, wherein, during the conversion, a use of a coding tool on the current video block is selectively enabled or disabled depending on a resolution/size of a reference picture of the current video block relative to a resolution/size of the current video block.

32. The method of one or more of the aforementioned clauses, wherein the group of samples are located in a conformance window.

33. The method of clause 32, wherein the conformance window is rectangular in shape.

34. The method of any one or more of the aforementioned clauses, wherein the resolution pertains to a resolution of the coded/decoded video block or a resolution of the conformance window in the coded/decoded video block.

35. The method of any one or more of the aforementioned clauses, wherein the size pertains to a size of the coded/decoded video block or a size of the conformance window in the coded/decoded video block.

36. The method of any one or more of the aforementioned clauses, wherein the dimensions pertain to dimensions of the coded/decoded video block or dimensions of the conformance window in the coded/decoded video block.

37. The method of clause 32, wherein the conformance window is defined by a set of conformance cropping window parameters.

38. The method of clause 37, wherein at least a portion of set of conformance cropping window parameters are implicitly or explicitly signaled in the coded representation.

39. The method of any one or more of the aforementioned clauses, wherein the set of conformance cropping window parameters is disallowed to be signaled in the coded representation.

40. The method of any one or more of the aforementioned clauses, wherein a position of the reference sample is derived with respect to a top-left sample of the current video block in the conformance window.

41. A method of video processing, comprising:
performing a conversion between multiple video blocks and coded representations of the multiple video blocks, wherein, during the conversion, a first conformance window is defined for a first video block and a second conformance window for a second video block, and wherein a ratio of a width and/or a height of the first conformance window to the second conformance window is in accordance with a rule based at least on a conformance bitstream.

42. A video decoding apparatus comprising a processor configured to implement a method recited in one or more of clauses 1 to 41.

43. A video encoding apparatus comprising a processor configured to implement a method recited in one or more of clauses 1 to 41.

44. A computer program product having computer code stored thereon, the code, when executed by a processor, causes the processor to implement a method recited in any of clauses 1 to 41.

45. A method, apparatus or system described in the present document.

Figure 7:
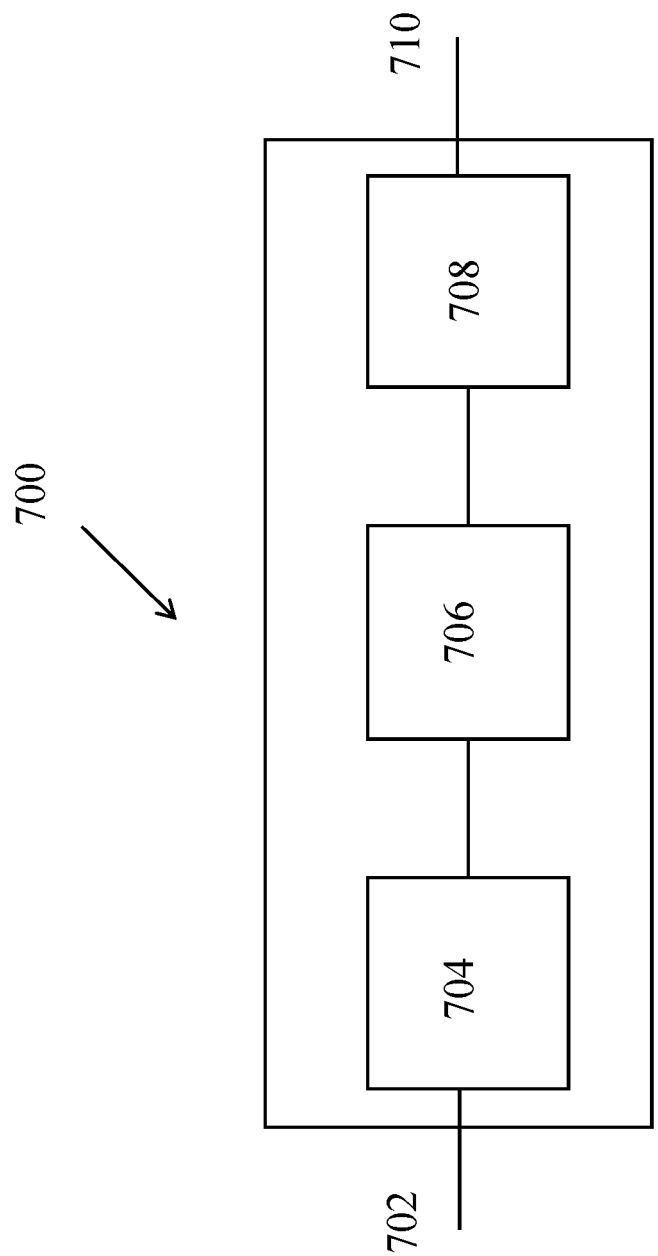
FIG. 7 is a block diagram of an example video processing system in which disclosed techniques may be implemented.

FIG. 7 is a block diagram showing an example video processing system 700 in which various techniques disclosed herein may be implemented. Various implementations may include some or all of the components of the system 700. The system 700 may include input 702 for receiving video content. The video content may be received in a raw or uncompressed format, e.g., 8 or 10 bit multi-component pixel values, or may be in a compressed or encoded format. The input 702 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 700 may include a coding component 704 that may implement the various coding or encoding methods described in the present document. The coding component 704 may reduce the average bitrate of video from the input 702 to the output of the coding component 704 to produce a coded representation of the video. The coding techniques are therefore sometimes called video compression or video transcoding techniques. The output of the coding component 704 may be either stored, or transmitted via a communication connected, as represented by the component 706. The stored or communicated bitstream (or coded) representation of the video received at the input 702 may be used by the component 708 for generating pixel values or displayable video that is sent to a display interface 710. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Figure 8:
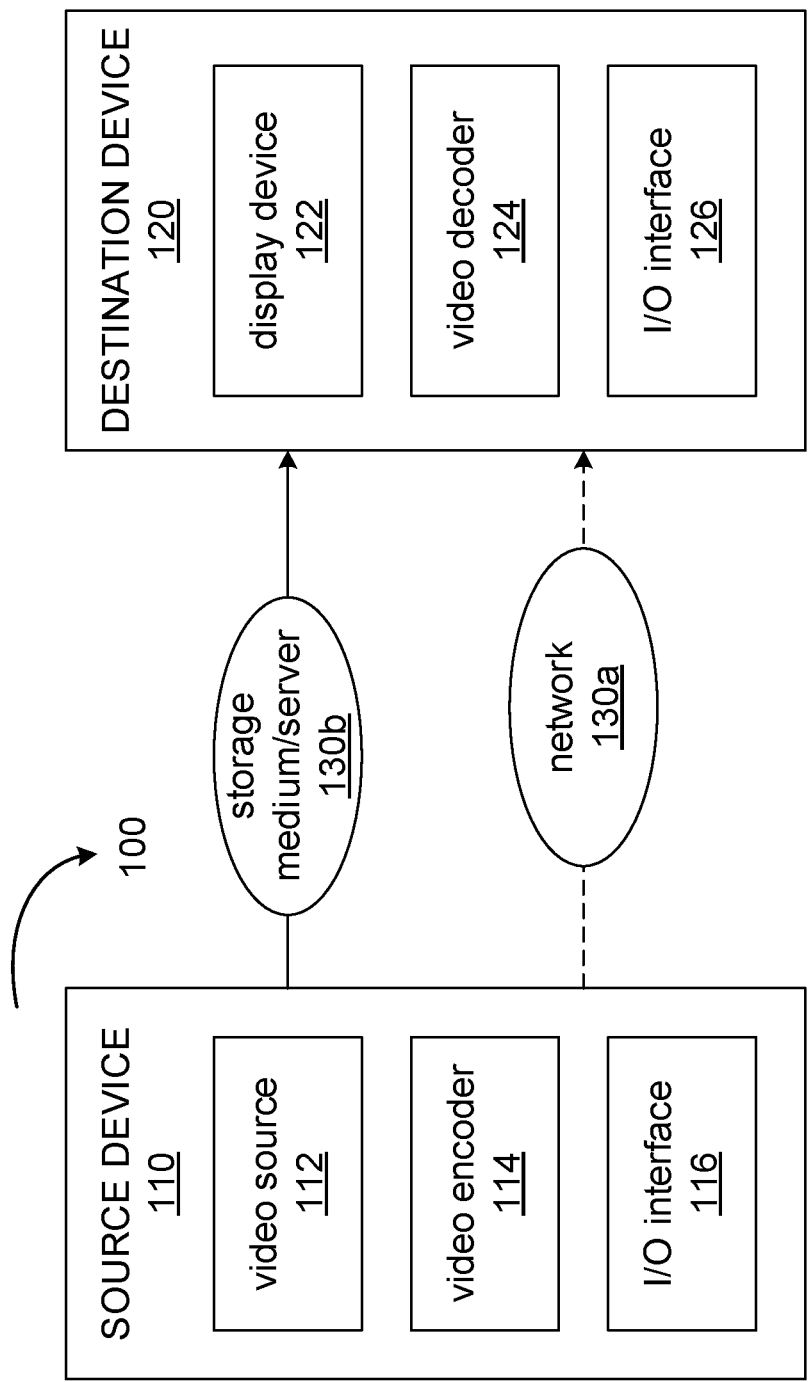
FIG. 8 is a block diagram that illustrates an example video coding system.

FIG. 8 is a block diagram that illustrates an example video coding system 100 that may utilize the techniques of this disclosure.

As shown in FIG. 8, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVC) standard and other current and/or further standards.

Figure 9:
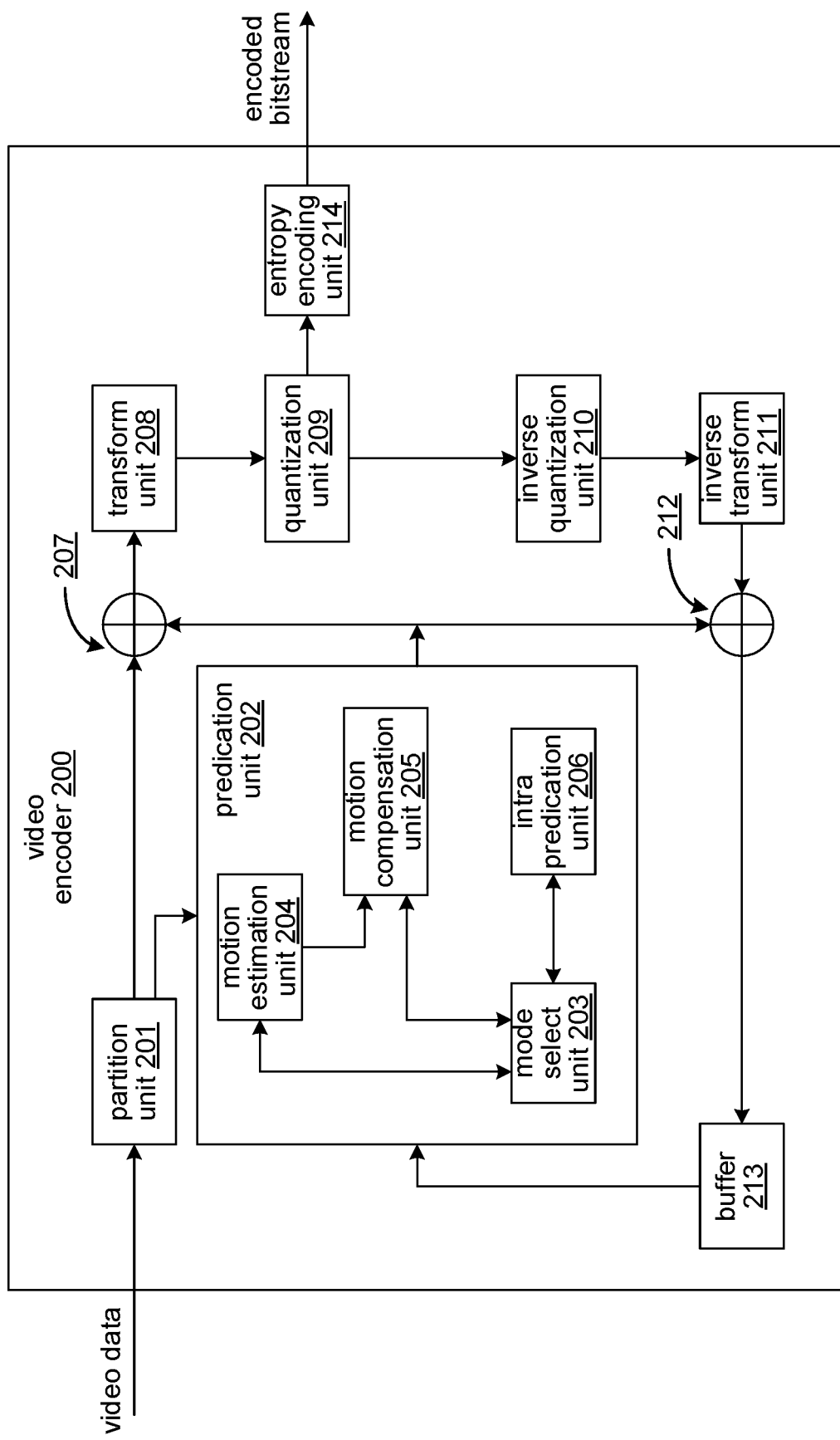
FIG. 9 is a block diagram that illustrates an encoder in accordance with some embodiments of the present disclosure.

FIG. 9 is a block diagram illustrating an example of video encoder 200, which may be video encoder 114 in the system 100 illustrated in FIG. 8.

Video encoder 200 may be configured to perform any or all of the techniques of this disclosure. In the example of FIG. 9, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a predication unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, predication unit 202 may include an intra block copy (IBC) unit. The IBC unit may perform predication in an IBC mode in which at least one reference picture is a picture where the current video block is located.

Furthermore, some components, such as motion estimation unit 204 and motion compensation unit 205 may be highly integrated, but are represented in the example of FIG. 5 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, Mode select unit 203 may select a combination of intra and inter predication (CIIP) mode in which the predication is based on an inter predication signal and an intra predication signal. Mode select unit 203 may also select a resolution for a motion vector (e.g, a sub-pixel or integer pixel precision) for the block in the case of inter-predication.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may do not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as the another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the predication unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 10:
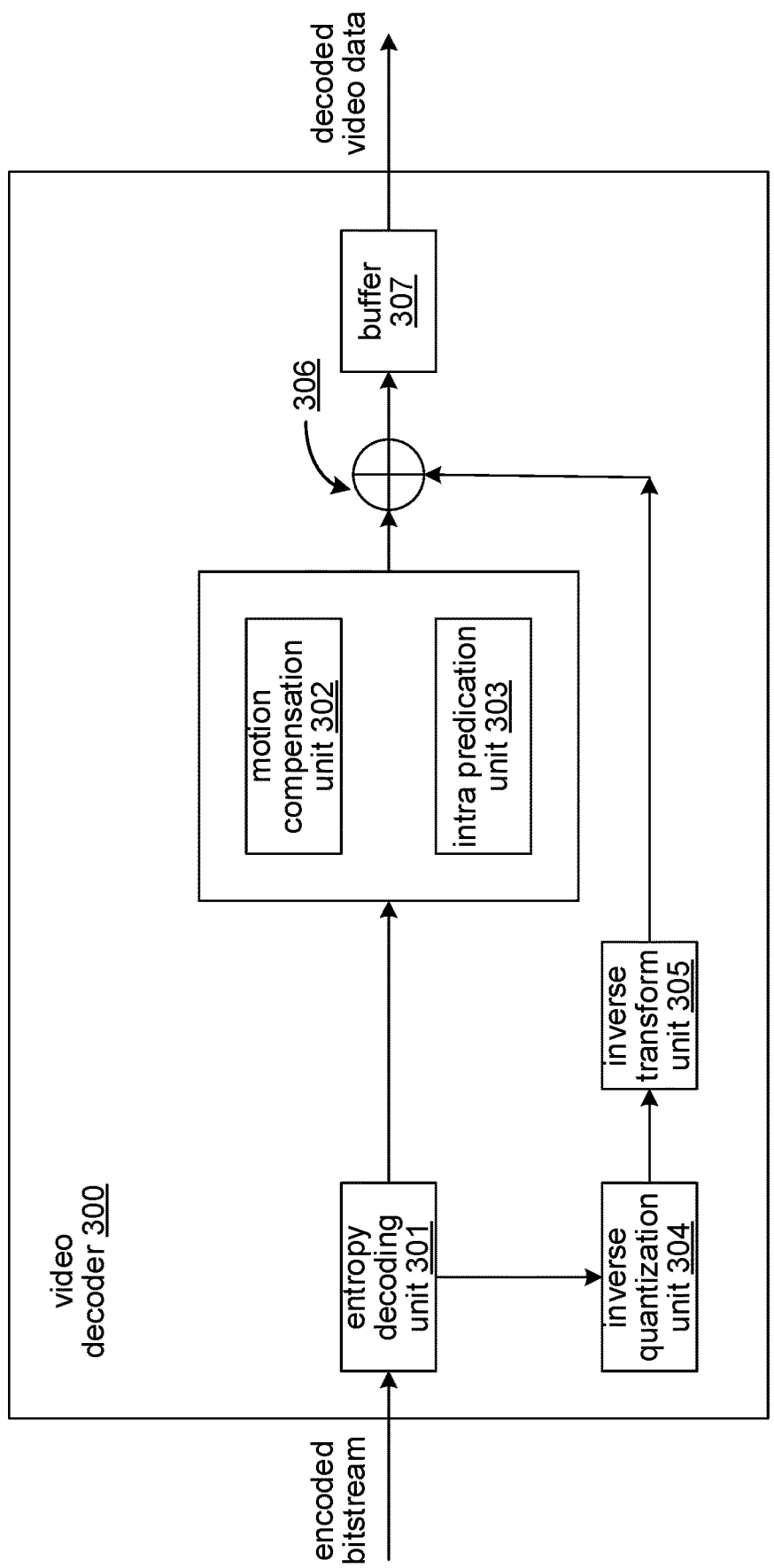
FIG. 10 is a block diagram that illustrates a decoder in accordance with some embodiments of the present disclosure.

FIG. 10 is a block diagram illustrating an example of video decoder 300 which may be video decoder 114 in the system 100 illustrated in FIG. 8.

The video decoder 300 may be configured to perform any or all of the techniques of this disclosure. In the example of FIG. 10, the video decoder 300 includes a plurality of functional components. The techniques described in this disclosure may be shared among the various components of the video decoder 300. In some examples, a processor may be configured to perform any or all of the techniques described in this disclosure.

In the example of FIG. 10, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (e.g., FIG. 9).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 20 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may uses some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 303 inverse quantizes, i.e., de-quantizes, the quantized video block coefficients provided in the bitstream and decoded by entropy decoding unit 301. Inverse transform unit 303 applies an inverse transform.

Reconstruction unit 306 may sum the residual blocks with the corresponding prediction blocks generated by motion compensation unit 202 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation.

Figure 11:
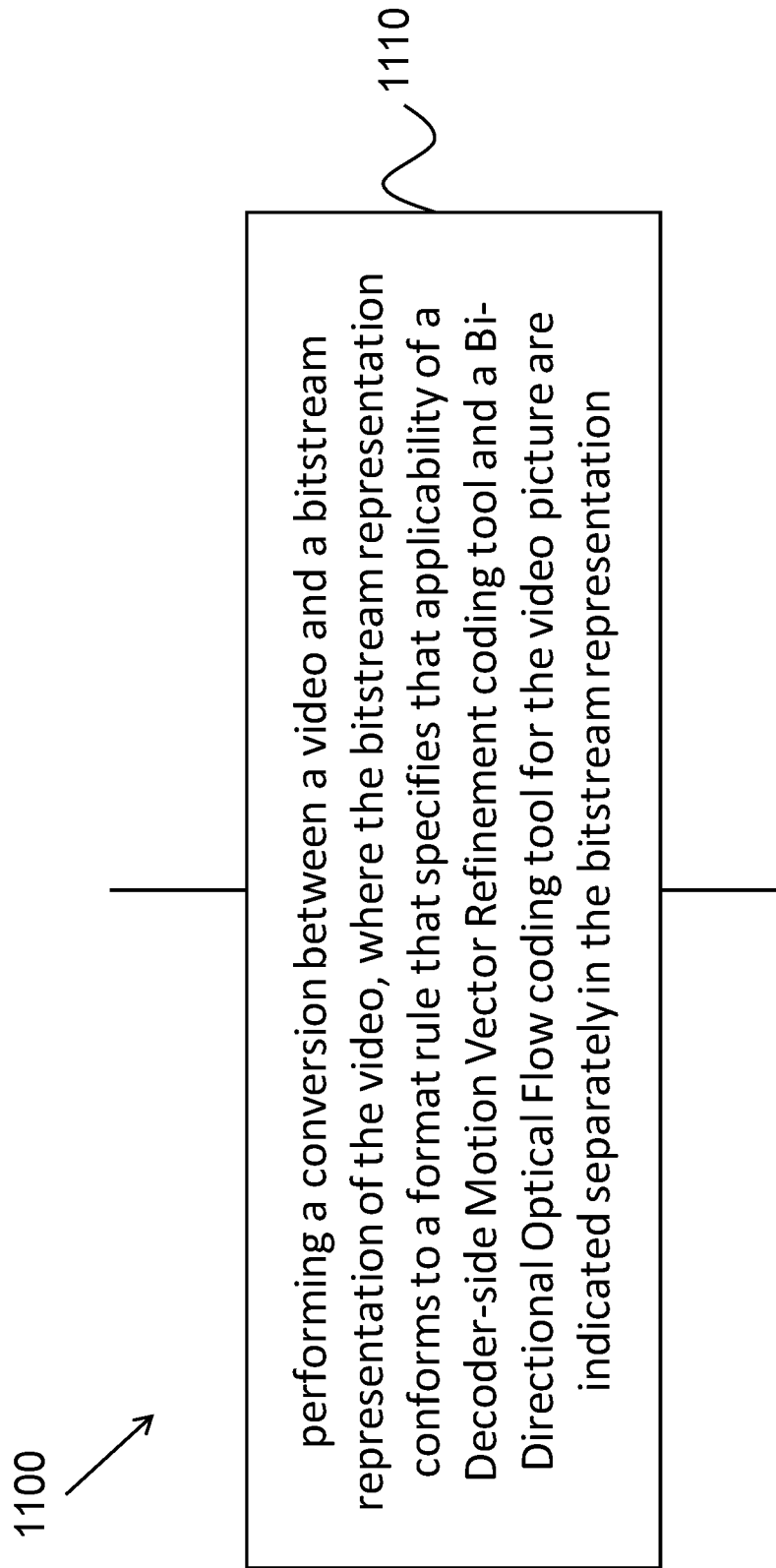
FIG. 11 is a flowchart representation of a method of video processing in accordance with the present technology.

FIG. 11 is a flowchart representation of a method of video processing in accordance with the present technology. The method 1100 includes, at operation 1110, performing a conversion between a video and a bitstream representation of the video. The bitstream representation conforms to a format rule that specifies that applicability of a Decoder-side Motion Vector Refinement coding tool and a Bi-Directional Optical Flow coding tool for the video picture are indicated separately in the bitstream representation.

In some embodiments, the Decoder-side Motion vector Refinement tool comprises performing automatic refinement of motion vectors without transmission of additional motion data to perform a motion compensation at a decoder side. In some embodiments, the Bi-Directional Optical flow coding tool comprises enhancing bi-predictive prediction samples of a block via higher-precision motion vectors derived from two reference blocks. In some embodiments, the applicability is indicated in a picture header field of the bitstream representation.

Figure 12:
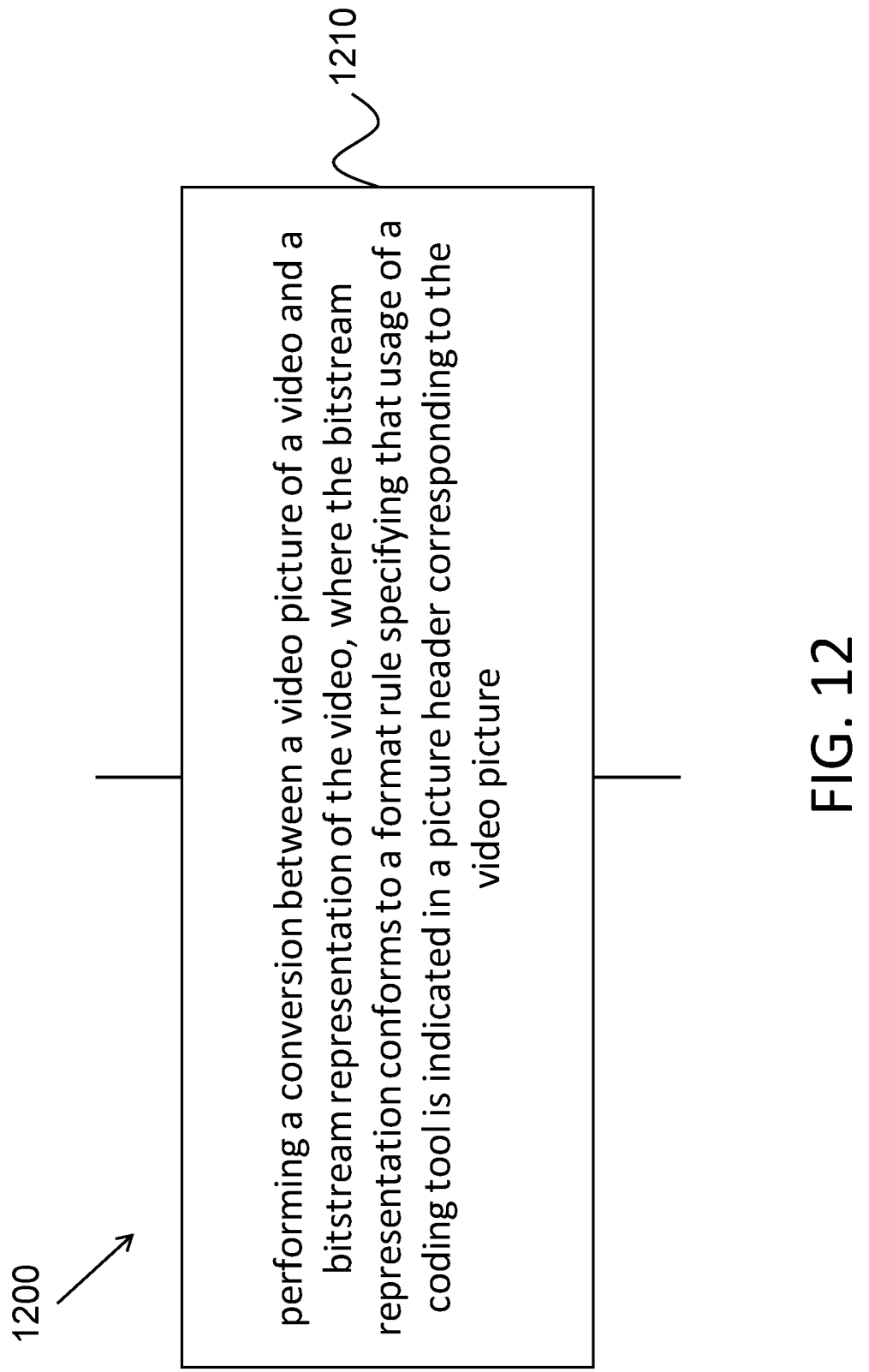
FIG. 12 is a flowchart representation of another method of video processing in accordance with the present technology.

FIG. 12 is a flowchart representation of a method of video processing in accordance with the present technology. The method 1200 includes, at operation 1210, performing a conversion between a video picture of a video and a bitstream representation of the video. The bitstream representation conforms to a format rule specifying that usage of a coding tool is indicated in a picture header corresponding to the video picture.

In some embodiments, the format rule specifies that the indication of the coding tool in the picture header is based on a syntax element associated with the coding tool in a sequence parameter set, a video parameter set, or a decoder parameter set of the bitstream representation. In some embodiments, the coding tool comprises at least one of a prediction refinement with optical flow (PROF) coding tool, a cross-component adaptive loop filtering (CCALF) coding tool, or an inter prediction with geometric partitioning (GEO) coding tool. In some embodiments, the usage of the coding tool is indicated by one or more syntax elements.

In some embodiments, the format rule specifies that the usage of the coding tool is indicated conditionally based on a syntax element that indicates enabling or disabling of the coding tool in the sequence parameter set. In some embodiments, the coding tool comprises a prediction refinement with optical flow (PROF) coding tool. In some embodiments, the coding tool comprises a cross-component adaptive loop filtering (CCALF) coding tool. In some embodiments, coding tool comprises an inter prediction with geometric partitioning (GEO) coding tool. In some embodiments, the usage is further conditionally indicated in a slice header based on the picture header.

Figure 13:
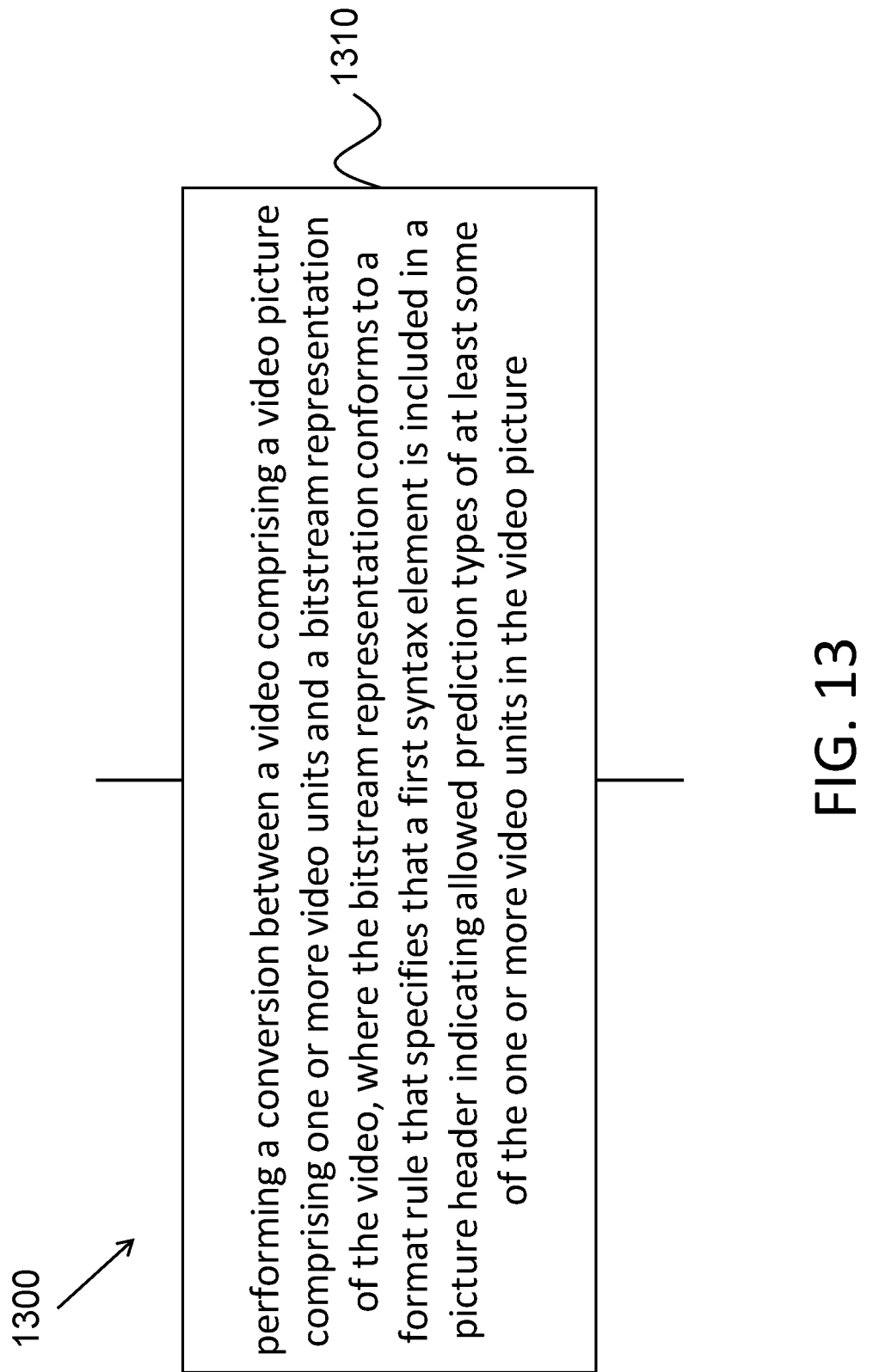
FIG. 13 is a flowchart representation of yet another method of video processing in accordance with the present technology.

FIG. 13 is a flowchart representation of a method of video processing in accordance with the present technology. The method 1300 includes, at operation 1310, performing a conversion between a video comprising a video picture comprising one or more video units and a bitstream representation of the video. The bitstream representation conforms to a format rule that specifies that a first syntax element is included in a picture header indicating allowed prediction types of at least some of the one or more video units in the video picture.

In some embodiments, a video unit of the one or more video units comprises a slice, a brick, or a tile. In some embodiments, the picture header includes the first syntax element indicating whether all of the one or more video units have a same prediction type. In some embodiments, the same prediction type is an intra coded type. In some embodiments, a second syntax element indicating a type of a slice is omitted in a slice header corresponding to the slice in case the first syntax element indicates that all slices of the corresponding video picture have the same prediction type. In some embodiments, the picture header includes a third syntax element indicating whether at least one of the multiple video units is not intra-coded.

In some embodiments, an indication of a coding tool allowed for a specific prediction type is conditionally signaled in the bitstream representation based on whether the indicated same prediction type is the specific prediction type. In some embodiments, in case the same prediction type is a bidirectional predicted type, the coding tool that is allowed for the specific prediction type comprises a Decoder-side Motion Vector Refinement coding tool, a Bi-Directional Optical Flow coding tool, a Triangular Partitioning Mode coding tool, or a Geometric partitioning (GEO) coding tool. In some embodiments, in case the specific prediction type is an intra coded type, the coding tool that is allowed for the same prediction type comprises a dual tree coding tool. In some embodiments, the format rule specifies that usage of the coding tool is indicated based on indication of the same prediction type. In some embodiments, usage of the coding tool is determined based on indication of the same prediction type.

In some embodiments, the conversion includes encoding the video into the bitstream representation. In some embodiments, the conversion includes decoding the bitstream representation into the video.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was enabled based on the decision or determination.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:
    determining, for a conversion between a video comprising a video picture comprising video units and a bitstream of the video, a prediction type of at least one of the video units in the video picture based on one or more syntax elements; and
    performing the conversion based on the determination,
    wherein the one or more syntax elements are included in a picture header in the bitstream,
    wherein the video units are slices, and wherein
    the one or more syntax elements comprise a first syntax element indicating whether prediction types of all the slices of the video picture are coded with a first prediction type,
    wherein a syntax element indicating a slice type is not included in a slice header in the bitstream when the first syntax element indicates that all the slices of the video picture are I slices.

2. The method of claim 1, wherein the first prediction type is an intra prediction.

3. The method of claim 1, wherein the one or more syntax elements conditionally comprise a second syntax element indicating whether at least one of the slices is non-I slice.

4. The method of claim 1, wherein the conversion includes encoding the video into the bitstream.

5. The method of claim 1, wherein the conversion includes decoding the video from the bitstream.

6. An apparatus comprising a processor and a non-transitory memory with instructions thereon for processing video data, wherein the instructions upon execution by the processor, cause the processor to:
    determine, for a conversion between a video comprising a video picture comprising video units and a bitstream of the video, a prediction type of at least one of the video units in the video picture based on one or more syntax elements; and
    perform the conversion based on the determination,
    wherein the one or more syntax elements are included in a picture header in the bitstream,
    the video units are slices, and
    the one or more syntax elements comprise a first syntax element indicating whether prediction types of all the slices of the video picture are coded with a first prediction type,
    wherein a syntax element indicating a slice type is not included in a slice header in the bitstream when the first syntax element indicates that all the slices of the video picture are I slices.

7. The apparatus of claim 6, wherein the first prediction type is an intra prediction.

8. The apparatus of claim 6, wherein the one or more syntax elements conditionally comprise a second syntax element indicating whether at least one of the slices is non-I slice.

9. A non-transitory computer-readable storage medium storing instructions that cause a processor to:
    determine, for a conversion between a video comprising a video picture comprising video units and a bitstream of the video, a prediction type of at least one of the video units in the video picture based on one or more syntax elements; and
    perform the conversion based on the determination,
    wherein the one or more syntax elements are included in a picture header in the bitstream,
    the video units are slices, and
    the one or more syntax elements comprise a first syntax element indicating whether prediction types of all the slices of the video picture are coded with a first prediction type,
    wherein a syntax element indicating a slice type is not included in a slice header in the bitstream when the first syntax element indicates that all the slices of the video picture are I slices.

10. The non-transitory computer-readable storage medium of claim 9,
    wherein the first prediction type is an intra prediction; and
    wherein the one or more syntax elements conditionally comprise a second syntax element indicating whether at least one of the slices is non-I slice.

11. A non-transitory computer-readable recording medium storing a bitstream of a video which is generated by a method performed by a video processing apparatus, wherein the method comprises:
    determining, for the video comprising a video picture comprising video units, a prediction type of at least one of the video units in the video picture based on one or more syntax elements; and
    generating the bitstream of the video based on the determination,
    wherein the one or more syntax elements are included in a picture header in the bitstream,
    the video units are slices, and
    the one or more syntax elements comprise a first syntax element indicating whether prediction types of all the slices of the video picture are coded with a first prediction type,
    wherein a syntax element indicating a slice type is not included in a slice header in the bitstream when the first syntax element indicates that all the slices of the video picture are I slices.

12. The non-transitory computer-readable recording medium of claim 11,
  wherein the first prediction type is an intra prediction; and
  wherein the one or more syntax elements conditionally comprise a second syntax element indicating whether at least one of the slices is non-I slice.

\* \* \* \* \*